(12) United States Patent
Wei

(10) Patent No.: US 8,417,080 B2
(45) Date of Patent: Apr. 9, 2013

(54) NONLINEARITY COMPENSATION IN A FIBER OPTIC COMMUNICATIONS SYSTEM

(76) Inventor: Haiqing Wei, San Jose, CA (US)

(*) Notice: Subject to any disclaimer, the term of this patent is extended or adjusted under 35 U.S.C. 154(b) by 91 days.

(21) Appl. No.: 13/180,410

(22) Filed: Jul. 11, 2011

(65) Prior Publication Data
US 2011/0268401 A1    Nov. 3, 2011

Related U.S. Application Data

(63) Continuation of application No. 13/004,017, filed on Jan. 10, 2011, now Pat. No. 7,978,945, which is a continuation of application No. 11/173,505, filed on Jul. 1, 2005, now Pat. No. 7,869,680.

(60) Provisional application No. 60/585,270, filed on Jul. 2, 2004.

(51) Int. Cl.
*G02B 6/02*  (2006.01)
(52) U.S. Cl.
USPC ......................................................... 385/123
(58) Field of Classification Search ............ 385/123
See application file for complete search history.

(56) References Cited

U.S. PATENT DOCUMENTS 7,099,541 B2 *   8/2006   Terahara et al. ............... 385/100

* cited by examiner

*Primary Examiner* — Uyen Chau N Le
*Assistant Examiner* — Hoang Tran

(57) ABSTRACT

An optical communications link is described, comprising first and second fiber lines in substantial scaled translational symmetry by a common scaling factor with respect to a second-order dispersion coefficient profile (oppositely signed) and with respect to at least one of a loss/gain coefficient profile and a nonlinear coefficient-power product profile for facilitating progressive compensation along the second fiber line of at least one nonlinearity introduced along the first fiber line. For other described embodiments, the first and second fiber lines are in substantial scaled translational symmetry by a common scaling factor with respect to a second-order dispersion coefficient profile and with respect to at least one of a loss/gain coefficient profile and a nonlinear coefficient-power product profile for facilitating progressive compensation along the second fiber line of at least one nonlinearity introduced along the first fiber line.

22 Claims, 54 Drawing Sheets

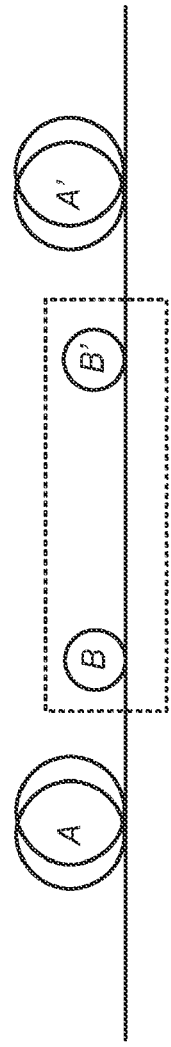
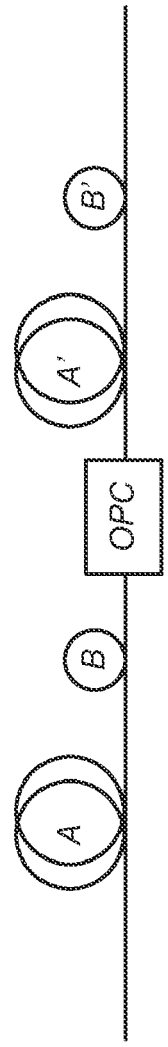
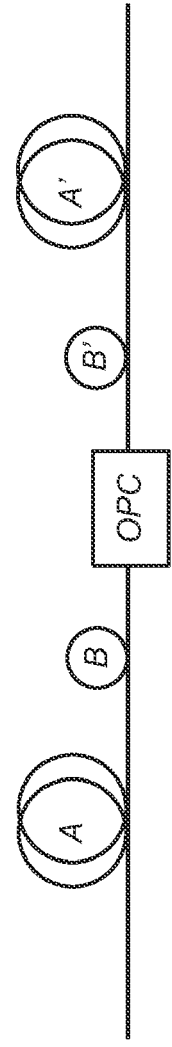
FIG. 7A  FIG. 7B  FIG. 7C  FIG. 7D1

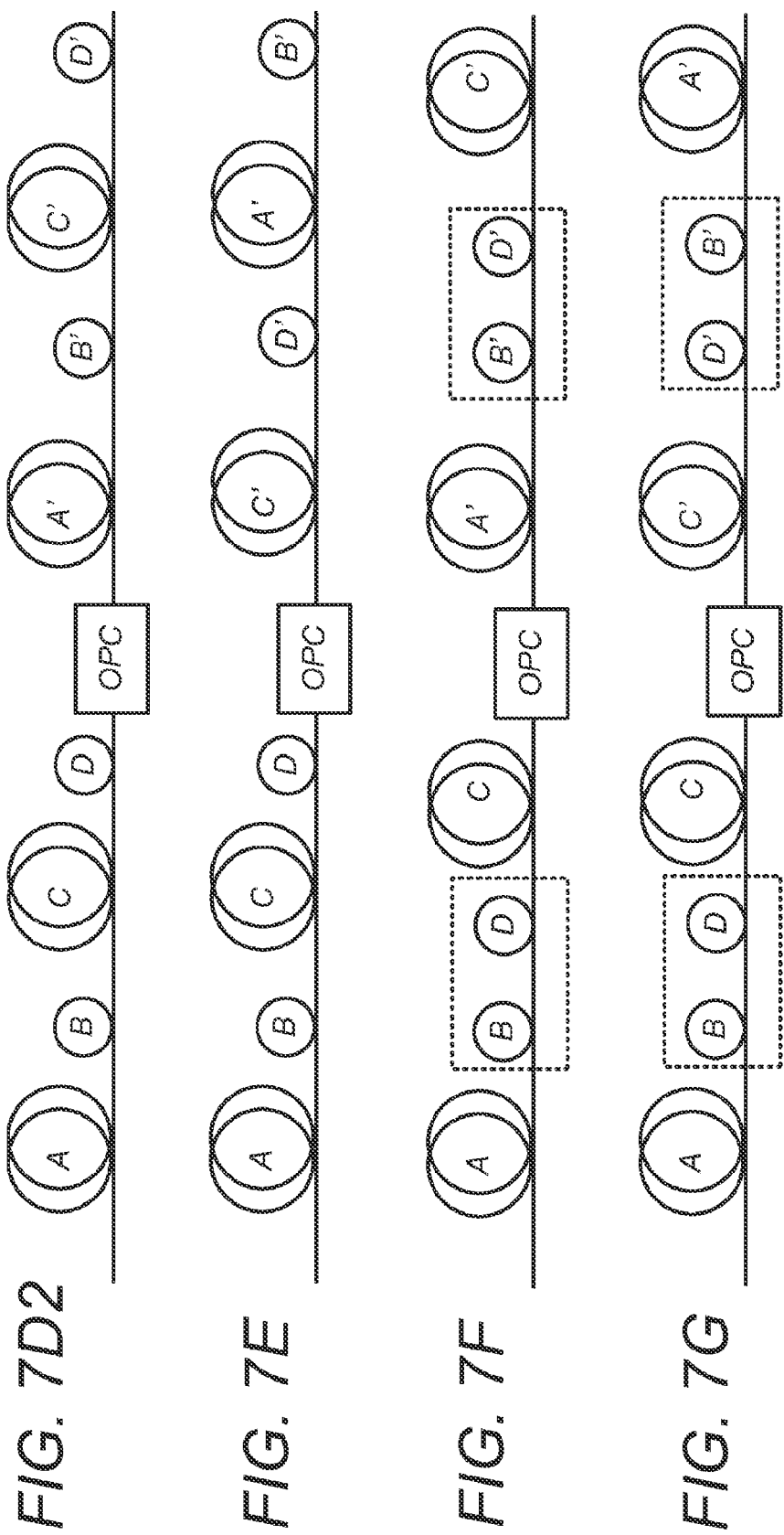

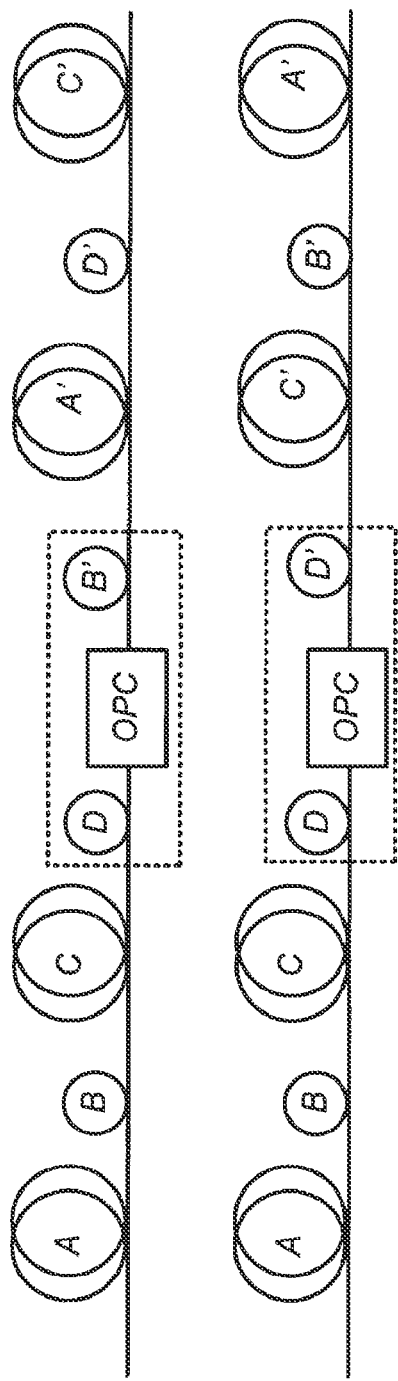

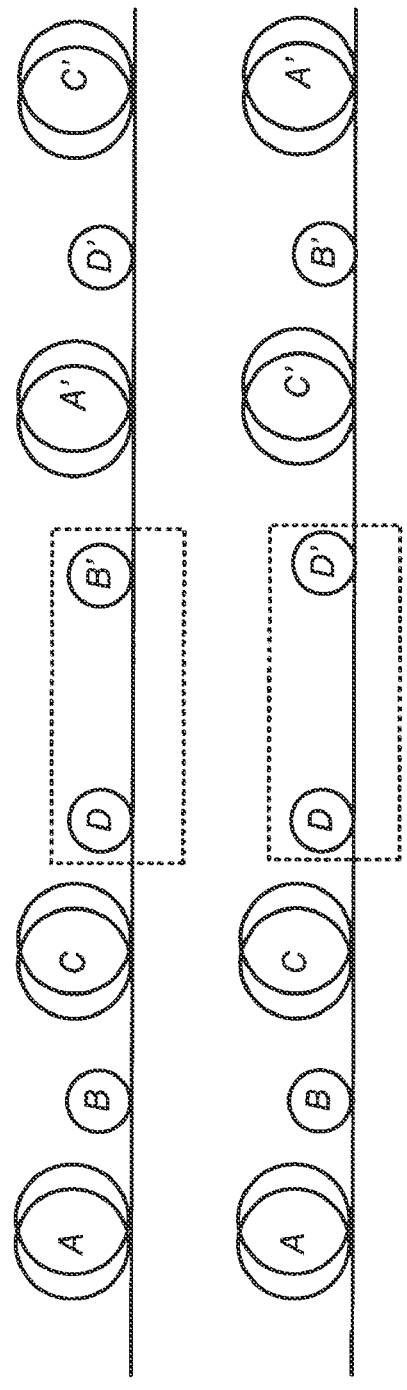

NONLINEARITY COMPENSATION IN A FIBER OPTIC COMMUNICATIONS SYSTEM

CROSS-REFERENCE TO RELATED APPLICATIONS

This application is a continuation of U.S. Ser. No. 13/004,017 filed on Jan. 10, 2011 and currently pending as of the filing date of this application, which is a continuation of U.S. Ser. No. 11/173,505 filed Jul. 1, 2005, now U.S. Pat. No. 7,869,680, which claims the benefit of Provisional Application Ser. No. 60/585,270, filed Jul. 2, 2004. Each of the above-referenced applications is incorporated by reference herein.

FIELD

This patent specification relates to fiber optic communications. More particularly, this patent specification relates to nonlinearity compensation in a fiber optic communications link.

BACKGROUND

Fiber optic communication generally involves modulating optical signals at high bit rates and transmitting the modulated optical signals over optical fibers. For example, in a wavelength division multiplexed (WDM) fiber optic communications system, optical carrier signals at a sequence of distinct wavelengths are separately modulated by information channels and then multiplexed onto a single optical fiber. Efforts continue toward increasing the data capacity of fiber optic communications systems, as well toward increasing the practical transmission distance of fiber optic spans. Although the development of erbium-doped fiber amplifiers (EDFAs) has virtually eliminated fiber attenuation as an obstacle to achieving longer transmission distances, group velocity dispersion and optical fiber nonlinearities continue to represent barriers to increased transmission capability.

Optical fiber nonlinearities begin to manifest themselves as the capabilities of the channel are pushed to their limits through the use of increased signal power, higher bit rates, longer transmission distances, and increased numbers of channels. One physical mechanism associated with at least one fiber nonlinearity is the optical Kerr effect, in which the refractive index of an optical fiber varies in accordance with the intensity of an optical signal. The variation of the refractive index modulates the phase of the optical signal, resulting in adverse effects such as self-phase modulation (SPM), cross-phase modulation (XPM), and four-wave mixing (FWM). Another physical mechanism associated with at least one fiber nonlinearity is the Raman effect, arising from energy transfers between the propagating photons and the vibrational/rotational modes of the glass molecules in the fiber.

Because of fiber nonlinearities, there may be substantial restrictions on one or more of signal power, the number of WDM channels that can be carried, bit rates per channel, permissible fiber dispersion amounts, and maximum regenerative repeater spacings. It would be desirable to provide an optical fiber communications system in which nonlinearities induced by optical fibers are at least partially compensated, while also providing for the necessary dispersion compensation. It would be further desirable to provide such optical fiber communications system using fiber spans that can be physically realized using known, off-the-shelf optical components.

Other issues arise as would be apparent to apparent to one skilled in the art upon reading the present disclosure.

SUMMARY

An optical communications link is provided, comprising first and second fiber lines in substantial scaled translational symmetry by a common scaling factor with respect to a second-order dispersion coefficient profile (oppositely signed) and with respect to at least one of a loss/gain coefficient profile and a nonlinear coefficient-power product profile for facilitating progressive compensation along the second fiber line of at least one nonlinearity introduced along the first fiber line. In one embodiment, the substantial scaled translational symmetry by the common scaling factor is characterized in that, for a first profile and a second profile, the first profile is in substantial scaled translational symmetry by the common scaling factor with the second profile if the first profile, when expanded along a first axis by the common scaling factor and contracted along a second axis by the common scaling factor, is in substantial correspondence with the second profile.

Also provided is an optical communications link, comprising a first fiber span including a first fiber line, the first fiber line comprising a first fiber segment, and a second fiber span including a second fiber line, the second fiber line comprising a second fiber segment. The first and second fiber lines are in substantial scaled translational symmetry by a first common scaling factor along the first and second fiber segments with respect to a second-order dispersion coefficient profile (oppositely signed) and with respect to at least one of a loss/gain coefficient profile and a nonlinear coefficient-power product profile for facilitating progressive compensation along the second fiber segment of at least one nonlinearity introduced along the first fiber segment.

Also provided is an optical communications link, comprising first and second fiber lines characterized by a loss/gain coefficient profile pair, a second-order dispersion coefficient profile pair, and a nonlinear coefficient-power product profile pair. For facilitating progressive compensation along the second fiber line of at least one nonlinearity introduced along the first fiber line, the first and second fiber lines are configured such that, for the second-order dispersion coefficient profile pair and at least one of the loss/gain coefficient profile pair and the nonlinear coefficient-power product profile pair, a first profile thereof substantially corresponds to a second profile thereof when the first profile is expanded along a first axis by a common scaling factor and contracted along a second axis by that common scaling factor.

Also provided is an optical communications link, comprising a first fiber span including a first fiber line, the first fiber line comprising a first fiber segment and having a first loss/gain coefficient profile, a first second-order dispersion coefficient profile, and a first nonlinear coefficient-power product profile. The optical communications link further comprises a second fiber span including a second fiber line, the second fiber line comprising a second fiber segment and having a second loss/gain coefficient profile, a second second-order dispersion coefficient profile, and a second nonlinear coefficient-power product profile. The optical communications link further comprises an optical phase conjugator optically coupled between the first and second fiber spans, an optical signal received by the first fiber span being propagated respectively through the first fiber span, the optical phase conjugator, and the second fiber span. The first fiber span, the second fiber span, and the optical phase conjugator are configured such that each of the following three conditions is satisfied: (i) the second loss/gain coefficient profile along the second fiber segment is in substantial scaled translational symmetry with the first loss/gain coefficient profile along the first fiber segment by a first constant; (ii) the second second-order dispersion coefficient profile along the second fiber segment is in substantial scaled translational symmetry with the first second-order dispersion coefficient profile oppositely signed along the first fiber segment by the first constant, and (iii) the second nonlinear coefficient-power product profile along the second fiber segment is in substantial scaled translational symmetry with the first nonlinear coefficient-power product profile along the first fiber segment by the first constant. Progressive compensation along the second fiber segment of at least one nonlinearity introduced along the first fiber segment is facilitated. In other embodiments, the optical phase conjugator may be omitted.

Also provided is an optical communications link, comprising a contiguous series arrangement of N−1 fiber spans, $2 \leq N-1 < 10$, each fiber span i=1, ..., N−1 comprising a primary fiber line "i" characterized by an $i^{th}$ parameter set $[\alpha_i(z), \beta_{2,i}(z), (\gamma_g P)_i(z)]$ in which $\alpha_i(z)$ is a loss/gain coefficient profile, $\beta_{2,i}(z)$ is a second-order dispersion coefficient profile, and $(\gamma_g P)_i(z)$ is a first nonlinear coefficient-power product profile. The optical communications link further comprises an $N^{th}$ fiber span comprising a primary fiber line "N" characterized by an $N^{th}$ parameter set $[\alpha_N(z), \beta_{2,N}(z), (\gamma_g P)_N(z)]$. Along each primary fiber line "i" there is a relationship $R_i[\alpha_i(R_i z), -\beta_{2,i}(R_i z), (\gamma_g P)_i(R_i z)] \approx [\alpha_N(z), \beta_{2,N}(z), (\gamma_g P)_N(z)]$ with $R_i$ being a real scalar constant, for facilitating compensation of at least one nonlinear effect in an optical signal propagating through the N fiber spans.

Also provided is an optical communications link for guiding a wavelength-division multiplexed (WDM) optical signal between a first node and a second node, the optical signal having a plurality of channels. The optical communications link comprises a first fiber span receiving the optical signal from the first node and having Kerr nonlinear effects introducing ghost-pulse artifacts into at least one of the channels. The first fiber span is dispersion-compensated. The optical communications link further comprises a second fiber span transferring the optical signal to the second node and having Kerr nonlinear effects similar to those of the first fiber span introducing similar ghost-pulse artifacts into the at least one channel. A self-phase modulating device is positioned between the first and second fiber spans, comprising an array of self-phase modulators corresponding respectively to each of the plurality of channels configured such that the ghost-pulse artifacts introduced by the first fiber span are substantially reduced upon arrival of the optical signal at the second node.

Also provided is an optical fiber pair for use in a nonlinearity-managed optical communications link, comprising a first optical fiber and a second optical fiber. The first optical fiber is an off-the-shelf optical fiber designed for long-distance transport of optical signals with minimized attenuation. The first optical fiber is characterized by a first loss coefficient and a first second-order dispersion coefficient. The second optical fiber is designed for dispersion compensation and has a second loss coefficient and a second second-order dispersion coefficient. The second optical fiber is fabricated such that a first ratio of the second second-order dispersion coefficient to the second loss coefficient is substantially equal to a second ratio of the first second-order dispersion coefficient to the first loss coefficient oppositely signed.

Also provided is an integrated dispersion-compensating module for installation at an electrically powered amplifying location of an optical communications link having first and second transmission fiber lines of known first and second lengths, known first and second loss/gain coefficient profiles, and known first and second second-order dispersion coefficient profiles, respectively. The integrated dispersion-compensating module comprises a first dispersion-compensating fiber line that is connected to the first transmission fiber line and that has a third loss/gain coefficient profile designed for substantial scaled translational symmetry with the second loss/gain coefficient profile by a first constant. The first dispersion-compensating fiber line also has a third second-order dispersion coefficient profile designed for substantial scaled translational symmetry with the second second-order dispersion coefficient profile, oppositely signed, by the first constant. The integrated dispersion-compensating module further comprises a second dispersion-compensating fiber line connected to the first dispersion-compensating fiber line. The second dispersion-compensating fiber line has a length selected such that an accumulated dispersion associated with the first and second dispersion-compensating fiber lines compensates an accumulated dispersion associated with the first transmission fiber line within a first predetermined tolerance for the known length of the first transmission fiber line.

DETAILED DESCRIPTION

Figure 1:
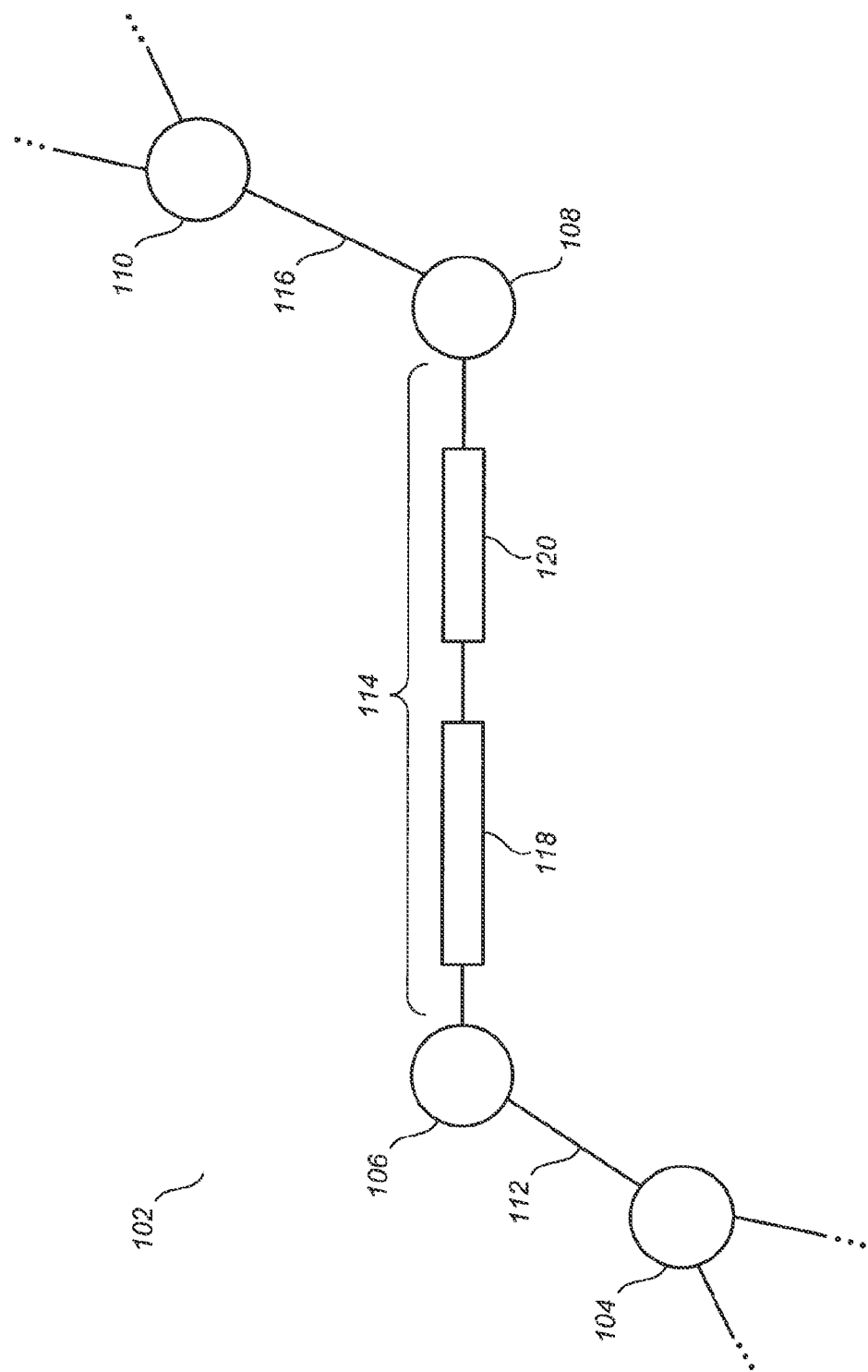
FIG. 1 illustrates an optical communications system according to an embodiment.

FIG. 1 illustrates an optical communications system 102 according to a preferred embodiment, comprising nodal elements 104, 106, 108, and 110 coupled by optical communication links 112, 114, and 116 as shown. As used herein, optical communications link or fiber optic link refers to a collection of optical elements including at least one optical fiber transporting an optical signal between an optical source and an optical receiver, while nodal element refers to an item comprising such optical source or receiver. One example of a nodal element is a telecommunications network node (e.g., as would be contained in a central office) that multiplexes/demultiplexes optical signals, converts the signals between electrical and optical form, and provides or processes the underlying data. Another example of a nodal element is a regenerative repeater. Typically, nodal elements are involved in electrical-to-optical and optical-to-electrical conversion, and therefore represent expensive hardware investments. Thus, generally speaking, it is desirable to provide optical communications links that allow for greater distances and higher data capacities between adjacent nodal elements. It is to be appreciated, however, that one or more of the nodal elements 104, 106, 108, and 110 may be all-optical in nature (e.g., all-optical computing networks, all-optical signal processors/conditioners, etc.) without departing from the scope of the embodiments.

Optical communications link 114 comprises a first fiber span 118 and a second fiber span 120. According to an embodiment, the first and second fiber spans 114 and 118 satisfy at least one of the scaled translational symmetry conditions that are described further herein such that, for an optical signal propagating from the nodal element 106 to the nodal element 108, the second fiber span 118 at least partially compensates for at least one nonlinearity introduced along the first fiber span 114.

Figure 2:
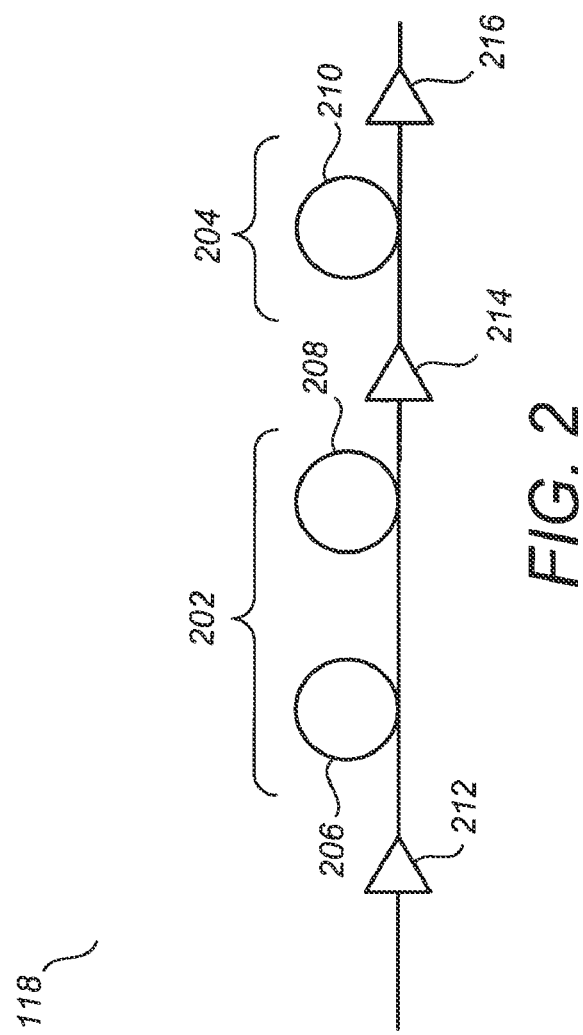
FIG. 2 illustrates an optical communications link according to an embodiment.

FIG. 2 illustrates the fiber span 118 according to an embodiment, comprising a fiber line 202 and a fiber line 204, the fiber line 202 having two fiber segments 206 and 208, the fiber line 204 having a single fiber segment 210. As used herein, fiber span refers to any contiguous portion of an optical communications link that includes at least one optical fiber, and may include amplifiers or other optical processing elements positioned therealong. As used herein, fiber line refers to a contiguous section of optical fiber positioned along a fiber span. A fiber line may itself comprise multiple fiber segments with different properties that are spliced together or otherwise connected to each other.

As illustrated in FIG. 2, fiber span 118 further comprises amplifiers 212, 214, and 216 connected in a manner that provides the required amplifications for accommodating one or more of the embodiments herein. In subsequent drawings and descriptions herein, it may be presumed that amplifiers are provided at various points along a fiber span providing the required amplifications, even where amplifiers are not explicitly drawn. One skilled in the art would readily be able to derive appropriate placements and parameters for such amplifiers, such as erbium-doped fiber amplifiers (EDFAs), Raman-pumped amplifiers, etc., in view of the present teachings, and therefore in many drawings and descriptions herein such amplifiers might be omitted for clarity in view of the particular context. It is to be appreciated that the configuration of FIG. 2 represents but one example of many different possibilities for the selection and sequencing of the various fiber lines, fiber segments, amplifiers, and other components according to the present teachings.

By way of example, as the above terms are used herein, a typical wide-area optical communications network having multiple nodal elements may comprises one or more optical communications links between any two adjacent nodal elements. A typical optical communications link may comprise one or more fiber spans. A typical fiber span may comprise one or more fiber lines, along with zero or more amplifiers or other optical processing elements. A typical fiber line may consist of a single, uniform fiber segment, or may comprise two or more fiber segments having different properties. For example, a fiber line may comprise a "standard" single-mode transmission fiber segment for propagating an optical signal across a large distance connected to a dispersion-compensating fiber segment.

Fiber lines and fiber segments may be characterized by a plurality of propagation characteristic profiles, each propagation characteristic profile describing the dependence of a propagation characteristic on a distance along the direction of propagation (termed the z-direction herein) from a reference point. One such propagation characteristic profile is a loss/gain coefficient profile $\alpha(z)$ describing the dependence of the loss-gain coefficient $\alpha$ on the distance along the direction of propagation from a reference point. Another such propagation characteristic profile is a second-order dispersion coefficient profile $\beta_2(z)$ describing the dependence of the second-order dispersion coefficient $\beta_2$ on the distance along the direction of propagation from a reference point. Another such propagation characteristic profile is a third-order dispersion coefficient profile $\beta_3(z)$ describing the dependence of the third-order dispersion coefficient $\beta_3$ on the distance along the direction of propagation from a reference point. For many optical fibers in use today, the $\alpha(z)$ and $\beta_2(z)$ profiles of the fiber segments are constant along the entire length of a fiber segment. If a fiber line contains two such adjacent fiber segments having different properties, the $\alpha(z)$ and $\beta_2(z)$ profiles of the fiber line can be represented by straight, horizontal plots with step-function variations at the z-location of the intersection of the two fiber segments. Advantageously, the embodiments herein are applicable for many different optical fiber types having constant or spatially varying propagation characteristics.

Other such propagation characteristic profiles include a Kerr coefficient profile $\gamma(z)$ and a Raman coefficient profile $g(z)$. Each of the Kerr coefficient profile $\gamma(z)$ and Raman coefficient profile $g(z)$ represents one type of a nonlinear coefficient profile that is referenced herein as $\gamma_g(z)$. For clarity, it is to be appreciated that $\gamma_g(z)$ represents a more generalized nonlinear coefficient profile and is not necessarily limited to the Kerr coefficient profile $\gamma(z)$. For example, in one or more of the embodiments, $\gamma_g(z)$ can correspond to the Raman coefficient profile $g(z)$ or to a different nonlinear coefficient that is important in any particular physical context. Another propagation characteristic profile, termed herein a nonlinear coefficient-power product profile having a symbol $(\gamma_g P)(z)$, comprises the product $\gamma_g(z)P(z)$, where $P(z)$ represents a power profile for the optical signal propagating down the fiber line/segment. If a particular fiber line/segment is not yet installed in an operational optical communications link, $(\gamma_g P)(z)$ can be defined by using a nominal, targeted, or otherwise computable power $P(z)$, such as can be yielded, for example, by assuming a value of $P_0$ at a reference location and computing $P(z)$ using the known loss/gain coefficient profile $\alpha(z)$.

Figure 3:
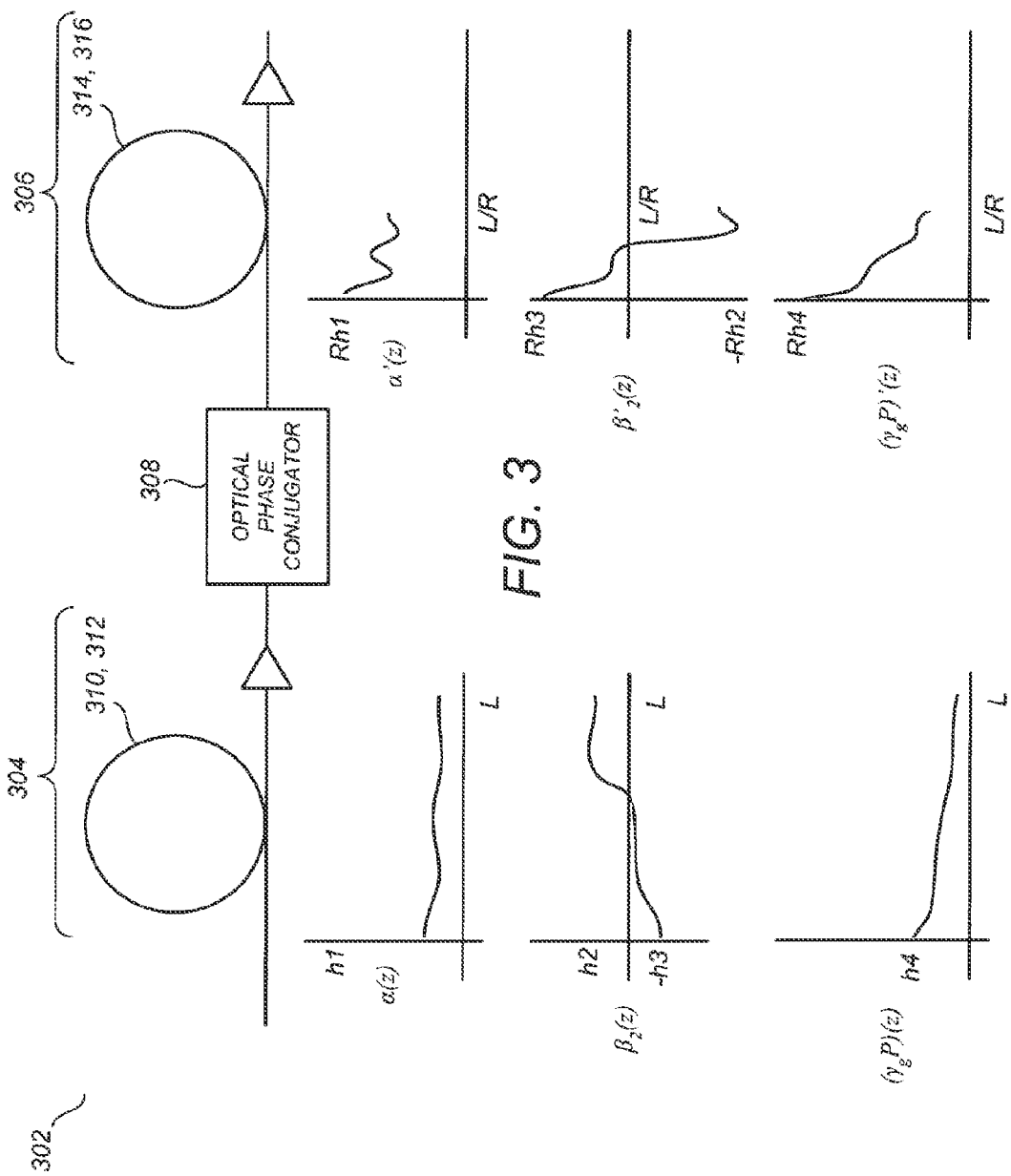
FIG. 3 illustrates an optical communications link and associated profiles according to an embodiment.

FIG. 3 illustrates an optical communications link 302 according to an embodiment that can be used, for example, in coupling between two adjacent ones of the nodal elements of FIG. 1, supra. Optical communications link 302 comprises a first fiber span 304 including a first fiber line 310. For the embodiment of FIG. 3, the first fiber line 310 simply comprises a single first fiber segment 312 although, notably, additional fiber segments can be included in the first fiber line 310 in other embodiments. The first fiber line 310 comprises a first loss/gain coefficient profile $\alpha(z)$, a first second-order dispersion coefficient profile $\beta_2(z)$, and a first nonlinear coefficient-power product profile $(\gamma_g P)(z)$, where z is measured from a reference point along the first fiber line 310 that may be located, but is not required to be located, at an input to the first fiber line 310. Optical communications link 302 further comprises a second fiber span 306 including a second fiber line 314. For the embodiment of FIG. 3, the second fiber line 314 simply comprises a single second fiber segment 316 although, notably, additional fiber segments can be included in the second fiber line 314 in other embodiments. The second fiber line 314 comprises a second loss/gain coefficient profile $\alpha'(z)$, a second second-order dispersion coefficient profile $\beta'_2(z)$, and a second nonlinear coefficient-power product profile $(\gamma_g P)'(z)$, where z is measured from a reference point along the second fiber line 314 that may be located, but is not required to be located, at an input to the second fiber line 314.

Optical communications link 302 further comprises an optical phase conjugator 308 optically coupled between the first fiber span 304 and the second fiber span 306, an optical signal received by the first fiber span 304 being propagated respectively through the first fiber span 304, the optical phase conjugator 308, and the second fiber span 306. Preferably, the first fiber span, the second fiber span, and the optical phase conjugator are configured such that, for locations lying along the first fiber segment 312 and the second fiber segment 316, $\alpha'(z)$ is in substantial scaled translational symmetry with $\alpha'(z)$ by a first constant R, $\beta'_2(z)$ is in substantial scaled translational symmetry with $\beta_2(z)$ oppositely signed (that is, with $-\beta_2(z)$) by the first constant R, and $(\gamma_g P)'(z)$ is in substantial scaled translational symmetry with $(\gamma_g P)(z)$ by the first constant R, whereby progressive compensation along the second fiber segment 316 of at least one nonlinearity introduced along the first fiber segment 312 is facilitated.

As indicated by the plots in FIG. 3, substantial scaled translational symmetry characterizes a relationship between a first profile and a second profile if the first profile, when expanded along a first axis by a scaling factor R and contracted along a second axis by the scaling factor R, is in substantial correspondence with said second profile. In the embodiment of FIG. 3, the first axis is the ordinate and the second axis is the abscissa of the profiles shown, although the scope of the present teachings is not necessarily so limited. Stated in algebraic vector form, the conditions illustrated in the plots of FIG. 3 can be expressed as $R[\alpha(Rz), -\beta_2(Rz), (\gamma_g P)(Rz)] \approx [\alpha'(z), \beta'_2(z), (\gamma_g P)'(z)]$.

The substantial correspondence between the scaled (and, effectively, translated) plots is generally more important near the inputs where $(\gamma_g P)(z)$ and $(\gamma_g P)'(z)$ are relatively high, and generally less important later on where $(\gamma_g P)(z)$ and $(\gamma_g P)'(z)$ are relatively low. The particular degrees of correspondence between the scaled and translated plots required for sufficient facilitation of nonlinear effect compensation would be readily determinable, whether empirically, by simulation, or by derivation, by a person skilled in the art without undue experimentation in view of the present disclosure.

In one embodiment the scaling factor R lies between about 0.05 and 20. In another embodiment, the scaling factor R lies between about 0.1 and 0.2 or between about 5 and 10. As indicated by the above-referenced value ranges for R, which are presented only by way of example and not by way of limitation, the length ratios between the first fiber segment 312 and the second fiber segment 316 can vary widely without departing from the scope of the embodiments. For R>1, the first fiber segment 312 is longer than the second fiber segment 316, while for R<1, the first fiber segment 312 is shorter than the second fiber segment 316. In other embodiments, the optical phase conjugator 308 can be omitted in conjunction with providing for certain optical signal phase relationships as described further hereinbelow. In one embodiment, the optical communications link 302 is configured such that a complex amplitude of the optical signal at an input to the second fiber line 314 is proportional to a complex conjugate of the complex amplitude of the optical signal at an input to the first fiber line 310.

In one embodiment, the first and second fiber lines 310 and 314 further comprise third-order dispersion coefficient profiles $\beta_3(z)$ and $\beta'_3(z)$ along that are in substantial scaled translational symmetry along the first and second segments 312 and 316. For this embodiment, each of the first and second fiber segments 312 and 316 may comprise a non-zero dispersion-shifted fiber (NZDSF) or, alternatively, may comprise a dispersion-shifted fiber (DSF).

In another embodiment, the constraint in which all three of $\alpha(z)$, $\beta(z)$ (oppositely signed), and $(\gamma P)(z)$ are in substantial scaled symmetry is at least partially relaxed. For this embodiment, the first and second fiber lines 310 and 314 are in substantial scaled translational symmetry by a common scaling factor R with respect to $\beta(z)$ (oppositely signed) and with respect to one or both of $\alpha(z)$ and $(\gamma P)(z)$ along the first and second fiber segments 312 and 316 for facilitating progressive compensation along the second fiber segment 316 of at least one nonlinearity introduced along the first fiber segment 312.

Figure 4:
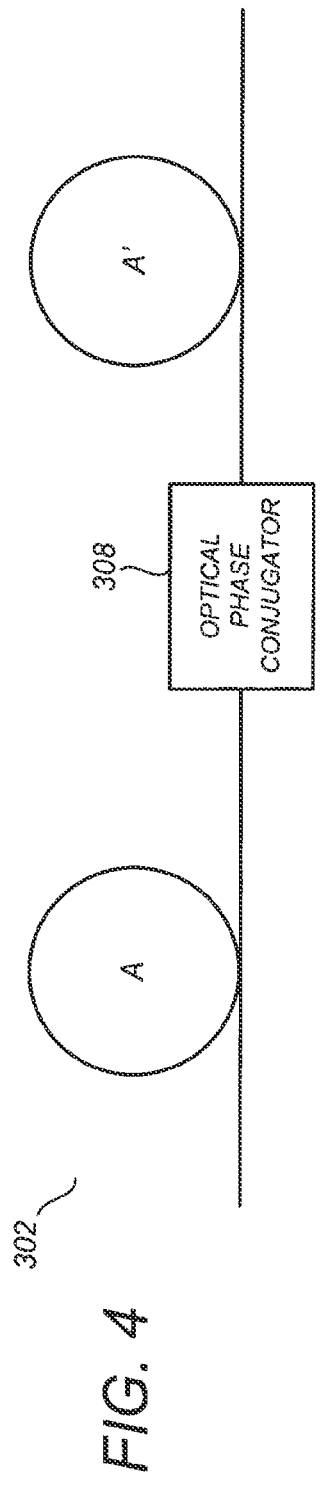
FIGS. 4-9 illustrate optical communications links according to one or more embodiments.

FIG. 4 illustrates the optical communications link 302 of FIG. 3 as redrawn with simplified notation for clarity in describing further embodiments herein. In addition to removing amplifiers for clarity, the fiber span/line/segment notations have been replaced by a simple lettering scheme in which a contiguous length of optical fiber is denoted by a loop and identified by a letter. Moreover, the presence of substantial scaled translational symmetry between two such contiguous lengths of optical fiber by a common scaling factor, whether it be with respect to all three of $\alpha(z)$, $\beta(z)$ (oppositely signed), and $(\gamma_g P)(z)$, or whether it be with respect to $\beta(z)$ (oppositely signed) and one or both of $\alpha(z)$ and $(\gamma_g P)(z)$, is denoted by prime symbol relationships (e.g., A and A'), and, without loss of generality, the acronymed phrase "ST symmetry" is used to identify such condition between A and A'. Finally, without loss of generality, the contiguous lengths of optical fibers A and A' are each referred to as fiber spans, it being understood that they are particular cases from the broader definition of fiber span supra applicable when a fiber span consists of a single fiber line that consists of a single fiber segment.

Figure 5:
Figure 6:
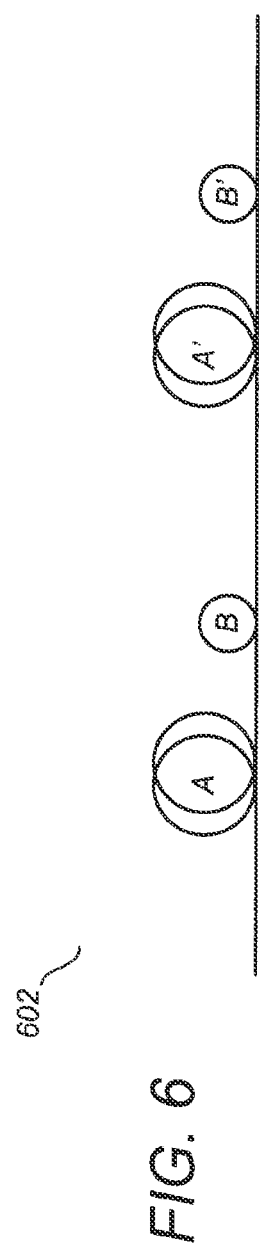

FIG. 5 illustrates an optical communications link 502 according to an alternative embodiment to that of FIGS. 3 and 4 having the optical phase conjugator omitted. FIG. 6 illustrates an optical communications link 602 with enhanced notations in which a larger double-looped symbol represents a transmission fiber (TF) span (e.g., that would extend over tens or hundreds of kilometers) and in which a smaller single-looped symbol represents a dispersion-compensating fiber (DCF). Optical communications link 602 comprises a TF span A in ST symmetry a TF span A', and a DCF span B in ST symmetry with a DCF span B'. The DCF span B is designed for compensating the dispersion accumulated in TF span A, while the DCF span B' is designed for compensating the dispersion accumulated in TF span A'.

Thus, advantageously, the fiber spans A, B, A', and B' are in a beneficial cross-paired relationship that simultaneously and efficiently achieves multiple goals. In particular, the TF span A is paired with DCF span B for dispersion compensation while at the same time being paired with TF span A' for nonlinearity compensation. Likewise, the TF span A' is paired with DCF span B' for dispersion compensation while at the same time being paired with TF span A for nonlinearity compensation.

Figure 7J:
Figure 7K:
Figure 7L:
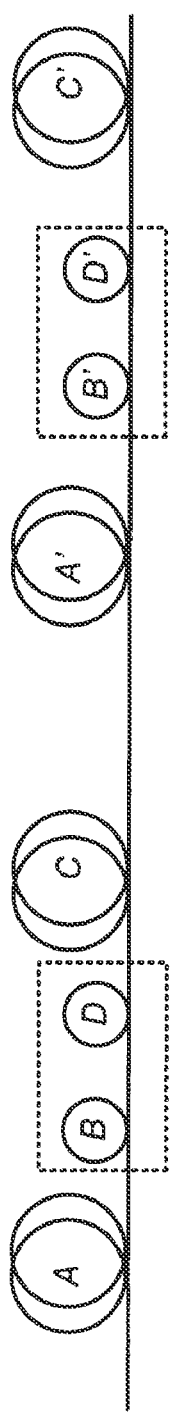
Figure 7M:
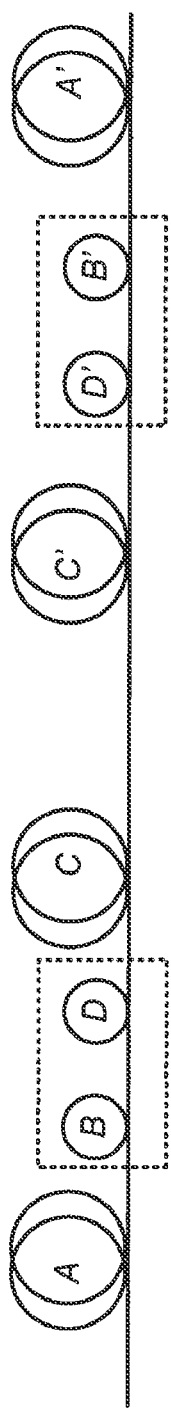

For clarity of presentation, the notations of FIGS. 7A-7O hereinbelow follow the notational schemes of FIG. 6. FIGS. 7A-7O illustrate, by way of example and not by way of limitation, some of the many advantageous ways that fiber spans in STS symmetry may be arranged in accordance with the present teachings, where boxes labeled OPC are optical phase conjugators and dotted-line boxes represent common dispersion-compensating module packages (or such packages co-located with an OPC), and where optical signals propagate from the left side to the right side of the page.

Referring to FIGS. 7A-7O, in one embodiment, each of the TF spans A, A'. C. and C' has a constant $\alpha(z)$ value that is less than 0.5 dB/km, and each of the DCF spans B, B', D, and D' has a constant $\alpha(z)$ value that is greater than 1.0 dB/km. The scaling factors associated with the different STS symmetry pairs can be different or they can be the same.

Figure 8:
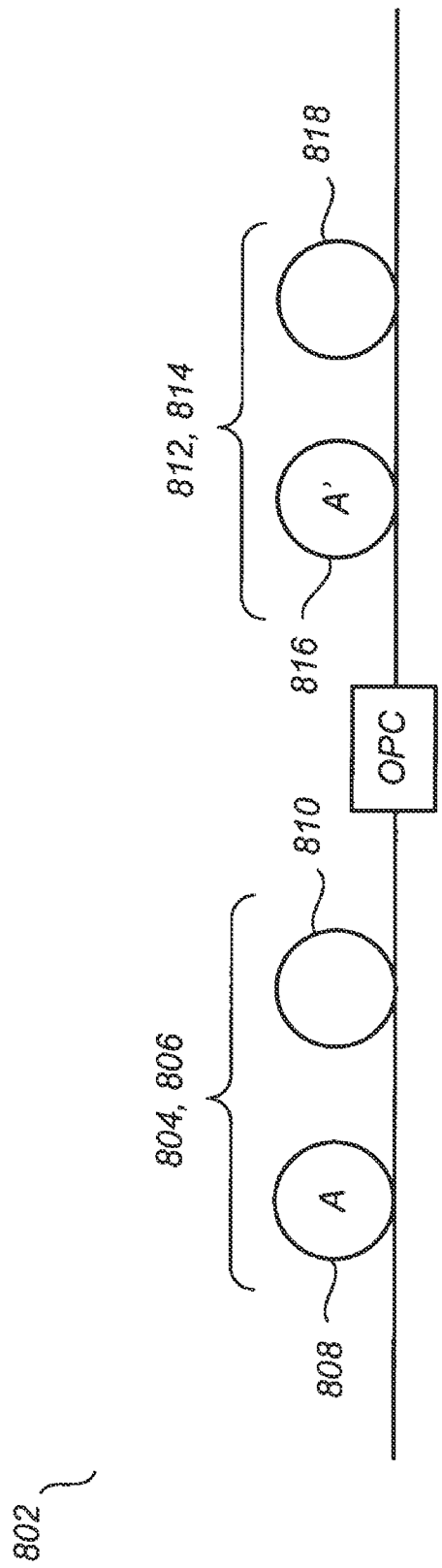

FIG. 8 illustrates, with reference back to the nomenclature and notational schemes of FIGS. 3-5, supra, an optical communications link 802 according to an embodiment comprising a fiber span 804 having a fiber line 806, the fiber line 806 having fiber segments 808 and 810. The optical communications link 802 further comprises an optical phase conjugator (that is omitted in other embodiments). The optical communications link 802 further comprises a fiber span 812 having a fiber line 814, the fiber line 814 having fiber segments 816 and 818 positioned as shown. For this embodiment, the fiber segments 808 and 816 are in substantial scaled translational symmetry, whether it be with respect to all three of $\alpha(z)$, $\beta(z)$ (oppositely signed), and $(\gamma_g P)(z)$, or whether it be with respect to $\beta(z)$ (oppositely signed) and one or both of $\alpha(z)$ and $(\gamma_g P)(z)$, but the fiber segments 810 and 818 do not satisfy such condition. However, the fiber segments 810 and 818 are connected to fiber segments 808 and 816 at "z" locations such that $(\gamma_g P)(z)$ is generally small compared to a maximum value thereof. This non-satisfaction does not substantially confound the progressive compensation in fiber line 814 of nonlinearities introduced in fiber line 806 because the power levels in the fiber segments 810 and 818 are relatively low and nonlinearities are therefore relatively small. However, this non-satisfaction is a constraint relaxation that accommodates length variations in the fiber lines 810 and 818 such that other system design goals including dispersion compensation can be properly addressed. In one embodiment, the fiber segments 810 and 818 are connected to fiber segments 808 and 816 at "z" locations where $(\gamma_g P)(z)$ is less than 10% of its maximum value along fiber segments 808 and 816.

A set of further embodiments is now described with respect to FIGS. 7A-7O and FIG. 8. For these embodiments, any combination of the ST symmetry pairs A-A', B-B', C-C', and D-D' in FIGS. 7A-7O can be replaced by a pair of spans similar to the spans 804 and 806 of FIG. 8 in which only the first fiber segments of the spans (e.g., 808 and 816) meet the ST symmetry condition while the second fiber segments of the spans (e.g., 810 and 818 do not meet an ST symmetry condition, provided that the second fiber segments connect to the first fiber segments where the value of $(\gamma_g P)(z)$ is generally small compared to a maximum value thereof. Thus, for example, letting X represent the fiber segment 810 and Y' represent the fiber segment 818, the ST symmetry pair C-C' in FIG. 7N can become the pair (C & X)-(C' & Y') according to these embodiments (and any combinations of C-C' and the other ST symmetry pairs) without confounding the nonlinearity compensation thereof. Benefits similar to those described with respect to FIG. 8 supra are advantageously achieved.

Figure 9:
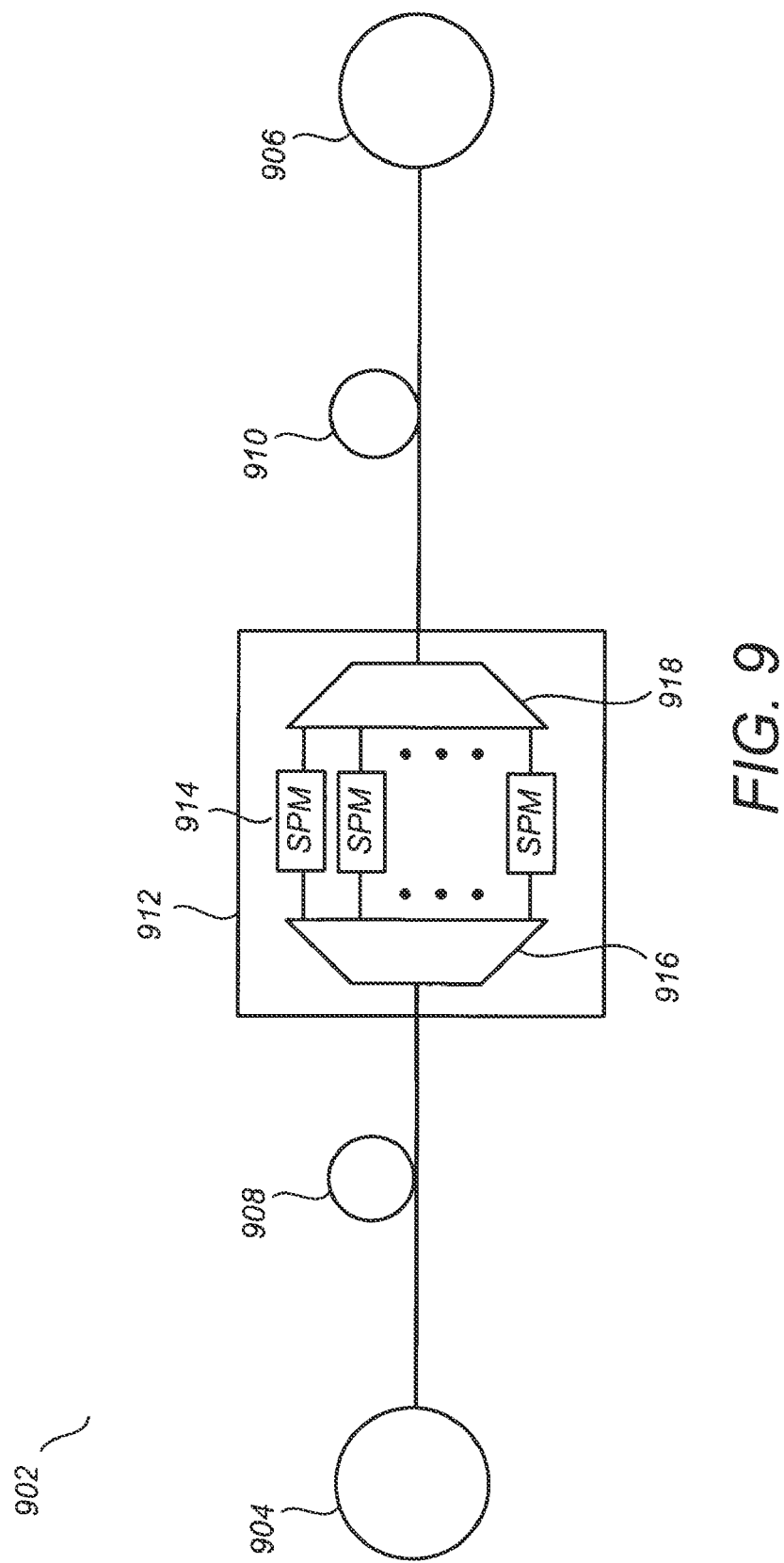

FIG. 9 illustrates an optical communications link 902 for guiding a wavelength-division multiplexed (WDM) optical signal between a first nodal element, or node, 904 and a second node 906, the optical signal having a plurality of channels. The optical communications link 902 comprises a first fiber span 908 receiving the optical signal from the first node 904 and having Kerr nonlinear effects introducing ghost-pulse artifacts into at least one of the channels. The first fiber span 908 is dispersion-compensated. The optical communications link 902 further comprises a second fiber span 910 transferring the optical signal to the second node 906 and having Kerr nonlinear effects similar to those of the first fiber span introducing similar ghost-pulse artifacts into the at least one channel. The optical communications link 902 further comprises a self-phase modulating device 912 positioned between the first and second fiber spans 908 and 910, comprising an array 914 of self-phase modulators corresponding respectively to each of the plurality of channels configured such that the ghost-pulse artifacts introduced by the first fiber span 908 are substantially reduced upon arrival of the optical signal at the second node 906. In one embodiment, each of the self-phase modulators introduces an approximately 180-degree phase shift at a nominal power level of pulse peaks of the associated channel. The self-phase modulating device further comprises a WDM demultiplexer 916 coupling the first fiber span 908 to the self-phase modulators and a WDM multiplexer 918 coupling the self-phase modulators to the second fiber span. The self-phase modulators can comprise Kerr optical fibers, nonlinear lithium niobate waveguides, and/or semiconductor optical amplifiers. Preferably, the self-phase modulators each have a dispersion characteristic designed to limit spectral broadening of the phase-modulated pulses in the associated channel.

Whereas many alterations and modifications of the present invention will no doubt become apparent to a person of ordinary skill in the art after having read the descriptions herein, it is to be understood that the particular embodiments shown and described by way of illustration are in no way intended to be considered limiting. Therefore, reference to the details of the embodiments are not intended to limit their scope, which is limited only by the scope of the claims set forth below.

Group-velocity dispersion and optical nonlinearity are the major limiting factors in high-speed long-distance fiber-optic transmissions [1, 2]. Dispersion-compensating fibers (DCFs) have been developed to offset the dispersion effects of transmission fibers over a wide frequency band. The most advanced DCFs are even capable of slope-matching compensation, namely, compensating the dispersion and the dispersion slope of the transmission fiber simultaneously [3, 4]. Nevertheless, DCFs could hardly be designed and fabricated to match exactly the dispersion and the slope of transmission fibers simultaneously. In general, it is difficult to perfectly compensate the fiber dispersion across a wide frequency band. There are always residual dispersion and higher order derivatives, even using the best slope-matching DCFs [5, 6, 7]. The significance of the residual dispersions increases as the total signal bandwidth becomes wider [8]. It has been proposed for some time that optical phase conjugation (OPC) may be employed in the middle of a transmission line to equalize the dispersion effect of the transmission fibers [9]. Furthermore, theoretical and experimental studies have proved the feasibility of using OPC to compensate the fiber nonlinearities, at least partially [10, 11, 12]. In the past, the application of OPC has been limited by the lack of performing conjugators that require low pump powers, operate over wide bandwidths, and suffer low penalties. Such technical difficulties and the inability of compensating the dispersion slope have been to OPC's disadvantage in competing with DCFs as dispersion compensators. However, it is noted that the performance of optical phase conjugators has recently been and will continue to be improved significantly [13, 14]. Moreover, we argue that OPC and modern DCFs may work together nicely to complement each other's functionalities. On one hand, transmission fibers and DCFs may be combined into fiber spans with zero dispersion slope, then OPC is able to equalize the residual dispersion and the slope of dispersion slope among such spans. On the other hand, the flexible designs and various choices in the dispersion parameters of specialty fibers, in particular DCFs, make it possible to construct fiber transmission lines that manifest "scaled symmetries" about the OPC, which are desired properties to effectively suppress fiber nonlinearities [15, 16, 17].

Based on the nonlinear Schrödinger equation (NLSE), it has been shown that OPC enables one fiber transmission line to propagate inversely (thus to restore) an optical signal that is nonlinearly distorted by the other, when the two fiber lines are mirror-symmetric about the OPC in the scaled sense [11, 15, 17]. Preliminary experiments have confirmed such effect of nonlinear compensation [11, 12]. Unfortunately, the mirror symmetry requires that the conjugating fiber segments have opposite loss/gain coefficients, the same sign for the second-order dispersions, and opposite third-order dispersions. These conditions are not conveniently fulfilled in many practical fiber transmission systems. In particular, a mirror-symmetric signal power profile is possible only when some transmission fibers are made distributively amplifying by means of distributed Raman pumping [18] or using distributed Er-doped fiber amplifiers (EDFAs) [19], so to obtain a constant net gain in correspondence to the loss coefficient of other fibers, or all fibers are rendered lossless. Recent experiments [20, 21, 22] have indeed demonstrated near constant-power or low power-excursion optical transmissions. However, there are still concerns of cost, reliability, and double-Rayleigh-scattering noise with distributive Raman amplification [18]. For any distributive amplifier, the loss of pump power makes it difficult to maintain a constant gain in a long transmission fiber. Consequently, the mismatch in signal power profiles degrades the result of nonlinear compensation. Yet another shortcoming of the previous schemes [11, 12] is that they do not compensate higher-order dispersions, which could turn into a significant limitation in wideband transmission systems. By contrast, a recently proposed method of nonlinearity compensation using scaled translational symmetry requires that the conjugating fiber segments have the same sign for the loss/gain coefficients, opposite second-order dispersions, and the same sign for the third-order dispersions [16, 17]. Such conditions are naturally satisfied, at least approximately, in conventional fiber transmission systems, where, for example, a standard single-mode fiber (SMF) may be paired with a DCF as conjugating counterparts. In Refs. [16, 17], we have briefly touched upon the basic idea and feasibility of nonlinearity compensation using scaled translational symmetry. In this paper, we shall present an extensive and systematic study of the theory and practical applications of scaled translational symmetry in fiber transmission systems for nonlinearity compensation. Most importantly, we demonstrate that the combination of scaled nonlinearity, translational symmetry, OPC, and slope-matching dispersion compensation makes our proposals of nonlinearity compensation rather practical and highly performing. The notion of scaling fiber nonlinearity is not entirely new. The concept was proposed and utilized by Watanabe et al. in their 1996 paper [11], which however was limited to the mirror-symmetric configuration, and presented embodiments using segmented fibers which might not be convenient to implement in practice. Even though we may be the first to emphasize the concept and importance of scaled translational symmetry to nonlinearity compensation in fiber transmission lines [16, 17], it was noted previously by Marhic et al. [23] that two fibers having opposite dispersions and with OPC in the middle may compensate each other's Kerr nonlinear effects. However, Ref. [23] did not discuss any practical embodiment, nor did it mention the scaling of nonlinearity which is indispensable for practically implementing translationally symmetric transmission lines. Both Refs. [11, 23] had the effect of dispersion-slope neglected, and did not worry about the Raman effect among wavelength-division multiplexed (WDM) channels. By contrast, this present paper strives for the most generality, and it might be one of the early proposals for optimizing fiber transmission systems by combining the necessary and available four elements, namely, scaled nonlinearity, translational symmetry, OPC, and slope-matching dispersion compensation. It is this combination that signifies the present work and makes our proposals of nonlinearity compensation rather practical and highly performing. Furthermore, it is found that even without OPC, the combination of the remaining three elements could still significantly improve the performance of fiber transmission lines. Two fiber spans in a scaled translational symmetry may cancel out their intra-channel nonlinear effects to a large extent, and a significant reduction of intra-channel nonlinear effects may be achieved in a long-distance transmission line consisting of multiple pairs of scaled translationally symmetric spans.

Basics of Dispersive and Nonlinear Wave Propagation in Fibers

The eigenvalue solution of Maxwell's equations in a single-mode fiber determines its transverse model function and propagation constant $\beta(\omega)$ as a function of the optical frequency $\omega$[24, 25]. When a fiber transmission line is heterogeneous along its length, the propagation constant could also depend on the longitudinal position z in the line, and may be denoted as $\beta(z, \omega)$. The slow-varying envelope form, $$E(z,t) = A(z,t) \exp[i \int^z \beta_0(\zeta) d\zeta - i\omega_0 t], \quad (1)$$

with $$\beta_0(z) \stackrel{def}{=} \beta(\omega_0, z),$$

is often employed to represent an optical signal, which may be of a single time-division multiplexed channel or a superposition of multiple WDM channels. The evolution of the envelope A(z,t) in an optical fiber of length L is governed by the nonlinear Schrödinger equation (NLSE) [17, 25], $$\frac{\partial A(z,t)}{\partial z} + \sum_{k=2}^{+\infty} \frac{i^{k-1}\beta_k(z)}{k!}\left(\frac{\partial}{\partial t}\right)^k A(z,t) + \frac{\alpha(z)}{2} A(z,t) = \quad (2)$$

$$i\gamma(z)|A(z,t)|^2 A(z,t) + i[g(z,t) \otimes |A(z,t)|^2]A(z,t),$$

$\forall z \in [0, L]$, in the retarded reference frame with the origin z=0 moving along the fiber at the signal group-velocity. In the above equation, $\alpha(z)$ is the loss/gain coefficient, $$\beta_k(z) \stackrel{def}{=} \frac{1}{2\beta_0(z)} \frac{\partial^k [\beta^2(\omega, z)]}{\partial \omega^k}\bigg|_{\omega=\omega_0}, \forall k \geq 2, \quad (3)$$

are the z-dependent dispersion coefficients of various orders [26], $\gamma(z)$ is the Kerr nonlinear coefficient of the fiber, g(z,t) is the impulse response of the Raman gain spectrum, and $\otimes$ denotes the convolution operation [17]. Note that all fiber parameters are allowed to be z-dependent, that is, they may vary along the length of the fiber. Because of the definition in terms of derivatives, $\beta_2$ may be called the second-order dispersion (often simply dispersion in short), while $\beta_3$ may be called the third-order dispersion, so on and so forth. The engineering community has used the term dispersion for the parameter $D = dv_g^{-1}/d\lambda$, namely, the derivative of the inverse of group-velocity with respect to the optical wavelength, and dispersion slope for $S = dD/d\lambda$[1]. Although $\beta_2$ and D are directly proportional to each other, the relationship between $\beta_3$ and S is more complicated. To avoid confusion, this paper adopts the convention that dispersion and second-order dispersion are synonyms for the $\beta_2$ parameter, while dispersion slope and third-order dispersion refer to the same $\beta_3$ parameter, and similarly the slope of dispersion slope is the same thing as the fourth-order dispersion $\beta_4$.

Had there been no nonlinearity, namely $\gamma(z) = g(z,t) = 0$, equation (2) would reduce to, $$\frac{\partial A(z,t)}{\partial z} + \sum_{k=2}^{+\infty} \frac{i^{k-1}\beta_k(z)}{k!}\left(\frac{\partial}{\partial t}\right)^k A(z,t) + \frac{\alpha(z)}{2} A(z,t) = 0, \quad (4)$$

which could be solved analytically using, for example, the method of Fourier transform. Let F denote the linear operator of Fourier transform, a signal A(z,t) in the time domain can be represented equivalently in the frequency domain by, $$\tilde{A}(z, \omega) \stackrel{def}{=} FA(z, t) \quad (5)$$

$$= \int A(z, t) \exp(i\omega t) dt$$

$$= \int E(z, t) \exp[i(\omega_0 + \omega)t] dt.$$

Through a linear fiber, a signal $\tilde{A}(z_1, \omega)$ at $z=z_1$ would be transformed into $\tilde{A}(z_2, \omega) = H(z_1, z_2, \omega)\tilde{A}(z_1, \omega)$ at $z_2 \geq z_1$, where the transfer function $H(z_1, z_2, \omega)$ is defined as, $$H(z_1, z_2, \omega) \stackrel{def}{=} \exp\left[i \sum_{k=2}^{+\infty} \frac{\omega^k}{k!} \int_{z_1}^{z_2} \beta_k(z) dz - \frac{1}{2} \int_{z_1}^{z_2} \alpha(z) dz\right]. \quad (6)$$

In the time domain, the signals are related linearly as $A(z_2, t) = P(z_1, z_2) A(z_1, t)$, with the linear operator $P(z_1, z_2)$ given by, $$P(z_1, z_2) \stackrel{def}{=} F^{-1} H(z_1, z_2, \omega) F. \quad (7)$$

Namely, $P(z_1, z_2)$ is the concatenation of three linear operations: firstly Fourier transform is applied to convert a temporal signal into a frequency signal, which is then multiplied by the transfer function $H(z_1, z_2, \omega)$, finally the resulted signal is inverse Fourier transformed back into the time domain. In terms of the impulse response, $$h(z_1, z_2, t) \stackrel{def}{=} F^{-1}[H(z_1, z_2, \omega)], \quad (8)$$

$P(z_1, z_2)$ may also be represented as, $$P(z_1, z_2) = h(z_1, z_2, t) \otimes, \quad (9)$$

where $\otimes$ denotes functional convolution. That is, the action of $P(z_1, z_2)$ on a time-dependent function is to convolve the function with the impulse response. All linear operators $P(z_1, z_2)$ with $z_1 \leq z_2$, also known as propagators, form a semigroup [27] for the linear evolution governed by equation (4).

However, the existence of nonlinear terms in equation (2) makes the equation much more difficult to solve. Fortunately, when the signal power is not very high so that the nonlinearity is weak and may be treated as perturbation, the output from a nonlinear fiber line may be represented by a linearly dispersed version of the input, plus nonlinear distortions expanded in power series of the nonlinear coefficients [28]. In practical transmission lines, although the end-to-end response of a long link may be highly nonlinear due to the accumulation of nonlinearity through many fiber spans, the nonlinear perturbation terms of higher orders than the first are usually negligibly small within each fiber span. Up to the first-order perturbation, the signal $A(z_2,t)$ as a result of nonlinear propagation of a signal $A(z_1,t)$ from $z_1$ to $z_2 \geq z_1$, may be approximated using, $$A_0(z_2, t) = P(z_1, z_2) A(z_1, t), \tag{10}$$

$$A_1(z_2, t) = \int_{z_1}^{z_2} P(z, z_2) \{i\gamma(z)|A_0(z,t)|^2 A_0(z,t) + i[g(z,t) \otimes |A_0(z,t)|^2] A_0(z,t)\} dz, \tag{11}$$

where $A(z_2,t) \approx A_0(z_2,t)$ amounts to the zeroth-order approximation which neglects the fiber nonlinearity completely, whereas the result of first-order approximation $A(z_2,t) \approx A_0(z_2,t) + A_1(z_2,t)$ accounts in addition for the lowest-order nonlinear products integrated over the fiber length. The term $A_1(\bullet,t)$ is called the first-order perturbation because it is linearly proportional to the nonlinear coefficients $\gamma(\bullet)$ and $g(\bullet,t)$.

Principles of Dispersion and Nonlinearity Compensation Using OPC

Dispersion equalization by OPC may be explained nicely using transfer functions in the frequency domain [29]. Optical signals at a fixed position in a fiber, possibly of many channels wavelength-division multiplexed together, may be described by a total electrical field $E(t) = A(t) \exp(-i\omega_0 t)$, with the position parameter omitted. The signals are fully represented by the slow-varying envelope $A(t)$, or equivalently, by the Fourier transform of the envelope $\tilde{A}(\omega) = FA(t)$. Leaving aside the loss/gain and neglecting the nonlinearities, the linear dispersive effect of a fiber transmission line is described by a multiplicative transfer function, $$H(\omega) = \exp\left(i \sum_{k=2}^{+\infty} \frac{b_k \omega^k}{k!}\right), \tag{12}$$

with $$b_k = \int \beta_k(z) dz, \quad \forall k \geq 2, \tag{13}$$

being the dispersions accumulated along the fiber length, and the dispersion parameters $\{\beta_k\}_{k\geq 2}$ being defined as in equation (3). A fiber line with such dispersion parameters transforms a signal $\tilde{A}(\omega)$ into $H(\omega)\tilde{A}(\omega)$, while OPC acts as a linear operator that changes the same signal into $OPC[\tilde{A}(\omega)] = \tilde{A}^*(-\omega)$. Consider two fiber transmission lines that are not necessarily identical, but nevertheless have accumulated dispersions satisfying the conditions, $$b_k^R = (-1)^k b_k^L, \quad \forall k \geq 2, \tag{14}$$

so that $H_R(\omega) = H_L(-\omega)$, where the super- and sub-scripts L, R are used to distinguish the two fiber lines on the left and right respectively. When OPC is performed in the middle of the two fiber lines, the entire setup transforms an input signal $\tilde{A}(\omega)$ into, $$H_R(\omega) OPC[H_L(\omega) \tilde{A}(\omega)] = H_R(\omega) H^*_L(-\omega) \tilde{A}^*(-\omega) = \tilde{A}^*(-\omega). \tag{15}$$

If $\tilde{A}(\omega)$ is the Fourier transform of $A(t)$, then the output signal $\tilde{A}^*(-\omega)$ corresponds to $A^*(t)$ in the time domain, which is an undistorted replica of the input signal $A(t)$ up to complex conjugation. This proves that the dispersion of a transmission line with OPC in the middle may be compensated over a wide bandwidth, when the dispersion coefficients of the odd orders on the two sides of OPC, $b_{2k+1}^L$ and $b_{2k+1}^R$ with $k \geq 1$, in particular the third-order dispersions $b_3^L$ and $b_3^R$, are both compensated to zero, or they are exactly opposite to each other, while the even-order dispersion coefficients are the same on both sides. If a link has $b_3^R = -b_3^L$, or even $b_3^R = b_3^L = 0$, then it is compensated at least up to and including the fourth-order dispersion $b_4$. It is worth pointing out that the center frequency of the signal band may be shifted by the OPC from $\omega_0^L$ on the left side to $\omega_0^R$ on the right side, $\omega_0^L \neq \omega_0^R$, and the dispersion parameters on the two sides of OPC are defined with respect to the corresponding center frequencies.

Figure 10:
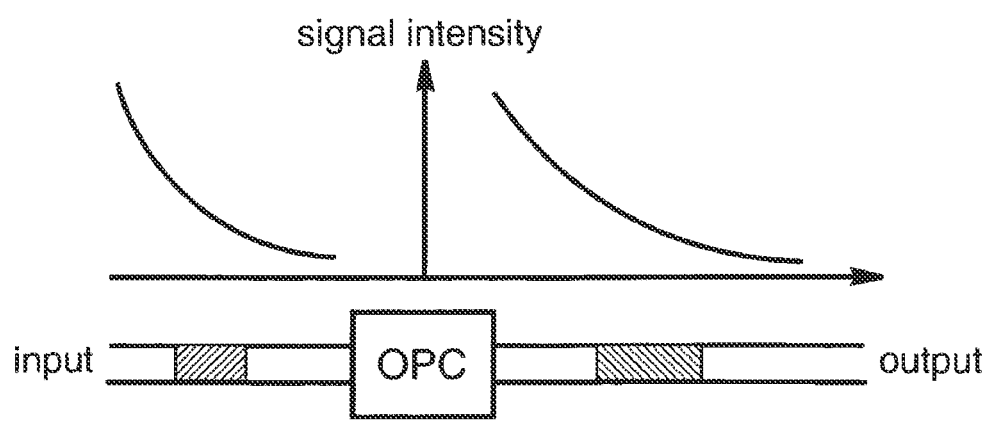
FIG. 10 illustrates two fiber spans in translational symmetry about an optical phase conjugator, the shaded areas represent two typical fiber segments that are in scaled translational symmetry about the conjugator.
Figure 11:
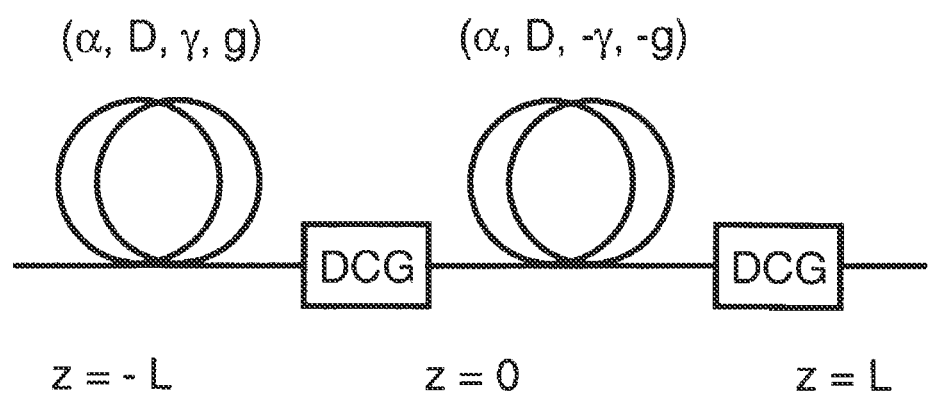
FIG. 11 illustrates the cascade of two fiber lines with opposite nonlinear coefficients but identical linear parameters of dispersion and loss/gain, DCG=dispersion compensation and gain.

To compensate the nonlinearity of transmission fibers, our method of using scaled translational symmetry [16, 17] requires that the conjugating fiber segments have the same sign for the loss/gain coefficients, opposite second-order dispersions, and the same sign for the third-order dispersions. Such conditions are naturally satisfied, at least approximately, in conventional fiber transmission systems, where, for example, an SMF may be paired with a DCF as conjugating counterparts. The symmetry is in the scaled sense, because the lengths of the fibers and the corresponding fiber parameters, including the fiber loss coefficients and dispersions, as well as the Kerr and Raman nonlinear coefficients, are all in proportion, and the proportional ratio may not be 1. The symmetry is translational, because the curves of signal power variation along the fiber keep the similar shape, albeit scaled, when translated from the left to the right side of OPC, as depicted in FIG. 10, so do the curves of any above-mentioned fiber parameter if plotted against the fiber length. The fundamental discovery is that two fiber lines translationally symmetric about the OPC are able to cancel each other's nonlinearities up to the first-order perturbation. To understand the principle, imagine two fiber lines with opposite nonlinear coefficients but identical linear parameters of dispersion and loss/gain. It turns out that the nonlinear effects of the two are compensated up to the first-order perturbation, when they are used in cascade as shown in FIG. 11. The first fiber stretching from $z = -L$ to $z = 0$ is a real, physical one with parameters $\alpha(z)$, $\{\beta_k(z)\}_{k \geq 2}$, $\gamma(z)$, $g(z,\bullet)$, so that the signal propagation in which is governed by, $$\frac{\partial A(z,t)}{\partial z} + \sum_{k=2}^{+\infty} \frac{i^{k-1} \beta_k(z)}{k!} \left(\frac{\partial}{\partial t}\right)^k A(z,t) + \frac{\alpha(z)}{2} A(z,t) = i\gamma(z)|A(z,t)|^2 A(z,t) + i[g(z,t) \otimes |A(z,t)|^2] A(z,t), \tag{16}$$

$-L \leq z \leq 0$. The other is a fictitious fiber stretching from $z=0$ to $z=L$, with parameters $\alpha'(z)$, $\{\beta'_k(z)\}_{k \geq 2}$, $\gamma'(z)$, $g'(z,\bullet)$ satisfying, $$\alpha'(z) = \alpha(z-L), \tag{17}$$

$$\beta'_k(z) = \beta_k(z-L), \forall k \geq 2, \tag{18}$$

$$\gamma'(z) = -\gamma(z-L), \tag{19}$$

$$g'(z,t) = -g(z-L,t), \forall t \in (-\infty, +\infty), \tag{20}$$

∀z∈[0, L]. Note that the fictitious fiber may be unphysical because of the oppositely signed nonlinear coefficients γ' and g' [30]. The signal propagation in this fictitious fiber obeys the following NLSE, $$\frac{\partial A'(z,t)}{\partial z} + \sum_{k=2}^{+\infty} \frac{i^{k-1}\beta'_k(z)}{k!}\left(\frac{\partial}{\partial t}\right)^k A'(z,t) + \frac{\alpha'(z)}{2}A'(z,t) = \quad (21)$$

$$i\gamma'(z)|A'(z,t)|^2 A'(z,t) + i[g'(z,t) \otimes |A'(z,t)|^2]A'(z,t),$$

Figure 12:
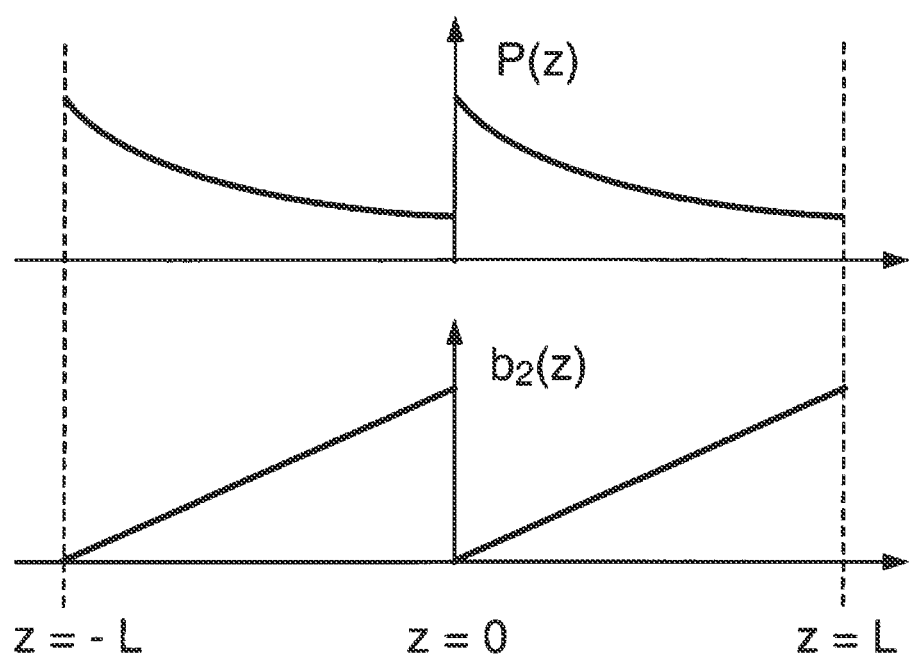
FIG. 12 illustrates the signal power and dispersion maps for a series of two fiber lines with opposite nonlinear coefficients but identical linear parameters of dispersion and loss/gain.

$0 \leq z \leq L$. FIG. 12 shows the signal power and dispersion maps in the series of two fiber lines. It is obvious from equations (6-11) and (17-20) that the two fiber lines would induce opposite first-order nonlinear distortions to otherwise the same linear signal propagation (zeroth-order approximation), because the two linear propagators $P(z_1-L,z_2-L)$ and $P(z_1,z_2)$ are exactly the same, for all $z_1 \in [0,L]$ and all $z_2 \in [z_1,L]$, while the Kerr nonlinear coefficients γ(z−L) and γ'(z), as well as the Raman coefficients g(z−L,•) and g'(z,•), are exactly opposite-valued, for all z∈[0,L]. If the overall dispersion of each fiber line is compensated to zero and the signal loss is made up by linear optical amplifiers, then the same perturbation argument may be applied to the two lines in cascade to show that the fiber nonlinearity is annihilated up to the first-order perturbation. The problem is that an optical fiber with negative nonlinear coefficients may be only fictitious. It does not exist naturally.

Figure 13:
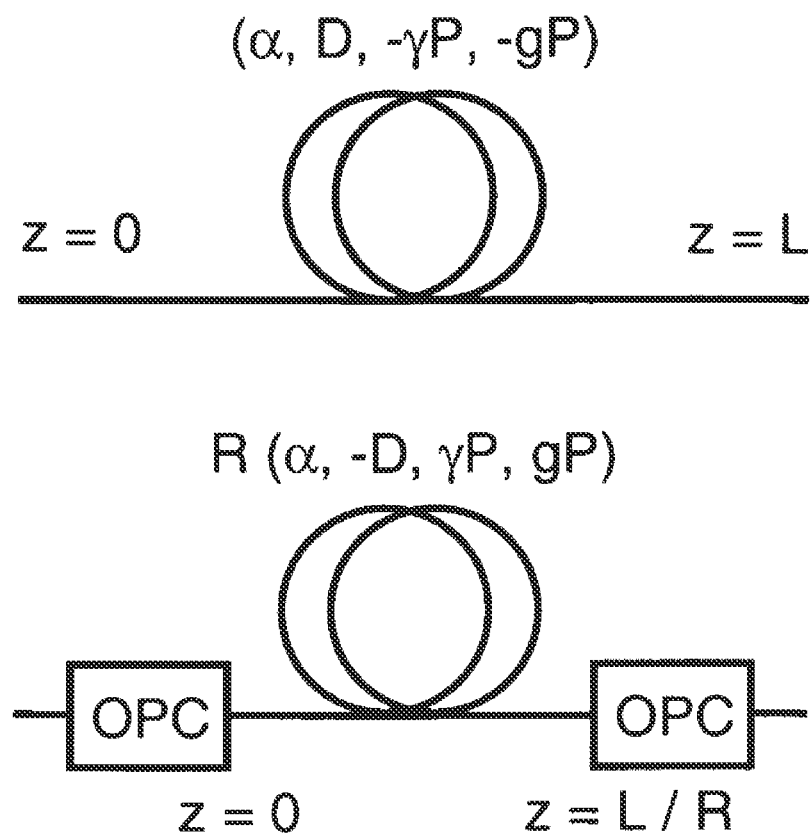
FIG. 13 illustrates that the functionality of a fictitious fiber with negative nonlinearities may be realized equivalently by a conventional fiber with positive nonlinearities with the help of OPC.

For a fictitious fiber of length L and with parameters as those in equation (21), the Kerr nonlinear coefficient γ' is negative-valued, and the Raman gain g is reversed, or called "negative" as well [30], in the sense that it induces optical power flow from lower to higher frequencies, which obviously will not happen normally. Fortunately, such fictitious fiber may be simulated by an ordinary fiber with the help of OPC, as depicted in FIG. 13. An ordinary fiber of length L/R may be found with parameters α", $\{\beta''_k\}_{k \geq 2}$, γ", g" satisfying the following rules of scaling, $$\alpha''(z) = R\alpha'(Rz), \quad (22)$$

$$\beta''_k(z) = (-1)^{k-1} R\beta'_k(Rz), \forall k \geq 2, \quad (23)$$

$$\gamma''(z) = -Q\gamma'(Rz), \quad (24)$$

$$g''(z,t) = -Qg'(Rz,t), \forall t \in (-\infty, +\infty), \quad (25)$$

∀z∈[0,L/R], where R>0, Q>0 are scaling factors. In this ordinary fiber, the NLSE of signal propagation is, $$\frac{\partial A''(z,t)}{\partial z} + \sum_{k=2}^{+\infty} \frac{i^{k-1}\beta''_k(z)}{k!}\left(\frac{\partial}{\partial t}\right)^k A''(z,t) + \frac{\alpha''(z)}{2}A''(z,t) = \quad (26)$$

$$i\gamma''(z)|A''(z,t)|^2 A''(z,t) + i[g''(z,t) \otimes |A''(z,t)|^2]A''(z,t).$$

∀z∈[0,L/R]. That is, with the substitution of parameters according to equations (22-25), $$\frac{\partial A''(z,t)}{R\partial z} + \sum_{k=2}^{+\infty} \frac{(-i)^{k-1}\beta'_k(Rz)}{k!}\left(\frac{\partial}{\partial t}\right)^k A''(z,t) + \frac{\alpha'(Rz)}{2}A''(z,t) = \quad (27)$$

$$-iQR^{-1}\gamma'(Rz)|A''(z,t)|^2 A''(z,t) -$$
$$iQR^{-1}[g'(Rz,t) \otimes |A''(z,t)|^2]A''(z,t),$$

∀z∈[0,L/R]. After a further substitution, $$A''(z,t) = e^{i\theta}(R/Q)^{1/2}[A'(Rz,t)]^*, \quad (28)$$

with θ∈R being an arbitrary phase, then a change of variable Rz→z, and finally taking the complex conjugate of the whole equation, equation (27) becomes mathematically identical to equation (21). Equation (28) is actually the scaling rule for the signal amplitudes. The physical implication is that, if a signal A'(0,t) is injected into the fictitious fiber and the complex conjugate signal $e^{i\theta}(R/Q)^{1/2}[A'(0,t)]^*$ is fed to the ordinary fiber, then the signal at any point z∈[0,L/R] in the ordinary fiber is $e^{i\theta}(R/Q)^{1/2}[A'(Rz,t)]^*$, which is $e^{i\theta}(R/Q)^{1/2}$ times the complex conjugate of the signal at the scaled position Rz in the fictitious fiber. In particular, the output signals are A'(L,t) and $e^{i\theta}(R/Q)^{1/2}[A'(L,t)]^*$ from the fictitious and the ordinary fibers respectively. Except for scaling the signal power by a factor R/Q, the ordinary fiber with two phase conjugators installed at its two ends performs exactly the same dispersive and nonlinear signal transformation as the fictitious fiber. Such equivalence is illustrated in FIG. 13. In practice, the phase conjugator at the output end of the ordinary fiber may be omitted, as most applications would not differentiate between a signal and its complex conjugate. Replacing the fictitious fiber with negative nonlinearities in FIG. 11 by such scaled ordinary fiber with OPC attached at the input end, one arrives at a nonlinearity-compensating setup using all physical components/devices: an optical phase conjugator in the middle, an ordinary fiber on the left side stretching from z=−L to z=0 with parameters α(z), $\{\beta_k(z)\}_{k \geq 2}$, γ(z), g(z,•), and an ordinary fiber on the right side stretching from z=0 to z=L/R with parameters α"(z), $\{\beta''_k(z)\}_{k \geq 2}$, γ"(z), g"(z,•). It follows from equations (17-20) and (22-25) that the parameters of the two fibers are related as, $$\alpha''(z) = R\alpha(Rz-L), \quad (29)$$

$$\beta''_k(z) = (-1)^{k-1} R\beta_k(Rz-L), \forall k \geq 2, \quad (30)$$

$$\gamma''(z) = Q\gamma(Rz-L), \quad (31)$$

$$g''(z,t) = Qg(Rz-L,t), \forall t \in (-\infty, +\infty), \quad (32)$$

∀z∈[0,L/R]. Equations (29-32) are called the scaling rules for two fibers to form a translational symmetry in the scaled sense about an optical phase conjugator [16, 17]. In order for two fiber lines in scaled translational symmetry to compensate their nonlinearities up to the first-order perturbation, it is further required that the input signals A(−L,t) and A"(0,t) at the beginning of the two fiber lines satisfy the following, $$A''(0,t) = e^{i\theta}(R/Q)^{1/2}[A(-L,t)]^*, \quad (33)$$

where θ∈R is an arbitrary phase. Equation (33) may be regarded as the scaling rule for the input signals to the fibers.

The analysis has convinced us that OPC may help to compensate fiber nonlinearities between two transmission lines that are in scaled translational symmetry. It should be emphasized that the fiber line on each side of OPC does not necessarily consist of only one fiber span, and the signal intensity does not have to evolve monotonically either. The simple setup used above should only be regarded as an example for illustration and mathematical convenience. The proposed method of nonlinear compensation works fine when each side of the OPC consists of multiple fiber spans with optical amplifiers in between repeating the signal power. In which case, each fiber on one side should be paired with a scaled translationally symmetric counterpart on the other side, with the parameters and input signals of the fiber pair satisfying the similar scaling rules as in equations (29-33). Because most fibers do not start or end at $z=0$ in a transmission line consisting of many spans, the scaling rules for them would be similar to equations (29-33) but with the position coordinates suitably adjusted. Furthermore, the scaling ratios may vary from one pair of fibers to another. Put in words, the scaling rules for scaled translational symmetries between pairs of fiber segments require that each pair of fiber segments have the same sign for the loss/gain coefficients, opposite second-order dispersions, the same sign for the third-order dispersions, and the same positive-valued nonlinear coefficients [30]. Moreover, a fiber may have its linear parameters scaled by a common factor and its nonlinear coefficients scaled by another factor, then the length of the fiber may be scaled inversely proportional to the linear parameters, and the signal power may be adjusted accordingly to yield the same strength of nonlinear interactions. The conditions of "the same sign for loss coefficients and opposite signs for the second-order dispersions" are naturally satisfied by the transmission fibers and DCFs used in conventional transmission systems. Another fact, simple but crucially important for practical applications, is that nonlinear effects are significant only in portions of fibers where the signal power is high. When scaling fiber parameters and signal amplitudes to have two fiber spans inducing the same or compensating nonlinear effects, it is only necessary to make sure that the scaling rules of equations (29-32) and (33) are fulfilled in portions of fibers experiencing high levels of signal power. Elsewhere, the scaling rules may be loosened or neglected when the signal power is low. Relaxing the scaling rules in portions of fibers carrying low-power signals makes it much easier to find practical and commercially available fibers with suitable dispersion characteristics to manage the accumulated dispersions of individual spans.

With such scaling of nonlinearities [16, 17], both the Kerr and Raman nonlinearities may be suppressed simultaneously if a proportional relation is maintained between the $\gamma$ and g parameters as in the scaling rules of equations (31) and (32). When equations (31) and (32) can not be fulfilled simultaneously, either the Kerr or the Raman nonlinearity may be primarily targeted for compensation depending upon the actual application. For a translational symmetry between two fibers with opposite dispersions, the scaling rule of equation (29) requires the same sign for the loss/gain coefficients of the two fibers, which is a convenient condition to meet by the natural fiber losses. This is in contrast to the mirror symmetry between two fiber segments that requires an amplifying segment correspond to a lossy one and vice versa. Fibers may be designed and fabricated with the requirements of scaled symmetry taken into consideration. For a given piece of fiber, the loss coefficient may need to be intentionally increased to meet the scaling rule. The extra loss may be induced by, for example, doping the fiber preform with erbium, or transition metals, or other impurities [32, 33], macro-bending [24] the fiber or writing long-period Bragg gratings into the fiber for scattering losses. Macro-bending may be built in a lumped fiber module having the fiber coiled tightly with a suitable radius. Also discrete fiber coils or Bragg gratings for light attenuation may be implemented periodically along the length of a fiber to approximate a continuous uniform loss coefficient. More sophisticatedly, Raman pumps may be employed to induce gain or loss to the optical signals depending upon the pump frequencies being higher or lower than the signal band, so to alter the effective gain/loss coefficient of the fiber. Even though it is rather difficult to change the dispersion of a given fiber, OPC is capable of shifting the center frequency of the signal band, which can fine-tune the effective dispersion at the center of the signal band, so long as the fiber has a non-zero dispersion slope. Even though most fibers are made of similar materials with similar nonlinear susceptibilities, their guided-wave nonlinear coefficients measured in $W^{-1}km^{-1}$ could be quite different due to the wide variation of modal sizes. Unless the ratio of nonlinear coefficients matches the ratio of dispersions, the signal powers in two conjugate fibers may have to differ by several dB as required by the scaling rule of equation (33) for scaled translational symmetry. Alternatively, by taking advantage of the additivity of the first-order nonlinear perturbations, it is possible to adjust the signal powers in different fiber spans only slightly, such that one span of a highly-nonlinear type may compensate several fiber spans of another type with weaker nonlinearity. This method may be called "one-for-many" (in terms of fiber spans) nonlinearity compensation.

It should be noted that the suitability of compensating nonlinearities among lossy fibers does not exclude the method of translational symmetry from applying to systems with amplifying fibers due to Raman pumping [18, 20, 21, 22] or rare-earth-element doping [19]. The scaled translationally symmetric method applies to these systems equally well, provided that an amplifying fiber is brought into translational symmetry with respect to another fiber with gain. In fact, if two fibers with their intrinsic loss coefficients satisfying the scaling rule of equation (29), then the power of the Raman pumps (forward or backward) to them may be adjusted properly to yield effective gain/loss coefficients satisfying the same rule of equation (29). In particular, Raman pumped DCFs [34, 35, 36] may be conveniently tuned translationally symmetric to a Raman pumped transmission fiber. For systems suffering considerable nonlinear penalties originated from long EDFAs [37], the penalties may be largely suppressed by arranging the amplifiers into conjugate pairs with scaled translational symmetry about the OPC. The nonlinear and gain coefficients as well as the signal amplitudes in the amplifying fibers should obey the scaling rules. If the dispersions of the amplifying fibers are not negligible, they should be designed to satisfy the scaling rules as well. Finally, it is also necessary to note the limitation of nonlinearity compensation using scaled translational symmetry. That is, the method can only compensate the first-order nonlinear interactions among the optical signals. The higher-order nonlinear products are not compensated, nor is the nonlinear mixing between transmitted signals and amplifier noise. The accumulation of uncompensated higher-order nonlinearities and nonlinear signal-noise mixing would eventually upper-bound the amount of signal power permitted in the transmission fibers, so to limit the obtainable signal-to-noise ratio, and ultimately limit the product of data capacity and transmission distance.

Optimal Setups of Fiber-optic Transmission Lines

Having established the basic principles of dispersion equalization and nonlinearity compensation using OPC and scaled translational symmetry, we shall now discuss practical designs of fiber systems for long-distance transmissions, with realistic (commercially available) DCFs and transmission fibers that are optimally configured according to the basic principles of simultaneous compensation of dispersion and nonlinearity. A long-distance transmission line may consist of many fiber spans, each of which may have transmission and dispersion-compensating fibers. Two fibers with opposite (second-order) dispersions may be tuned translationally symmetric to each other about a phase conjugator. For optimal nonlinearity compensation, the fiber parameters and the signal amplitudes should be adjusted to meet the conditions of translational symmetry, often approximately, not exactly, because of the dispersion slopes [17]. In particular, if one fiber span has a positive-dispersion (+D) fiber followed by a negative-dispersion (−D) fiber, then the counterpart span has to place the −D fiber before the +D fiber, in order to achieve an approximate translational symmetry between the two fiber spans. Even though the +D and −D fibers are usually made of similar materials with similar nonlinear susceptibilities, their guided-wave nonlinear coefficients measured in $W^{-1}km^{-1}$ could be quite different due to the wide variation of modal sizes. Unless the ratio of nonlinear coefficients matches the ratio of dispersions, the signal powers in two conjugate fibers may have to differ by several dB as required by the scaling rule of equation (33) for scaled translational symmetry.

Should it be desired to have a similar level of signal powers into the nonlinearity-compensating +D and −D fibers, one may adjust the signal powers in the +D and −D fibers only slightly, such that one span of a type with stronger nonlinearity generates an amount of nonlinearity that is equivalent to an integral multiple of the amount of nonlinearity generated in one span of another type with weaker nonlinearity. If each span with weaker nonlinearity is dispersion-compensated to have approximately zero accumulated dispersion, then each of several such spans in cascade may indeed induce approximately the same nonlinear response. And for a reasonably small number of such cascaded spans with weaker nonlinearity, the overall nonlinear response may still be well approximated by a combined first-order perturbation, which is just the sum of the first-order perturbations of individual spans. Then one may take advantage of the additivity of the first-order perturbations and have one span of the type with stronger nonlinearity to compensate several spans of the other type with weaker nonlinearity. This method may be called "one-for-many" (in terms of fiber spans) nonlinearity compensation. More generally, it is possible to have several spans of the type with weaker nonlinearity generating different amounts of nonlinearity, still their combined nonlinearity may be compensated by one span of the type with stronger nonlinearity, so long as all nonlinearities remain perturbative and the first-order perturbation of the span with stronger nonlinearity is equivalent to the sum of the first-order perturbations of the spans with weaker nonlinearity.

When two fiber spans are translationally symmetric about an optical phase conjugator, one span is called the translational conjugate to the other about the OPC. As argued above, OPC is able to equalize dispersion terms of even orders. So the two parts of a transmission line with OPC in the middle should have the same amount of $b_2$ and $b_4$ but exactly opposite $b_3$, or both have $b_3=0$, where the b-parameters are defined as in equation (13). In a more restrictive implementation, each fiber span consists of +D and −D fibers with the total dispersion slope compensated to zero. The +D and −D fibers in each span need not to match their dispersions and slopes simultaneously. It is sufficient to fully compensate $b_3$, while leaving residual even-order terms $b_2$ and $b_4$. Two conjugate spans would be configured as +D followed by −D fibers and −D followed by +D fibers respectively. The two conjugate spans may not be exactly the same in length, and they may have different integrated dispersion terms of the even orders. The two types of fiber spans may be mixed and alternated on each side of the OPC, so that the two sides have the same total $b_2$ and $b_4$. Transmission lines with such dispersion map are convenient to plan and manage. However, it is worth noting that the present method of simultaneous compensation of dispersion and nonlinearity applies to other dispersion maps as well, where the period of dispersion compensation may be either shorter [38] or longer [39] than the amplifier spacing, or the fiber spans may vary widely in length and configuration. Regardless of the dispersion map, wide-band dispersion compensation could be achieved in a transmission line with middle-span OPC so long as the dispersion terms of the two sides of OPC satisfy equation (14), and pairs of conjugate fiber spans could have their nonlinearities cancelled up to the first-order perturbation as long as the scaling rules of equations (29-32) and (33) are well observed.

As a result of power loss, the nonlinear response of a long piece of fiber becomes insensitive to the actual fiber length so long as it far exceeds the effective length [2] defined as $L_{eff}=1/\alpha$, where $\alpha$ is the loss coefficient in units of $km^{-1}$ (instead of dB/km). So fiber spans consisting of the same types of fibers but with different lengths could contribute the same amount of nonlinearity if the input powers are the same. That all fiber spans contribute the same nonlinearity makes it possible for various spans with different lengths to compensate each other's nonlinear effects. It is straightforward to extend the same argument to fiber spans with scaled parameters and signal powers. The conclusion is that scaled fiber spans could induce approximately the same amount of nonlinear distortion to optical signals, which is insensitive to the varying span lengths, provided that the length of each fiber span is much longer than its own effective length defined by the inverse of the loss coefficient. The main advantage is that the fiber spans may be arbitrarily paired for nonlinearity compensation regardless of their actual lengths. This is good news to terrestrial and festoon systems, where the span-distance between repeaters may vary according to the geographical conditions. When the dispersion of each fiber span is not fully compensated, it is desirable to fine-tune (slightly elongate or shorten) the lengths of transmission fibers or DCFs such that all spans have the same amount of residual dispersion. As a consequence, fiber spans of different lengths and possibly consisting of different types of fibers become truly equivalent in two all-important aspects of signal propagation: nonlinearity and accumulated dispersion. Certainly, if the above-mentioned method of "one-for-many" nonlinearity compensation is employed, the residual dispersion of the highly nonlinear span should also be multiplied by the same integer factor. Last but not least, when scaling fiber parameters and signal amplitudes to have two fiber spans inducing the same or compensating nonlinear effects, it is only necessary to make sure that the scaling rules of equations (29-32) and (33) are fulfilled in portions of fibers experiencing high levels of signal power. Elsewhere, the scaling rules may be loosened or neglected when the signal power is low.

Figure 14:
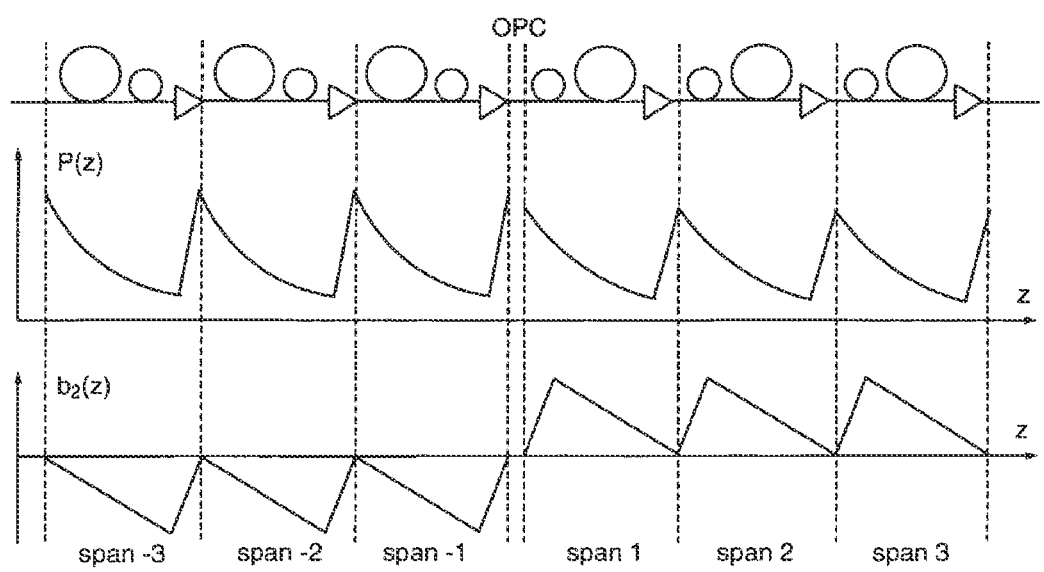
FIG. 14 illustrates a mirror-symmetric configuration of pairs of fiber spans in scaled translational symmetry, with the dispersion in each span compensated to zero. Top: schematic arrangement of fibers and amplifiers with respect to OPC. Middle: map of signal power P(z) along the propagation distance z. Bottom: map of accumulated dispersion b2(z) along the propagation distance z.

Despite the translational symmetry between the constituent fibers of two conjugate spans, it is advantageous to order many conjugate spans in a mirror-symmetric manner about the OPC, especially when all the spans are not identical. The local nonlinearity within each span is usually weak such that the nonlinear perturbations of higher orders than the first may be neglected, even though a strong nonlinearity may be accumulated through many fiber spans. Within the applicability of first-order perturbation for approximating the nonlinearity of each fiber span, it may be argued using mathematical induction that the nonlinearity of multiple spans in cascade is also compensated up to the first-order perturbation, because of the mirror-symmetric arrangement of fiber spans about the OPC. The spans may be labelled from left to right by $-N, \ldots, -2$, −1, 1, 2, . . . , N, with OPC located between span −1 and span 1. And one may denote by $z_0$ and $z'_0$ the beginning and end positions of the section of OPC, while labelling the beginning and end points of span n by $z_n$ and $z'_n$, where $z'_n = z_{n+1}$, $\forall n \in [-N, N-1]$. There may be three variations for a mirror-symmetric configuration of pairs of fiber spans in scaled translational symmetry, depending upon whether the dispersion in each span is compensated to zero, and if not, how the dispersion is managed. In the first case, all spans are compensated to zero dispersion, as shown in FIG. 14 for the case of N=3. It is required that, $\forall n \in [1,N]$, spans −n and n should be conjugate, that is translationally symmetric, to each other. The first-order nonlinear perturbations of spans 1 and −1 cancel each other due to the translational symmetry and the OPC, so the optical path from $z_{-1}$ to $z'_1$ is equivalent to an ideal linear transmission line with OPC in the middle, if higher-order nonlinear perturbations are neglected. It follows that the signal input to span 2 at $z_2$ is approximately the complex conjugate of that input to span −2 at $z_{-2}$, apart from the nonlinear perturbation due to span −2. So the translational symmetry between spans 2 and −2 about the OPC annihilates their nonlinearities up to the first-order perturbation. Using mathematical induction, assuming that the optical path from $z_{-n}$ to $z'_n$, $1 < n < N$, is equivalent to an ideal linear transmission line with OPC in the middle, then spans n+1 and −n−1 see input signals at $z_{n+1}$ and $z_{-n-1}$ that are approximately complex conjugate to each other, so their first-order nonlinear effects cancel each other out due to the translational symmetry and OPC. The optical path from $z_{-n-1}$ to $z'_{n+1}$ is linearized and equivalent to an ideal linear transmission line with OPC in the middle. This inductive argument applies as long as the accumulation of nonlinear perturbations of higher-orders than the first is still negligible and the nonlinear mixing of amplifier noise into signal hasn't grown significantly.

Figure 15:
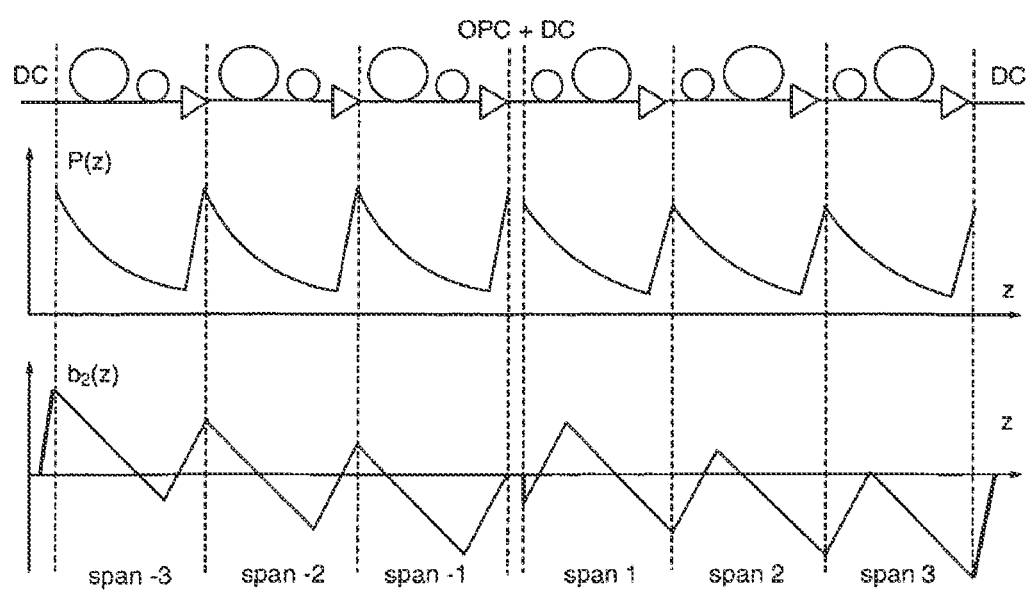
FIG. 15 illustrates a mirror-symmetric configuration of pairs of fiber spans in scaled translational symmetry, with non-zero residual dispersion in the spans. There are pre- and post-dispersion compensators (DCs), as well as a dispersion conditioner immediately after OPC. Top: schematic arrangement of fibers and amplifiers with respect to OPC. Middle: map of signal power P(z) along the propagation distance z. Bottom: map of accumulated dispersion b2(z) along the propagation distance z.
Figure 16:
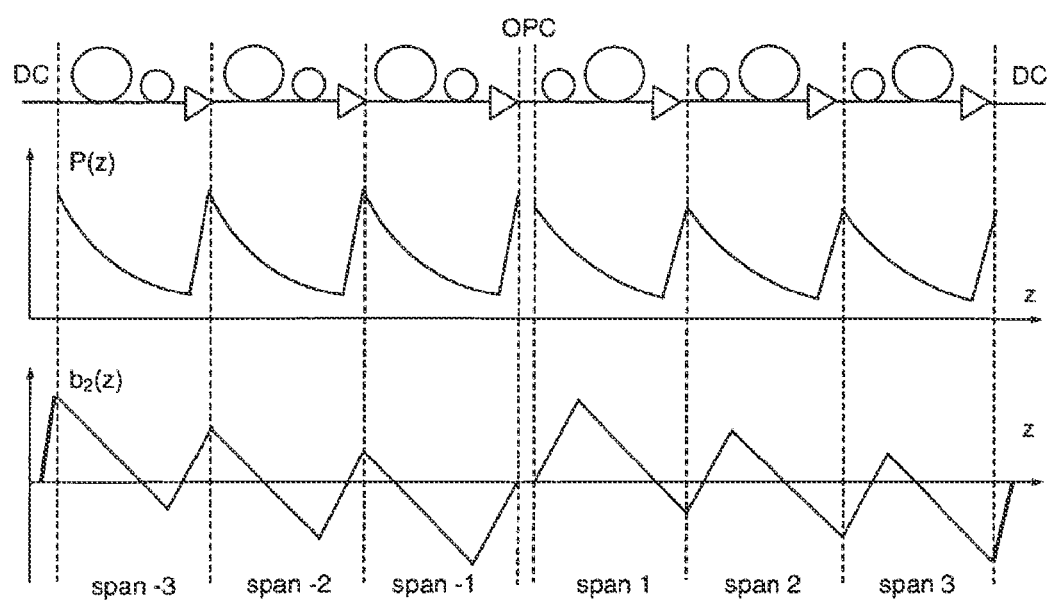
FIG. 16 illustrates a mirror-symmetric configuration of pairs of fiber spans in scaled translational symmetry, with non-zero residual dispersion in the spans. There are pre- and post-dispersion compensators (DCs) but no dispersion conditioner at the site of OPC. Top: schematic arrangement of fibers and amplifiers with respect to OPC. Middle: map of signal power P(z) along the propagation distance z. Bottom: map of accumulated dispersion b2(z) along the propagation distance z.

In the second case, the fiber spans may have non-zero residual dispersion, as shown in FIG. 15 for the case of N=3. It is required that, $\forall n \in [1,N]$, spans −n and n should be in a translational symmetry approximately, while the residual dispersion of span n−1 should be approximately the same as span −n, $\forall n \in [2,N]$. Pre- and post-dispersion compensators are employed to equalize the residual dispersion. The pre-dispersion may set the total dispersion to zero immediately before OPC, and a dispersion conditioner at the site of OPC ensures that the signal input to span 1 is approximately the complex conjugate of that input to span −1, apart from the nonlinear perturbation due to span −1. FIG. 15 shows a dispersion conditioner placed immediately after OPC, with the amount of dispersion equal to the residual dispersion in span −1. The three thicker line segments in the dispersion map represent the effects of the pre- and post-dispersion compensators as well as the dispersion conditioner. So the transmission line has been designed such that the accumulated dispersions from $z_{-n}$ to $z_n$, $n \in [1,N]$, are fully compensated by virtue of OPC, and for each $n \in [1,N]$, the fiber span from $z_{-n}$ to $z'_{-n}$ is translationally symmetric to the fiber span from $z_n$ to $z'_n$, namely, the parameters of the two fiber spans satisfy the scaling rules of equations (29-32), at least approximately. Leaving aside the fiber nonlinearity, such dispersion map ensures that the optical signals at $z_{-n}$ and $z_n$ are complex conjugate to each other, then the signal amplitudes may be properly scaled such that equation (33) is also satisfied. As a result, all conditions are fulfilled for the fiber spans from $z_{-n}$ to $z'_{-n}$ and from $z_n$ to $z'_n$ to compensate their fiber nonlinearities up to the first-order perturbation, for each $n \in [1,N]$. The first-order nonlinear perturbations of spans 1 and −1 cancel each other due to the translational symmetry and OPC, so the optical path from $z_{-1}$ to $z'_1$ is equivalent to an ideal linear transmission line with OPC in the middle and some accumulated dispersion at $z'_1$ due to span 1. Since this amount of dispersion is equal to that of span −2, the signal input to span 2 at $z_2$ is approximately the complex conjugate of that input to span −2 at $z_{-2}$, apart from the nonlinear perturbation due to span −2. So the translational symmetry between spans 2 and −2 about the OPC annihilates their nonlinearities up to the first-order perturbation. Using mathematical induction, assuming that the optical path from $z_{-n}$ to $z'_n$, $1 < n < N$, is equivalent to an ideal linear transmission line with OPC in the middle and accumulated dispersion at the right end due to span n, which is the same amount of residual dispersion as of span −n−1, then spans n+1 and −n−1 see input signals at $z_{n+1}$ and $z_{-n-1}$ that are approximately complex conjugate to each other, so their first-order nonlinear effects cancel each other out due to the translational symmetry and OPC. The optical path from $z_{-n-1}$ to $z'_{n+1}$ is linearized and equivalent to an ideal linear transmission line with OPC in the middle and the dispersion of span n+1 at the right end. In the third case, the fiber spans still have non-zero residual dispersion, but there is no dispersion conditioner placed immediately before or after OPC to compensate the residual dispersion of span −1. Instead, span 1 may play the role of the dispersion conditioner, and $\forall n \in [1,N]$, spans n and −n need to have the same amount of residual dispersion, while spans n and −n+1, $\forall n \in [2,N]$, should be in a scaled translational symmetry approximately to have their nonlinearities compensated up to the first-order perturbation. This is in contrast to the requirement of the second case. The configuration is shown in FIG. 16 for the case of N=3, where the two thicker line segments in the dispersion map represent the effects of the pre- and post-dispersion compensators. It may be shown using the same inductive argument that the transmission line is largely linearized, except that the nonlinear effects of spans 1 and −N, if any, are left uncompensated.

DCFs are widely used in modern fiber-optic transmission systems. A DCF may be coiled into a compact module at the amplifier site, or cabled as part of the transmission line. The performance of both types of DCFs has been greatly improved recently. There are now low-loss DCFs capable of (approximately) slope-matched dispersion compensation for various transmission fibers with different ratios of dispersion to dispersion-slope [3, 4], although there are always residual second-order and fourth-order dispersions after the slope is equalized [5, 6, 7]. For SMFs, namely standard single-mode fibers, the ratio of dispersion (D≈16 ps/nm/km @1550 nm) to dispersion slope (S≈0.055 ps/nm$^2$/km @1550 nm) is large, so that the relative change of dispersion is small across the signal band (≈40 nm in the C-band). The so-called reverse dispersion fibers (RDFs) are designed to compensate simultaneously the dispersion and dispersion slope of the SMFs. An RDF is not an ideal translational conjugate to an SMF, because their dispersion slopes do not obey the scaling rule of equation (30). However, their dispersions satisfy the corresponding scaling rule of equation (30) approximately, with only small deviations across the entire signal band (C or L). Therefore, a span having an SMF followed by an RDF on the left side of OPC may be brought into a translational symmetry, approximately, to a span having an RDF followed by an SMF on the right side of OPC, and vice versa. The two types of spans may be denoted by SMF+RDF and RDF+SMF respectively. The indication is that OPC may be installed in the middle of conventional transmission lines with no or minimal modifications to achieve simultaneous wide-band dispersion compensation and nonlinearity suppression. The only requirements are that the signal power levels should be properly set in the fiber spans, and the SMFs/RDFs should be suitably arranged, to meet the scaling rules of equations (29-32) and (33) approximately for the translational symmetry between each pair of conjugate fiber spans, and to order the conjugate pairs of spans mirror-symmetrically about the OPC. It is noted that a recent paper [40] has independently proposed the combination of slope-matching DCF and OPC to suppress simultaneously the third-order dispersion and sideband instability due to fiber nonlinearity. However, the work [40] was limited to a single-channel system, considered only the suppression of sideband instability as an intra-channel nonlinear effect, and did not recognize the importance of scaling the nonlinearity (especially the signal power) in different fibers. By contrast, our method applies to wide-band WDM systems as well and is capable of suppressing both intra- and inter-channel nonlinear interactions, being them Kerr- or Raman-originated. Most importantly, we emphasize the importance of the scaling rules of equations (29-32) and (33) for optimal nonlinearity compensation.

There have been RDFs [5, 7] with loss and dispersion coefficients comparable to those of SMFs, namely, $\alpha_{RDF} \approx \alpha_{SMF} \approx 0.2$ dB/km, $D_{RDF} \approx -D_{SMF} \approx -16$ ps/nm/km at about 1550 nm. However, the effective modal area of RDFs is usually small, for example, about 30 µm$^2$, which is far less than the about 80 µm$^2$ effective modal area of SMFs. Because the fiber nonlinear coefficients are inversely proportional to the effective modal area, the example RDF has Kerr and Raman nonlinear coefficients that are approximately 80/30≈2.7 times of those of SMFs, namely, $\gamma_{RDF} \approx 2.7\gamma_{SMF}$, $g_{RDF}(\cdot) \approx 2.7 g_{SMF}(\cdot)$. If the same level of signal power should be injected into the SMF+RDF and RDF+SMF spans, then the amount of nonlinearity generated by an RDF+SMF span would be about 2.7 times of that generated by an SMF+RDF span. Nevertheless, one may raise the input power to the RDF+SMF spans (relative to the input power to the SMF+RDF spans) by only 0.3/2.7≈10% to have one RDF+SMF span generates the equivalent amount of nonlinearity of, hence compensate the nonlinear effects of, three SMF+RDF spans. Alternatively, one may lower the input power to the RDF+SMF spans (relative to the input power to the SMF+RDF spans) by just 0.7/2.7≈26% to have one RDF+SMF span generates the equivalent amount of nonlinearity of, hence compensate the nonlinear effects of, two SMF+RDF spans. These are practical examples of the above-mentioned method of "one-for-many" nonlinear compensations.

Several non-zero dispersion-shifted fibers (NZDSFs) have also been developed for long-distance high-capacity transmissions. These fibers have reduced but non-zero dispersions across the operating band (C or L). Depending upon the sign of the dispersion (D in units of ps/nm/km), there are positive NZDSFs (+NZDSFs) and negative NZDSFs (-NZDSFs), but their dispersion-slopes are always positive. It becomes possible to bring a +NZDSF and a -NZDSF into a nearly perfect translational symmetry [41], because their oppositely signed dispersions and positively signed dispersion-slopes meet the exact requirements of the scaling rules of equation (30). The dispersion-slope of the NZDSFs may be compensated by negative-slope DCFs. The DCFs do not have to (could not indeed) compensate the dispersion and dispersion-slope simultaneously for both the positive and negative NZDSFs. It is sufficient to equalize the accumulated dispersion-slope to zero on each side of the OPC, then the two sides may cancel their accumulated non-zero dispersions of the second and the fourth orders through OPC. To form a nonlinearity-compensating translational symmetry between a +NZDSF span and a -NZDSF span, the accumulated dispersion should be properly managed to ensure that the input signals to the +NZDSF and -NZDSF fibers are complex conjugate to each other, which is a necessary condition for nonlinearity cancellation. As long as these requirements are satisfied, there is really no limit as to how much residual (second-order) dispersion may be accumulated in each fiber span as well as on each side of the OPC. It may be difficult to find a fiber translationally symmetric to the slope-compensating DCF, because of its high negative dispersion-slope. However, we note that it is only necessary to have a scaled translational symmetry formed between portions of fibers carrying high signal power, elsewhere, such as in the slope-compensating DCFs, the scaling rules may be neglected when the signal power is low and the nonlinearity is insignificant. If the slope-compensating DCFs are cabled, they may be placed near the end of fiber spans where the signal power is low. Or if the DCFs are coiled into modules and co-located with the amplifiers, the signal power inside may be controlled at a low level to avoid nonlinearity. To minimize the noise-figure penalty in such DCF modules, the DCF may be distributively Raman pumped [18, 34, 35], or earth-element doped and distributively pumped [19], or divided into multiple segments and power-repeated by a multi-stage EDFA. The conclusion is that the method of OPC-based simultaneous compensation of dispersion and nonlinearity is perfectly suitable for transmission systems employing NZDSFs, and highly effective nonlinearity suppression may be expected in such systems due to the nearly perfect translational symmetry between the +NZDSFs and -NZDSFs. Finally, in the limit of vanishing (second-order) dispersion at the center of the signal band, the +NZDSF and -NZDSF converge to the same dispersion-shifted fiber (DSF), which is translationally symmetric to itself. Two identical DSF spans on the two sides of OPC are in perfect translational symmetry to cancel their nonlinearity up to the first-order perturbation. Again the dispersion-slope may be equalized by a DCF with negative dispersion-slope, and the residual second-order dispersion may be arbitrarily valued. Suppressing fiber nonlinearity happens to be highly desired in DSF-based transmission lines, as DSFs are arguably the most susceptible to nonlinear impairments [2].

Simulation Results and Discussions

Figure 17:
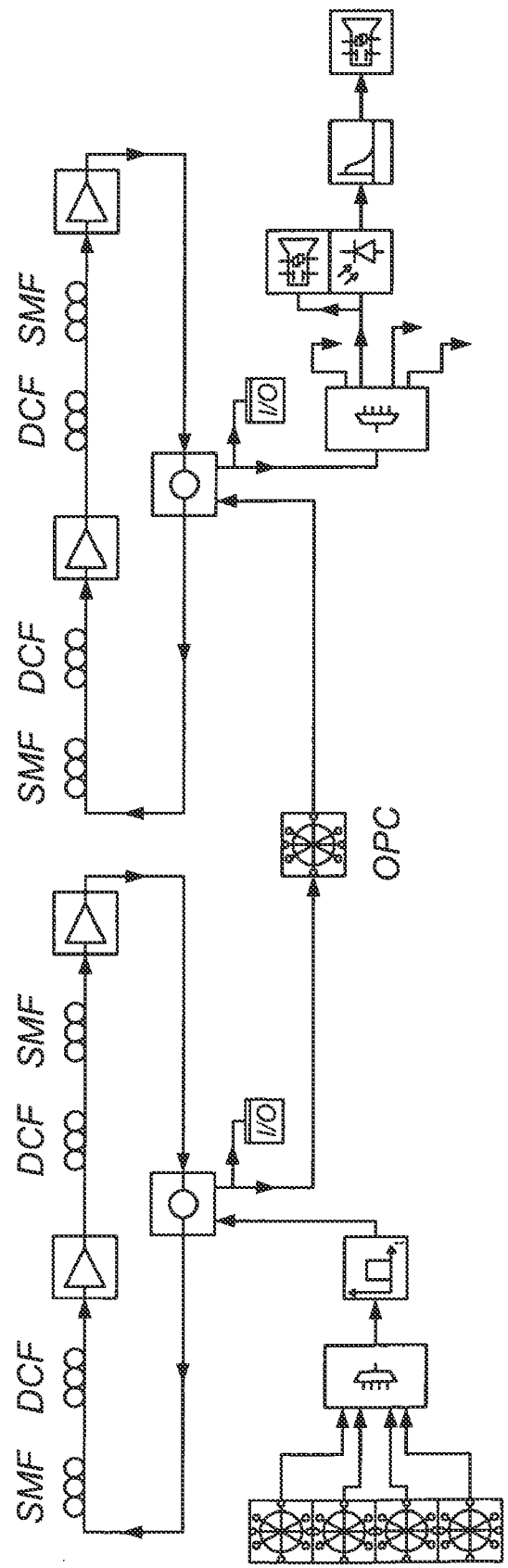
FIG. 17 illustrates a transmission line consisting of SMFs and slope-matching DCFs.
Figure 18:
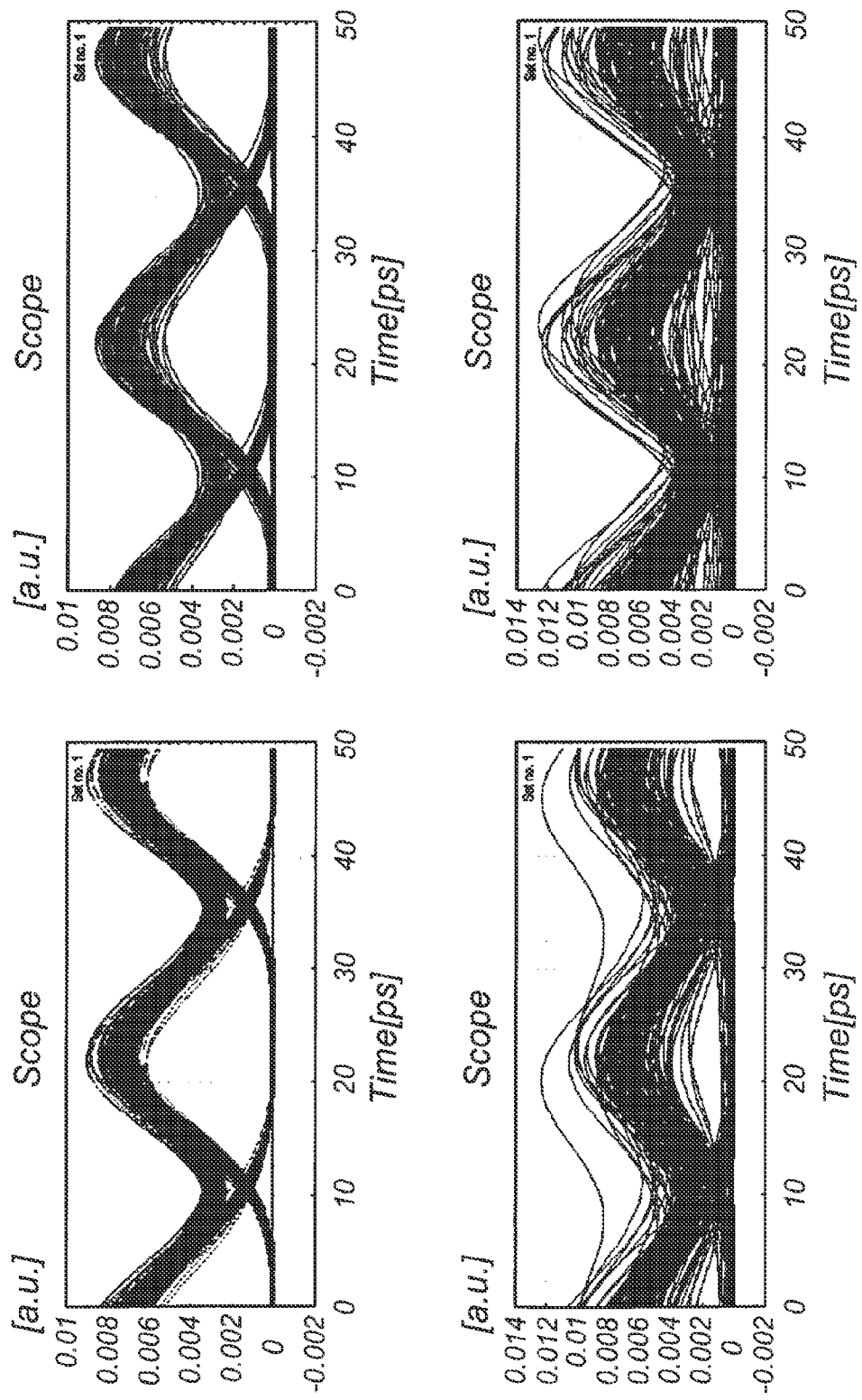
FIG. 18 illustrates received eye diagrams of the 2nd DEMUX channel. Top row: transmission results of the setup in FIG. 17. Top-left: fiber nonlinearity is OFF, the signal is only impaired by amplifier noise. Top-right: fiber nonlinearity is ON, the signal distortion is only increased slightly. Bottom row: transmission results when the setup is modified, and the fiber nonlinearity is always ON. Bottom-left: fiber lengths of and input powers to the two types of spans are exactly the same. Bottom-right: all fiber spans are identical in length and input signal power as well as the ordering of fibers (SMF followed by DCF).

To verify the proposed method of simultaneous compensation of dispersion and nonlinearity, we have carried out a series of numerical simulations using a commercial transmission simulator (VPItransmissionMaker™, Virtual Photonics Inc.). Reference [17] has presented an example of SMFs and DCF modules with nearly perfect match of dispersion and slope. Here we consider a practical setup of SMFs and cabled DCFs with residual dispersion, as shown in FIG. 17. One type of span consists of 50 km SMF followed by 50 km DCF. The SMF has loss coefficient $\alpha$=0.2 dB/km, effective mode area $A_{eff}$=80 µm$^2$, and dispersion parameters $\beta_2$=-20.5 ps$^2$/km, $\beta_3$=0.12 ps$^3$/km at 193.1 THz. The corresponding dispersion D=16 ps/nm/km and slope S=0.055 ps/nm$^2$/km. The DCF mimics a commercial RDF product [7], namely a reverse dispersion fiber, with parameters ($\alpha'$, $A'_{eff}$, $\beta'_2$, $\beta'_3$)=(0.2, 30, 18, -0.12), in the same units as for the SMF. The Kerr nonlinear index of silica $n_2$=2.6×10$^{-20}$ m$^2$/W. Practical DCFs often have a loss coefficient that is slightly higher than the SMFs, so the optimal design of the DCFs would have a dispersion $|D_{DCF}|$ slightly higher than $|D_{SMF}|$ proportionally according to the scaling rules of equations (29) and (30). The conjugate span has 40 km DCF followed by SMF of the same length. Due to the smaller modal area, a lower power is injected into the DCF to generate the compensating nonlinearity, in accordance with the scaling rule for signal amplitudes in equation (33). The shortened span length is to balance the noise figure between the two types of spans. The two span types are also intermixed on each side of the OPC to balance the residual dispersions. Alternatively, all fiber spans may be the same in length, but the signal power injected to the DCF+SMF spans should be ⅜ of that injected to the SMF+DCF spans, and the DCF+SMF spans would add more noise to the optical signal than the SMF+DCF spans. It is noted that the scaling rules are not obeyed at all in the second part of each span, that is, in the DCFs of SMF+DCF spans and in the SMFs of DCF+SMF spans. Fortunately, the second part of each span experiences low signal power, in which the nonlinear effect is negligible. Back to the setup of FIG. 17, where all EDFAs have the same noise figure of 5 dB, each fiber loop recirculates five times, that gives 1000 km worth of fiber transmission on each side of the OPC. The inputs are four 40 Gb/s WDM channels, return-to-zero (RZ) modulated with peak power 20 mW, channel spacing 200 GHz. Each RZ pulse generator consists of a continuous-wave laser followed by a zero-chirp modulator, which is over-driven to produce a pulse train with the amplitude proportional to cos $$\left(\frac{\pi}{2}\sin\pi\Omega t\right),$$

where $\Omega$ is the bit rate. Therefore the duty cycle of the pulses is 33%, if defined as the ratio of pulse full-width-half-maximum to the time interval between adjacent bits. The optical multiplexer and demultiplexer consist of Bessel filters of the 7th order with 3 dB bandwidth 80 GHz. The input data are simulated by pseudo random binary sequences of order 7, and the simulation time window covers 256 bits. The photo-detector is with responsivity 1.0 A/W and thermal noise 10.0 pA/√Hz. The electrical filter is 3rd order Bessel with 3 dB bandwidth 28 GHz. FIG. 18 shows the received eye diagrams of the second channel out of the demultiplexer (DEMUX). The top-right diagram shows the effect of nonlinearity compensation. For comparison, the result of a fictitious transmission where no fiber has any nonlinear effect is shown on the top-left of FIG. 18. To confirm that the suppression of nonlinearity is indeed due to the translational symmetry of conjugate spans about the OPC, the two diagrams at the bottom of FIG. 18 show simulation results of altered configurations: one setup has the same length of 50+50 km for and the same input power level to both the SMF+DCF and the DCF+SMF spans, the other has on both sides of OPC identical 100-km SMF+DCF spans carrying the same signal power. Both altered setups suffer from severe nonlinear impairments.

Figure 19:
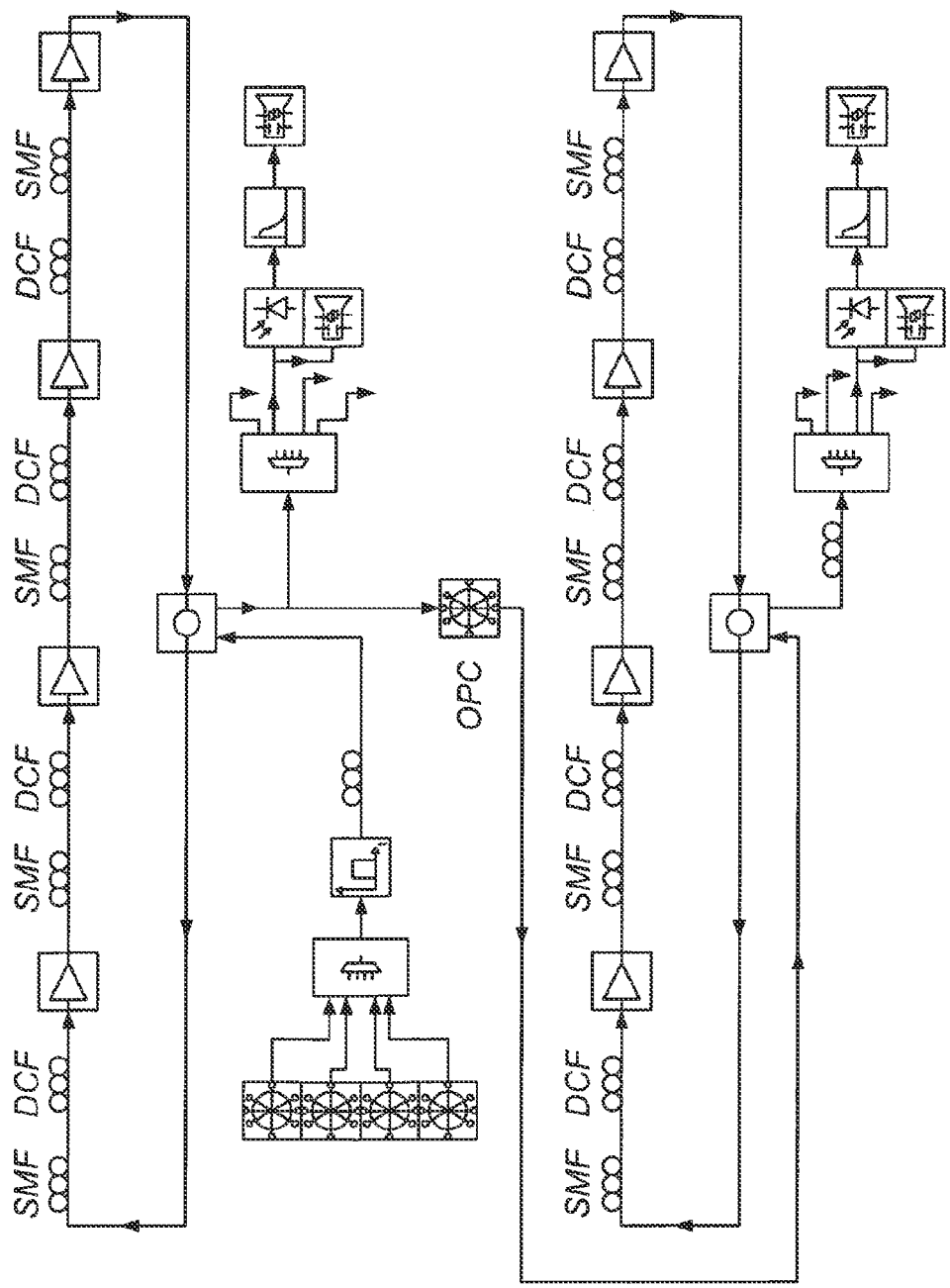
FIG. 19 illustrates a system with OPC in the middle and having the "one-for-many" scaled translational symmetry between RDF+SMF and SMF+RDF spans.
Figure 20:
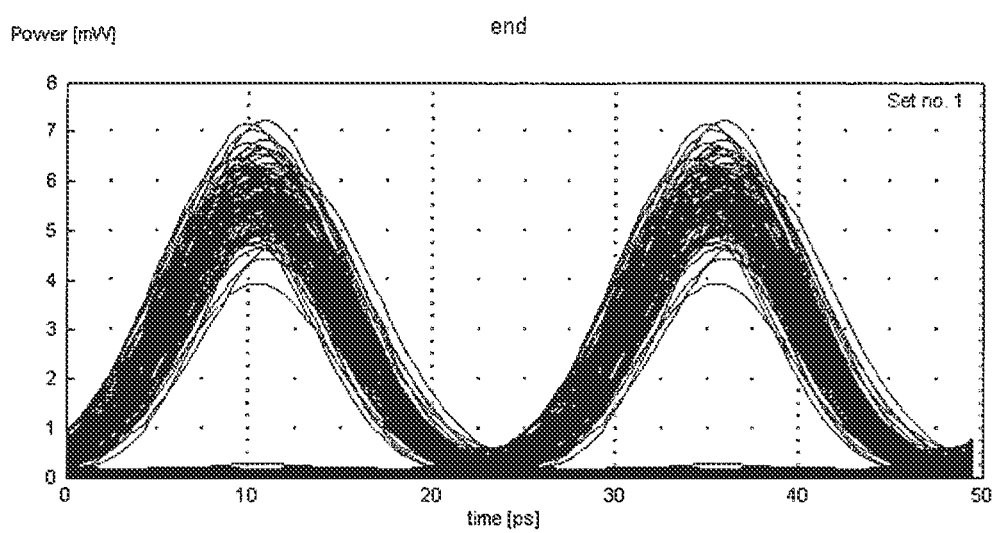
FIG. 20 illustrates a typical eye diagram of optical signals received at the end of the system with the "one-for-many" scaled translational symmetry.
Figure 21:
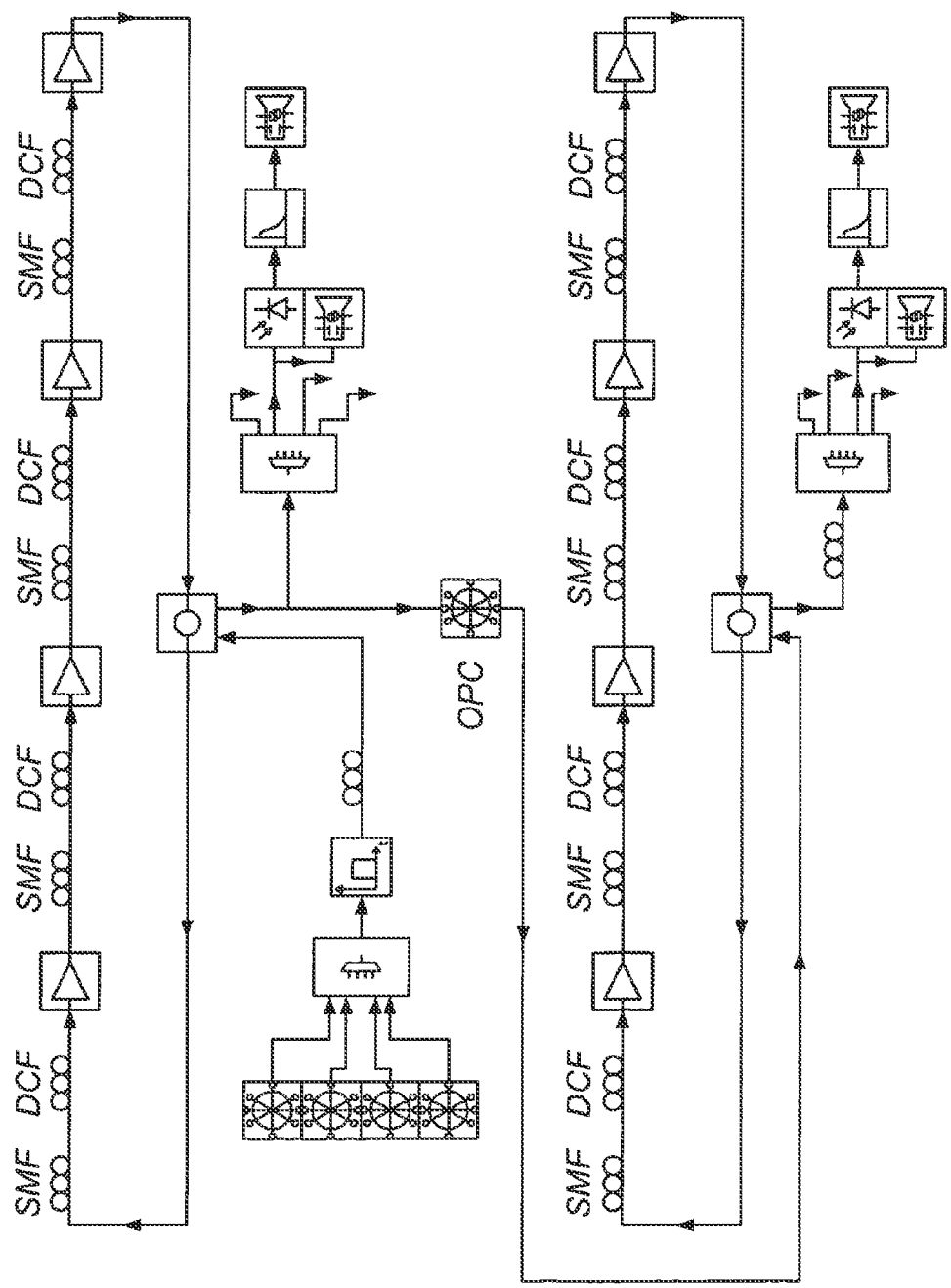
FIG. 21 illustrates a comparative system with no "one-for-many" scaled translational symmetry but with OPC in the middle.
Figure 22:
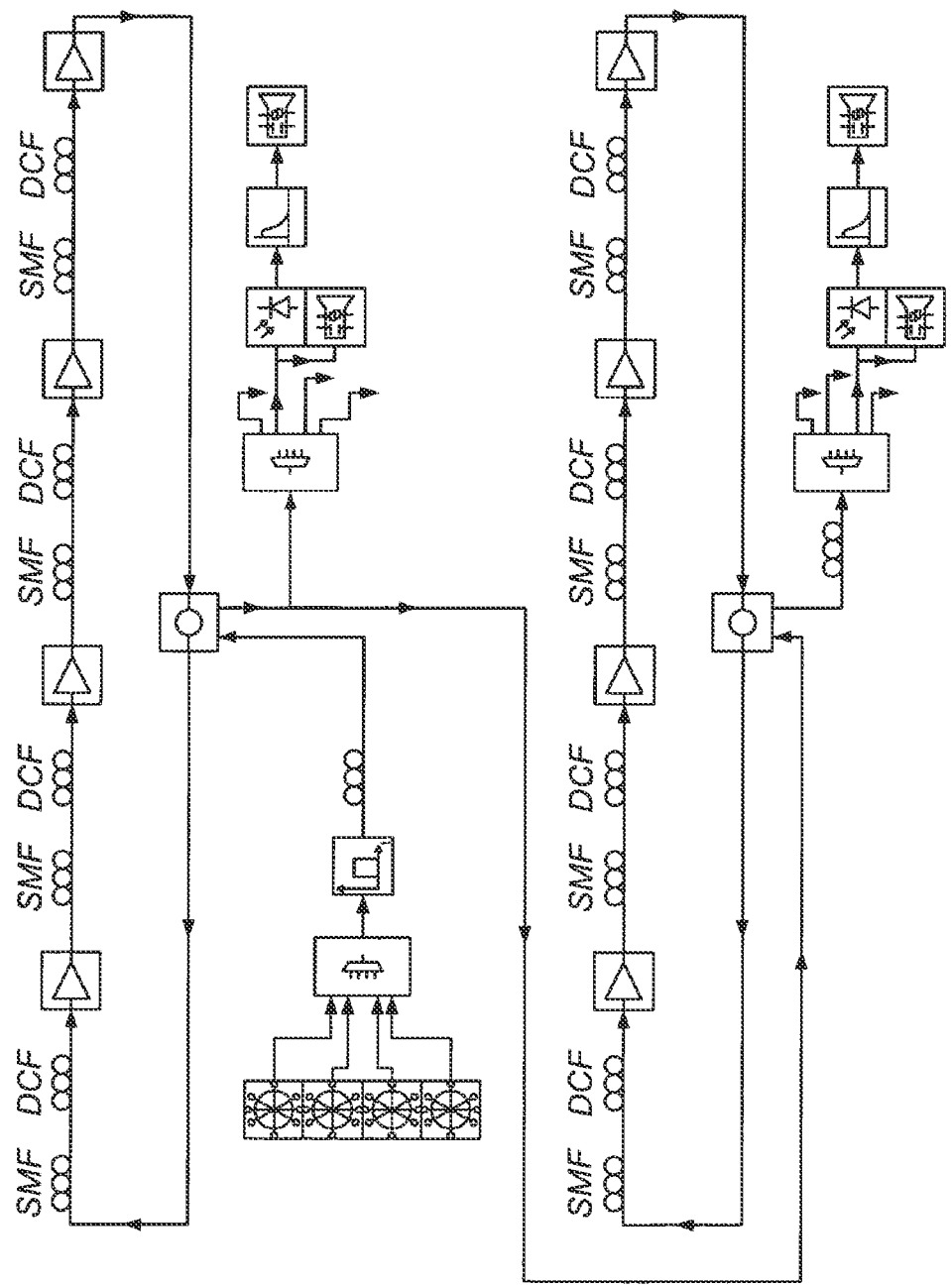
FIG. 22 illustrates a comparative system with no "one-for-many" scaled translational symmetry nor OPC.
Figure 23:
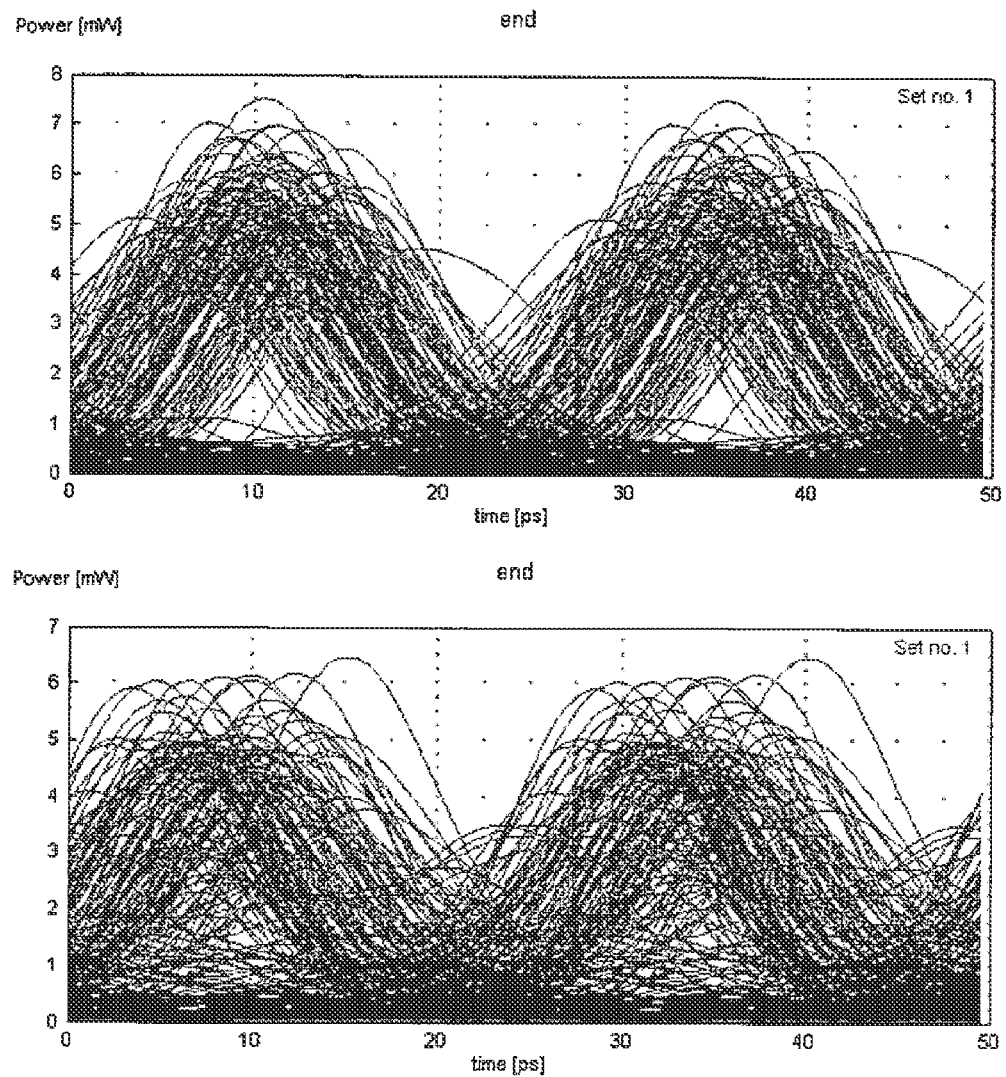
FIG. 23 illustrates typical received optical eye diagrams of the two comparative systems. Top: the system with OPC in the middle; Bottom: the system without OPC.

For an example of "one-for-many" nonlinearity compensation, we have simulated a transmission system using SMF+RDF and RDF+SMF spans, as shown in FIG. 19. The system has an optical phase conjugator in the middle, and on each side of OPC there is a loop recirculating four times. Each loop consists of three SMF+RDF spans each consisting of 40 km SMF+40 km RDF+16 dB EDFA, and one RDF+SMF span consisting of 40 km RDF+40 km SMF+16 dB EDFA. The SMF has loss $\alpha$=0.2 dB/km, dispersion D=16 ps/nm/km, dispersion-slope S=0.055 ps/nm²/km, effective modal area $A_{eff}$=80 μm², and the RDF has $\alpha'$=0.2 dB/km, D'=−16 ps/nm/km, S'=−0.055 ps/nm²/km, $A'_{eff}$=30 μm², the EDFA has noise figure 4 dB. The inputs are four 40 Gb/s channels, RZ modulated with peak power 10 mW and duty cycle 33%. The channel spacing is 200 GHz. The optical MUX and DEMUX consist of Bessel filters of the 7th order with 3 dB bandwidth 100 GHz. The system is configured such that each RDF+SMF span on the left side corresponds to and compensates the nonlinear effects of three SMF+RDF spans on the right side, and each RDF+SMF span on the right side corresponds to and compensates the nonlinear effects of three SMF+RDF spans on the left side. We have tried both a case with all spans being injected exactly the same amount of signal power and a case with the RDF+SMF spans being fed with 10% more power comparing to the SMF+RDF spans. No observable difference is found in the transmission performance, which indicates robustness of the system design against reasonable parameter deviations. FIG. 20 shows a typical eye diagram of the received optical signals at the end of transmission, which demonstrates excellent signal quality after 2560 km transmissions. We have also simulated two comparative systems to see how effective is the method of "on-for-many" nonlinearity compensation with scaled translational symmetry, one of which as shown in FIG. 21 has all identical SMF+RDF spans on both sides of OPC, the other of which as shown in FIG. 22 has no OPC in the middle. Everything else remains the same. Lacking a scaled translational symmetry, both comparative systems are seriously impaired by fiber nonlinearities, as shown by the typical eye diagrams of received optical signals in FIG. 23.

Figure 24:
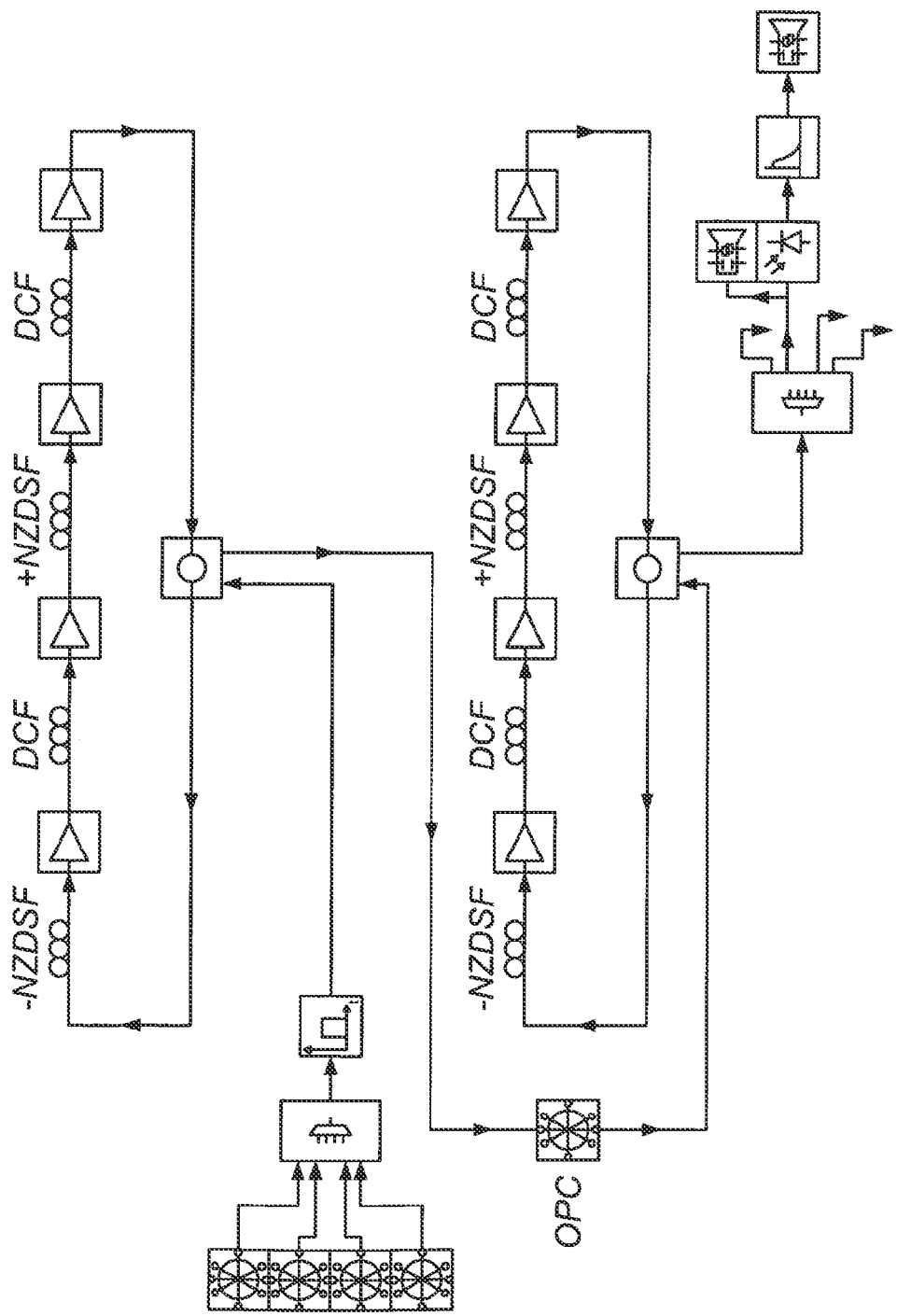
FIG. 24 illustrates a transmission line consisting of +NZDSFs, −NZDSFs, and DCFs compensating the dispersion slope.
Figure 25:
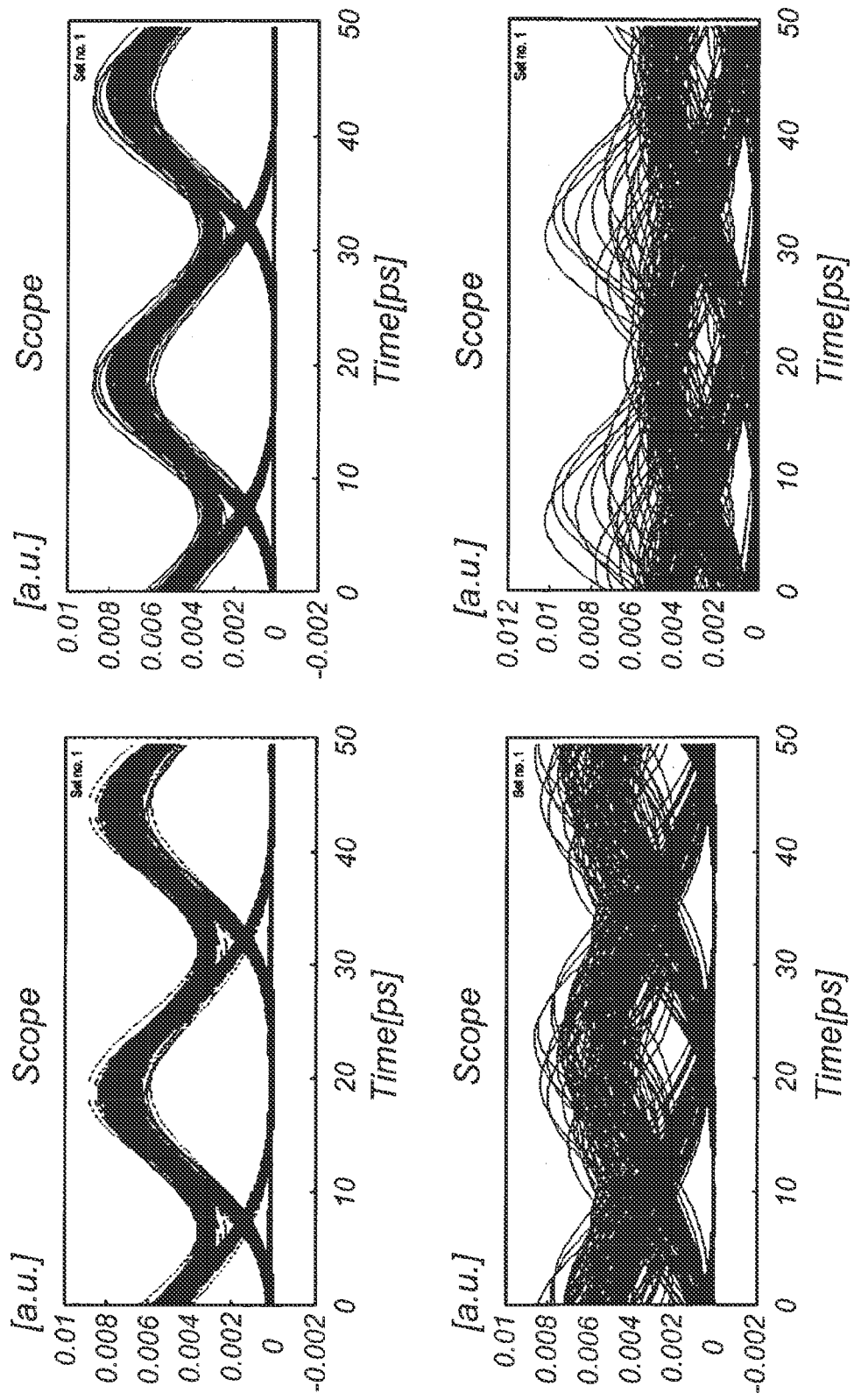
FIG. 25 illustrates received eye diagrams of the 2nd DEMUX channel. Top row: transmission results of the setup in FIG. 24. Top-left: fiber nonlinearity is OFF, the signal is only impaired by amplifier noise. Top-right: fiber nonlinearity is ON, no extra penalty is visible. Bottom row: degraded transmission results when all −NZDSFs are replaced by +NZDSFs. Bottom-left: with OPC. Bottom-right: without OPC, of the 3rd MUX/DEMUX channel.
Figure 26:
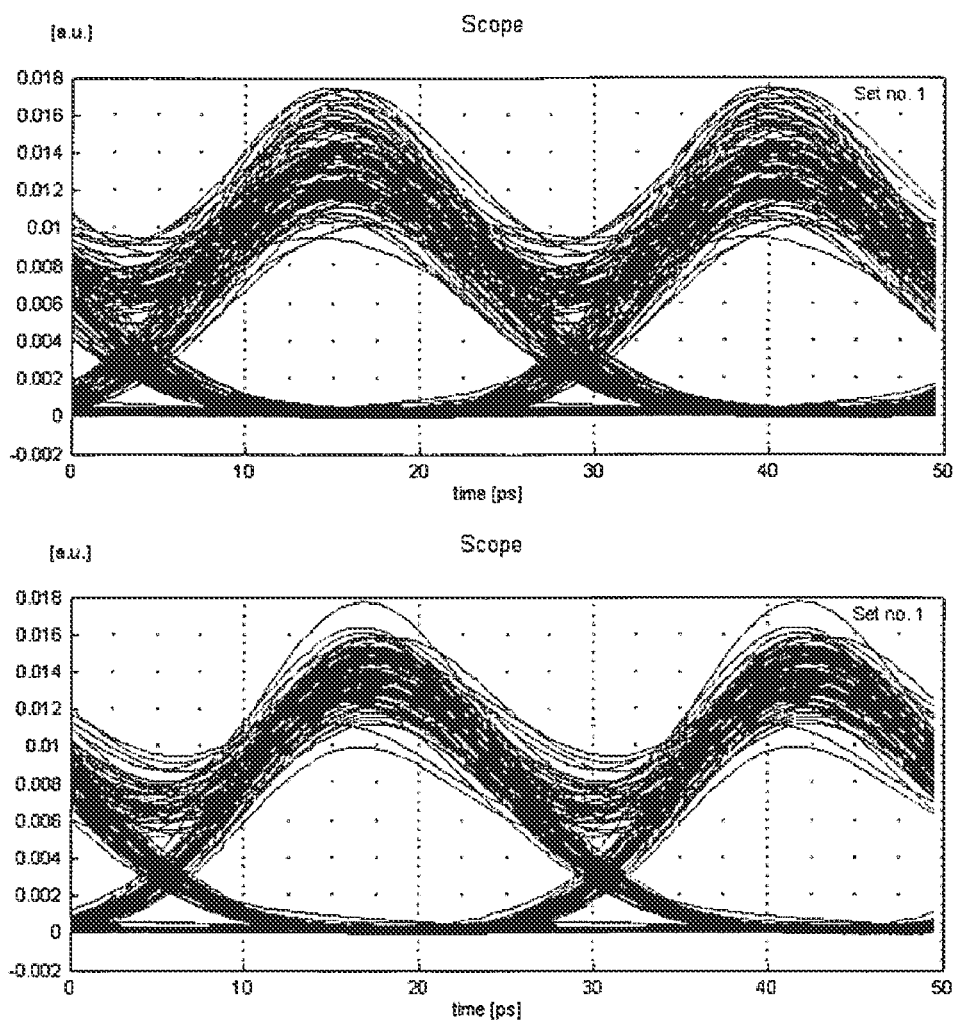
FIG. 26 illustrates scalability and cascadability of the nonlinearity-suppressed NZDSF transmission line in FIG. 24. Top: the number of circulations on each side of OPC is doubled to ten times and the signal power is increased by 3 dB. Bottom: two identical transmission lines as in FIG. 24 are in cascade all-optically and the signal power is increased by 3 dB. The eye diagrams are still of the 2nd DEMUX channel.

For an example system using NZDSFs, we simulated a transmission line consisting of twenty 100-km fiber spans with OPC in the middle, as shown in FIG. 24, where each side of the OPC has a fiber loop circulated five times. In each circulation, the optical signals go through 100 km −NZDSF transmission followed by a two-stage EDFA with 10 km DCF in the middle, then 100 km +NZDSF transmission followed by the same two-stage EDFA and DCF. The +NZDSF has loss coefficient $\alpha$=0.2 dB/km, dispersion D=+4 ps/nm/km and slope S=0.11 ps/nm²/km at 193.1 THz. The effective mode area is $A_{eff}$=70 μm². The −NZDSF differs only by D=−4 ps/nm/km. The Kerr nonlinear index of silica $n_2$=2.6×10⁻²⁰ m²/W. The two-stage EDFA has 11+15=26 dB gain in total to repeat the signal power. The noise figure of each stage is 5 dB. The DCF has $\alpha$=0.6 dB/km, D=−40 ps/nm/km, S=−1.1 ps/nm²/km, $A_{eff}$=25 μm², but nonlinearity neglected. The transmitting and receiving ends are the same as in the above SMF/DCF transmission. Input to the system are the same four-channel WDM signals, and the peak power of the 40 Gb/s RZ pulses is also the same 20 mW. With their nonlinear effects neglected, the DCFs do not participate directly in nonlinearity compensation. Nevertheless, their compensation of the dispersion-slope of the NZDSFs enables the OPC to effectively compensate the dispersion over a wide frequency band, and helps to condition the optical signals such that the inputs to two conjugate NZDSFs are mutually complex conjugate. Note that the +NZDSF and −NZDSF spans are alternated on each side of the OPC to balance the accumulated dispersion between the two sides. Also note that the first −NZDSF span on the right side of OPC is designed to compensate the nonlinearity of the last +NZDSF span on the left side, and the second span on the right (+NZDSF) is to compensate the second last span (−NZDSF) on the left, so on and so forth. It is important for the +NZDSF spans to be well dispersion-compensated, so to ensure that the input signals to the two conjugate spans of a translationally symmetric pair are complex conjugate to each other, which is a necessary condition for nonlinearity cancellation. However, there is no limit as to how much residual dispersion may be in the −NZDSF spans. Alternatively, each fiber span may be a concatenation of + and −NZDSFs. One type of span may have a +NZDSF followed by a −NZDSF, then the conjugate span would consist of the same fibers reversely ordered. Consequently, all spans may use the same DCF for slope compensation, and all accumulate the same dispersions of even orders. FIG. 25 shows the received eye diagrams of the second channel out of the DEMUX. The top row shows the results of nonlinear transmission and the comparing fictitious transmission without fiber nonlinearity through the setup of FIG. 24. The effectiveness of nonlinear compensation is remarkable. By contrast, the bottom row of FIG. 25 shows severe degradations in the transmission performance, when all −NZDSFs are replaced by +NZDSFs, so that the transmission line consists of identical +NZDSF spans with DCFs compensating both the dispersion and the dispersion-slope. The highly effective nonlinearity compensation is expected as a result of the nearly perfect translational symmetry between the +NZDSF and −NZDSF spans. Furthermore, a nonlinearity-suppressed transmission line should manifest behaviors of a linear system to some extent. Typical linear behaviors include scalability and cascadability. Namely, using the same fiber spans and simply by raising the signal power, it is possible to further the transmission distance by increasing the number of fiber spans before/after the OPC (scaling up), or by cascading several OPC-compensated transmission lines all-optically (without optical to electrical and electrical to optical signal conversions in the middle). Both the scalability and the cascadability are confirmed via numerical simulations, as shown in FIG. 26, where one eye diagram is for a system with the number of spans doubled to 40 in total, and the other diagram is obtained when cascading two identical 20-span transmission lines of FIG. 24. The eye diagrams are still of the second channel out of the DEMUX.

Figure 27:
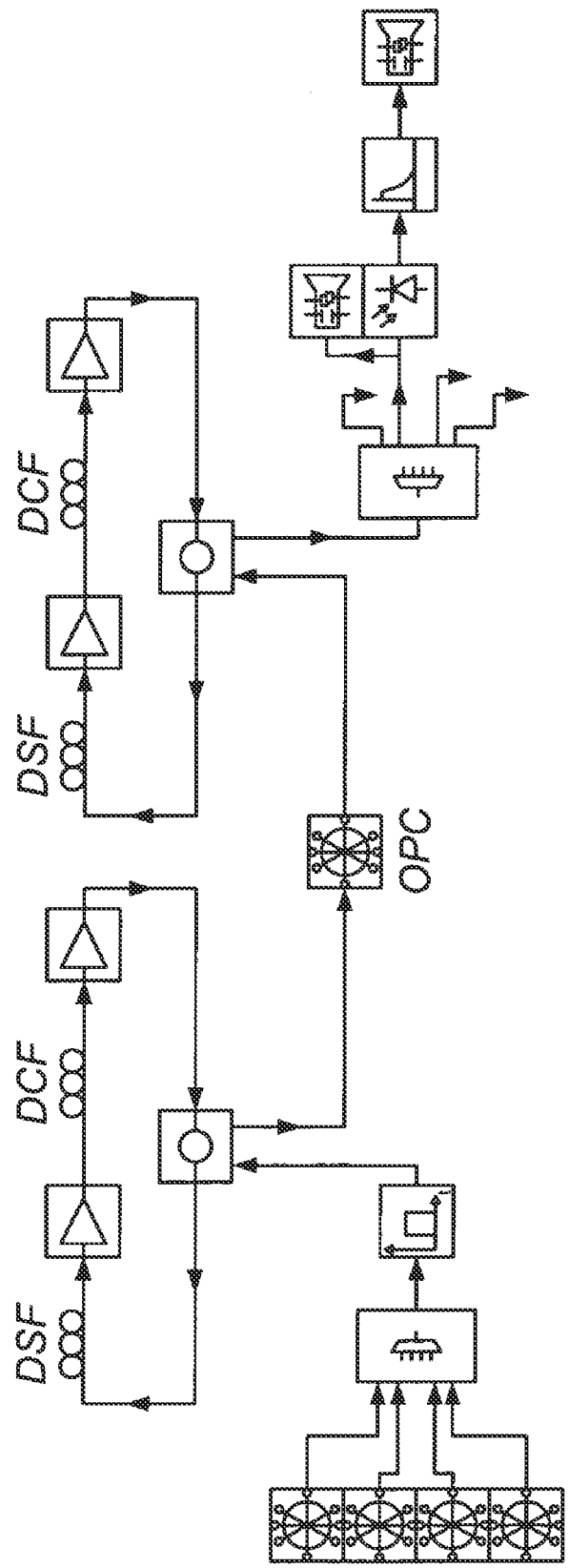
FIG. 27 illustrates a transmission line consisting of ten fiber spans on each side of OPC, each span has 50 km DSF and a slope-compensating DCF.
Figure 28:
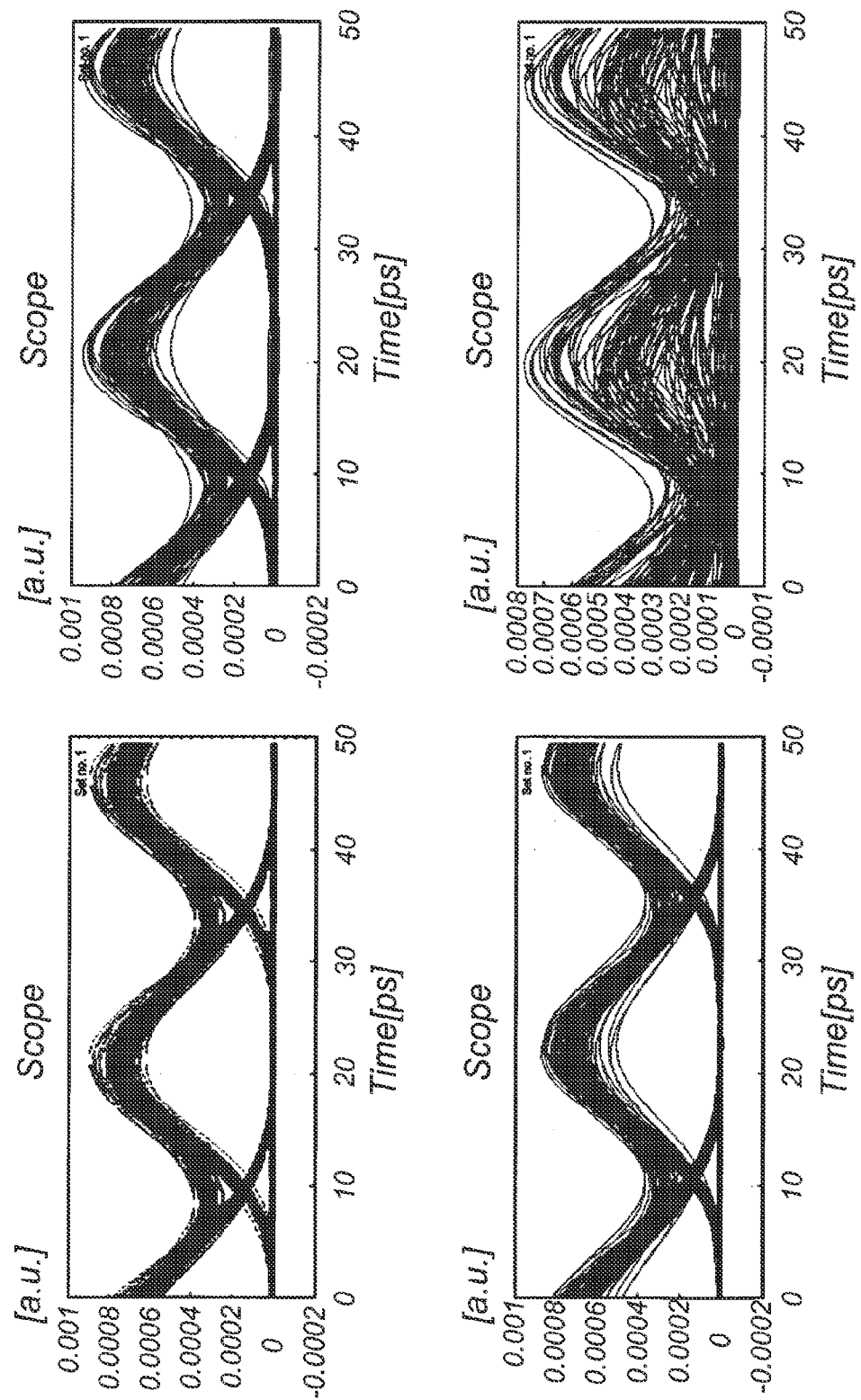
FIG. 28 illustrates received eye diagrams of the 2nd DEMUX channel. Top row: transmission results of the setup in FIG. 27. Top-left: fiber nonlinearity is OFF, the signal is only impaired by amplifier noise. Top-right: fiber nonlinearity is ON. Bottom row: transmission results when the setup in FIG. 27 is modified by setting D=0 ps/nm/km for the DCFs while keeping the dispersion slope. Bottom-left: with OPC in the middle of the link. Bottom-right: when OPC is removed.

To test the effectiveness of nonlinear compensation for DSFs, we evaluated numerically a transmission line consisting of twenty 50-km DSF spans with OPC in the middle, as shown in FIG. 27. Each span has 50 km DSF and at the end a two-stage EDFA with 5 km DCF in the middle. The DSF has loss $\alpha=0.2$ dB/km, D=0 ps/nm/km and S=0.08 ps/nm$^2$/km at the center frequency 193.1 THz, $A_{eff}=50$ μm$^2$. The Kerr nonlinear index of silica is again $n_2=2.6\times10^{-20}$ m$^2$/W. The two-stage EDFA has 6+7=13 dB gain in total to repeat the signal power, and the noise figure of each stage is 5 dB. The DCF has $\alpha=0.6$ dB/km, D=−100 ps/nm/km, S=−0.8 ps/nm$^2$/km, $A_{eff}=25$ μm$^2$, but nonlinearity neglected. The transmitting and receiving ends are still the same as in the above SMF/DCF transmission. However, the four channels of 40 Gb/s RZ pulses are transmitted at (−350, −150, +50, +250) GHz off the center frequency, and they are received at (−250, −50, +150, +350) GHz off the center frequency. Note that the channels are assigned asymmetrically about the center frequency to avoid phase-matched four-wave mixing (FWM) [2]. The channels may also be unequally spaced to further reduce the FWM penalty [42, 43]. But assigning channels with unequal spacing increases the network complexity and may not provide sufficient suppression by itself to the FWM and other nonlinear effects. In particular, it is ineffective to suppress the effect of cross-phase modulation (XPM). Nevertheless, when applicable, such legacy methods for nonlinearity suppression may be combined with our method of OPC-based nonlinearity compensation. The legacy methods may work to enhance the effectiveness of our method, in the sense that they may render weaker nonlinearity in each fiber span, so that the negligence of higher-order nonlinear perturbations becomes a better approximation. Back to the DSF-based transmission system of FIG. 27, when the power of the RZ pulses is peaked at 2 mW, FIG. 28 shows the received eye diagrams of the second channel out of the DEMUX. The top-left diagram is obtained when the fiber nonlinearity is turned OFF, so the signal is only impaired by amplifier noise. The top-right is the received eye diagram when the fiber nonlinearity is turned ON. The increased penalty due to fiber nonlinearity is visible but not too large. The eye diagrams at the bottom of FIG. 28 are obtained when the dispersion of the DCFs changes to D=0 ps/nm/km while the slope remains, with or without OPC in the middle of the link. The good transmission performance shown in the bottom-left diagram verifies the insensitivity of our OPC-based method of nonlinearity compensation to the amount of residual dispersion in each fiber span, while the bad result on the bottom-right demonstrates the indispensability of OPC.

Compensating Intra-channel Nonlinear Effects without OPC

When there is no optical phase conjugator available, two fiber spans in a translational symmetry may still cancel out their intra-channel nonlinear effects to a large extent, and a proper arrangement of the pairs of translationally symmetric fiber spans could significantly reduce intra-channel nonlinear effects in a long distance transmission line. The intra-channel nonlinear effects, namely, nonlinear interactions among optical pulses within the same wavelength channel, are the dominating nonlinearities in systems with high modulation speeds of 40 Gb/s and above [39], where the nonlinear interactions among different wavelength channels become less-limiting factors. As a result of short pulse width and high data rate, optical pulses within one channel are quickly dispersed and overlap significantly so to interact through the Kerr effect. In the past a few years, intra-channel nonlinearities have been extensively investigated by several research groups [44, 45, 46, 47, 48, 49, 50, 51, 52], and a method has been identified for suppressing the intra-channel nonlinearity-induced jitters in pulse amplitude and timing, using lossless or Raman-pumped transmission lines manifesting a mirror symmetry [46, 52]. As mentioned before, the loss of pump power makes it difficult to maintain a constant gain in a long transmission fiber. Consequently, the significant deviation of signal power variation from a desired mirror-symmetric profile degrades the result of intra-channel nonlinear compensation using mirror symmetry [53]. Nevertheless, we have found that two fiber spans in a scaled translational symmetry could cancel out their intra-channel nonlinear effects to a large extent without resorting to OPC, and a significant reduction of intra-channel nonlinear effects may be achieved in a multi-span system with translationally symmetric spans suitably arranged.

This time the translational symmetry requires that the corresponding fiber segments have the same sign for the loss/gain coefficients but opposite second- and higher-order dispersions, which are naturally satisfied conditions in conventional fiber transmission systems, where, for example, a transmission fiber may be paired with a DCF as symmetric counterparts. The scaled translational symmetry further requires that the fiber parameters should be scaled in proportion and the signal amplitudes should be adjusted to satisfy, $$\frac{\alpha(z)}{\alpha'(z')} = -\frac{\beta_2(z)}{\beta_2'(z')} \tag{34}$$

$$= -\frac{\beta_3(z)}{\beta_3'(z')}$$

$$= \frac{\gamma(z)|A(z,t)|^2}{\gamma'(z')|A'(z',t)|^2}$$

$$= \frac{z'}{z}$$

$$= \frac{1}{R},$$

∀z∈[0,L] and ∀t∈(−∞,+∞), where α(z), $\beta_2(z)$, $\beta_3(z)$, and γ(z) denote the loss coefficient, second-order dispersion, third-order dispersion, and Kerr nonlinear coefficient respectively for one fiber stretching from z=0 to z=L>0, while the primed parameters are for the other fiber stretching from z'=0 to z'=L/R, R>0 is the scaling ratio, A(z,t) and A'(z',t) are the envelopes of optical amplitude in the two fiber segments respectively, whose initial values at z=0 and z'=0 respectively are required to be complex conjugate, $$\frac{A*(z=0,t)}{A'(z'=0,t)} = e^{-i\theta}\left[\frac{\gamma'(z'=0)}{R\gamma(z=0)}\right]^{1/2}, \forall t \in (-\infty, +\infty), \quad (35)$$

where $\theta \in R$ is an arbitrary phase. Even though the effect of dispersion slope may be neglected within a single wavelength channel, the inclusion of the $\beta_3$-parameters in the scaling rules of equation (34) ensures that good dispersion and non-linearity compensation is achieved for each wavelength channel across a wide optical band. When a pair of such fiber segments in scaled translational symmetry are cascaded, and the signal power levels are adjusted in accordance with equation (34), it may be analytically proved that both the timing jitter and the amplitude fluctuation due to intra-channel non-linear interactions among overlapping pulses are compensated up to the first-order perturbation of fiber nonlinearity, namely, up to the linear terms of the nonlinear coefficient. Since the dispersive and nonlinear transmission response is invariant under the scaling of fiber parameters and signal amplitudes as in equations (34) and (35) [17], it is without loss of generality to consider two spans that are in translational symmetry with the ratio R=1 and $\gamma(z=0)=\gamma'(z'=0)$. The cascade of such two spans would constitute a transmission line stretching from z=0 to z=2L, with the fiber parameters satisfying, $$\begin{aligned}\frac{\alpha(z)}{\alpha(z+L)} &= -\frac{\beta_2(z)}{\beta_2(z+L)} \\ &= -\frac{\beta_3(z)}{\beta_3(z+L)} \\ &= \frac{\gamma(z)}{\gamma(z+L)} \\ &= \frac{A*(0,t)}{A(L,t)} \\ &= 1,\end{aligned} \quad (36)$$

Figure 29:
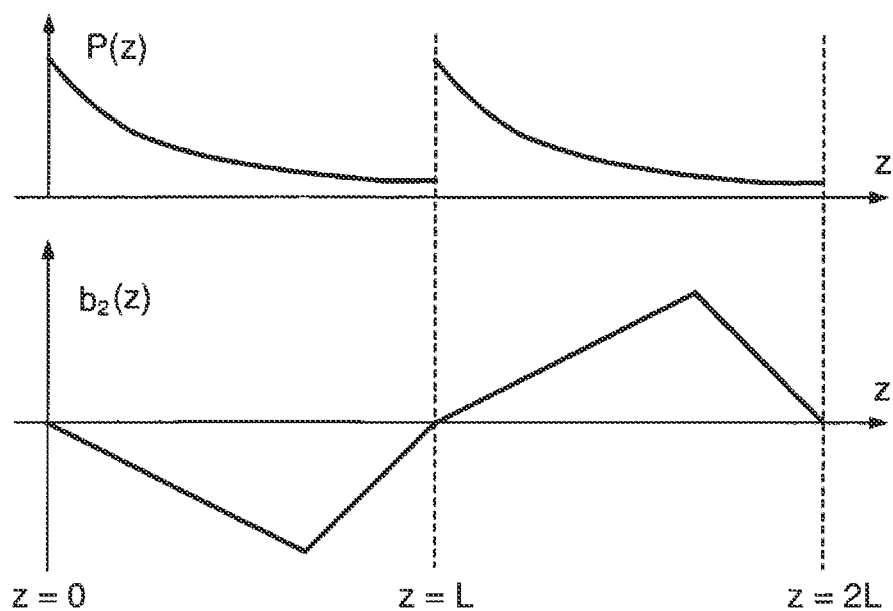
FIG. 29 illustrates the signal power and dispersion maps for a cascade of two fiber spans in scaled translational symmetry with scaling ratio R=1. Top: the variation of signal power along the propagation distance. Bottom: the dispersion map, namely, the variation of accumulated dispersion along the propagation distance.

$\forall z \in [0,L]$ and $\forall t \in (-\infty, +\infty)$. The translational symmetry is illustrated in FIG. 29 with plots of signal power and accumulated dispersion along the propagation distance.

It is only necessary to consider the Kerr nonlinearity within one wavelength channel, while the Raman effect may be neglected. The amplitude envelope of a single channel may be represented by a sum of optical pulses, namely, $A(z,t)=\Sigma_k u_k(z,t)$, where $u_k(z,t)$ denotes the pulse in the kth bit slot and centered at time t=kT, with $k \in Z$ and T>0 being the bit duration. The following NLSE describes the propagation and nonlinear interactions among the pulses [39], $$\frac{\partial u_k}{\partial z} + \frac{i\beta(z)}{2}\frac{\partial^2 u_k}{\partial t^2} + \frac{\alpha(z)}{2}u_k = i\gamma(z)\sum_m\sum_n u_m u_n u^*_{m+n-k}, \quad (37)$$

$\forall k \in Z,$ where the right-hand side keeps only those nonlinear products that satisfy the phase-matching condition. The nonlinear mixing terms with either m=k or n=k contribute to self-phase modulation and intra-channel XPM, while the rest with both $m \neq k$ and $n \neq k$ are responsible for intra-channel FWM [39]. It is assumed that all pulses are initially chirp-free or they can be made so by a dispersion compensator, and when chirp-free the pulses $u_k$ (z=0,t), $k \in Z$, should all be real-valued. This includes the modulation scheme of binary phase-shift keying, where the relative phases between adjacent pulses are either 0 or $\pi$. It is only slightly more general to allow the pulses being modified by arithmetically progressive phase shifts $\phi_k=\phi_0+k\Delta\phi$, $k \in Z$, with $\phi_0$, $\Delta\phi \in [0,2\pi)$, because equation (37) is invariant under the multiplication of phase factors $\exp(i\phi_k)$ to $u_k$, $\forall k \in Z$. The linear dependence of $\phi_k$ on k is in fact equivalent to a readjustment of the frequency and phase of the optical carrier. The pulses may be RZ modulated, and non-return-to-zero (NRZ) modulated as well, for an NRZ signal train is the same as a stream of wide RZ pulses with 100% duty cycle.

Were there no nonlinearity in the fibers, the signal propagation would by fully described by the dispersive transfer function, $$H(z_1, z_2, \omega) = \exp\left[\frac{i}{2}b_2(z_1,z_2)\omega^2 - \frac{1}{2}\int_{z_1}^{z_2}\alpha(z)dz\right], \quad (38)$$

with $z_1, z_2 \in [0,2L]$ and, $$b_2(z_1, z_2) \stackrel{def}{=} \int_{z_1}^{z_2}\beta_2(z)dz, \quad (39)$$

or equivalently the corresponding impulse response, $$h(z_1, z_2, t) = \frac{1}{\sqrt{|b_2(z_1,z_2)|}}\exp\left[-\frac{it^2}{2b_2(z_1,z_2)} - \frac{1}{2}\int_{z_1}^{z_2}\alpha(z)dz\right], \quad (40)$$

which is calculated from $F^{-1}[H(z_1,z_2,\omega)]$ up to a constant phase factor. The impulse response defines a linear propagator $P(z_1,z_2)$ as in equation (9). In reality, the signal evolution is complicated by the Kerr nonlinear effects. Nevertheless, the nonlinearity within each fiber span may be sufficiently weak to justify the application of the first-order perturbation theory:

$$v_k(z,t) = P(0,z)u_k(0,t) \quad (41)$$

$$v'_k(z,t) = i\sum_m\sum_n\int_0^z P(s,z)[\gamma(s)v_m(s,t)v_n(s,t)v^*_{m+n-k}(s,t)]ds, \quad (42)$$

$\forall k \in Z$, where $u_k(z,t) \approx v_k(z,t)$ is the zeroth-order approximation which neglects the fiber nonlinearity completely, whereas the result of first-order perturbation $u_k(z,t) \approx v_k(z,t)+v'_k(z,t)$ accounts in addition for the nonlinear products integrated over the fiber length. For the moment, it is assumed that both fiber spans are fully dispersion- and loss-compensated to simplify the mathematics. It then follows that $b(0,z+L)=-b(0,z)$, $\int_0^{z+L}\alpha(s)ds=\int_0^z\alpha(s)ds$, $\gamma(z+L)=\gamma(z)$, $\forall z \in [0,L]$, and $v_k(L,t)=v_k(2L,t)=u_k(0,t)$, which is real-valued by assumption, $\forall k \in Z$. It further follows that $h(0,z+L,t)=h^*(0,z,t)$, hence $P(0,z+L)=P^*(0,z)$ and $P(z+L,2L)=P^*(z,2L)$, $\forall z \in [0,L]$. Consequently, the pulses at z and z+L are complex conjugate, namely, $v_k(z+L,t)=v^*_k(z,t)$, $\forall k \in Z$, $\forall z \in [0,L]$. A typical term of nonlinear mixing, $$\int_0^{2L} P(z, 2L)[\gamma(z)v_m(z, t)v_n(z, t)v^*_{m+n-k}(z, t)]ds = \quad (43)$$

$$\int_0^L P(z, 2L)[\gamma(z)v_m(z, t)v_n(z, t)v^*_{m+n-k}(z, t)]ds +$$

$$\int_L^{2L} P(z, 2L)[\gamma(z)v_m(z, t)v_n(z, t)v^*_{m+n-k}(z, t)]ds =$$

$$\int_0^L P(z, 2L)[\gamma(z)v_m(z, t)v_n(z, t)v^*_{m+n-k}(z, t)]ds +$$

$$\int_0^L P^*(z, 2L)[\gamma(z)v^*_m(z, t)v^*_n(z, t)v_{m+n-k}(z, t)]ds,$$

is therefore real-valued. It follows immediately that the first-order nonlinear perturbation $v'_k(2L,t)$ is purely imaginary-valued, which is in quadrature phase with respect to the zeroth-order approximation $v_k(2L,t)=v_k(0,t)$, $\forall k \in Z$. When the span dispersion is not fully compensated, namely, $b_2(0, L)\neq 0$, the input pulses to the first span at $z=0$ should be pre-chirped by an amount of dispersion equal to $-\frac{1}{2}b_2(0,L)$, so that the input pulses to the second span at $z=L$ are pre-chirped by $\frac{1}{2}b_2(0,L)$ as a consequence. In other words, the input signals to the two spans should be oppositely chirped. Under this condition, the equation $v_k(z+L,t)=v^*_k(z,t)$, $\forall z \in [0, L]$, $\forall k \in Z$ is still valid, so are the above argument and the conclusion that $v_k$ and $v'_k$ are real- and imaginary-valued respectively when brought chirp-free.

Mathematically, that $v_k$ and $v'_k$ are in quadrature phase implies $|u_k|^2=|v_k+v'_k|^2=|v_k|^2+|v'_k|^2$, where $|v'_k|^2$ is quadratic, or of second-order, in terms of the Kerr nonlinear coefficient. This fact has significant implications to the performance of a transmission line. Firstly, it avoids pulse amplitude fluctuations due to the in-phase beating between signal pulses and nonlinear products of intra-channel FWM, which could seriously degrade the signal quality if not controlled [39, 45, 46, 51]. The quadrature-phased nonlinear products due to intra-channel FWM lead to the generation of "ghost" pulses in the "ZERO"-slots [44, 48, 49] and the addition of noise power to the "ONE"-bits. As second-order nonlinear perturbations, these effects are less detrimental. Secondly, it eliminates pulse timing jitter due to intra-channel XPM up to the first-order nonlinear perturbation. Using the moment method [45, 46], the time of arrival for the center of the kth pulse may be calculated as, $$\langle t \rangle_k = \frac{\int_{-\infty}^{\infty} t|u_k|^2 dt}{\int_{-\infty}^{\infty} |u_k|^2 dt} \approx \frac{\int_{-\infty}^{\infty} t|v_k|^2 dt}{\int_{-\infty}^{\infty} |v_k|^2 dt} = kT, \quad (44)$$

which is clearly jitterless, $\forall k \in Z$. In the calculation, the $|v'_k|^2$ terms are simply neglected as they represent second-order nonlinear perturbations.

Fiber spans for intra-channel nonlinearity compensation without OPC may be similarly designed and arranged as those described in previous sections when OPC is used. A transmission fiber, either SMF or NZDSF, and its corresponding slope-matching DCF [3, 4] are a perfect pair for compensating intra-channel nonlinearities, as their dispersions and slopes of dispersion satisfy the scaling rules of equation (34) perfectly, and the signal amplitudes may be easily adjusted to fulfil the corresponding scaling rule. The so-called RDFs [7], as a special type of DCFs, may be suitably cabled into the transmission line and contribute to the transmission distance, since the absolute dispersion value and loss coefficient of RDFs are both comparable to those of the transmission fiber. Only the smaller modal area requires a lower level of signal power for an RDF to compensate the nonlinearity of a transmission fiber. Otherwise the "one-for-many" compensation scheme may be employed, where the signal power may be slightly adjusted for an RDF to compensate the nonlinearity of multiple transmission fibers. There is usually no power repeater between the transmission fiber and the cabled RDF within one span, so that the signal power decreases monotonically in each fiber span, as shown in FIG. 29. Note that one fiber span has a transmission fiber followed by an RDF, while the other span has an RDF followed by a transmission fiber, in accordance with the scaling rules of equation (34) for nonlinearity compensation. Alternatively, if distributive Raman amplification, especially backward Raman pumping, is used to repeat the signal power, then one span has the transmission fiber Raman pumped in accordance with the RDF being Raman pumped in the other span. The signal power variation in each span may no longer be monotonic, but the power profiles in two compensating spans should still be similar and obey the scaling rules of equation (34), especially in portions of fibers that experience high signal power.

Figure 30:
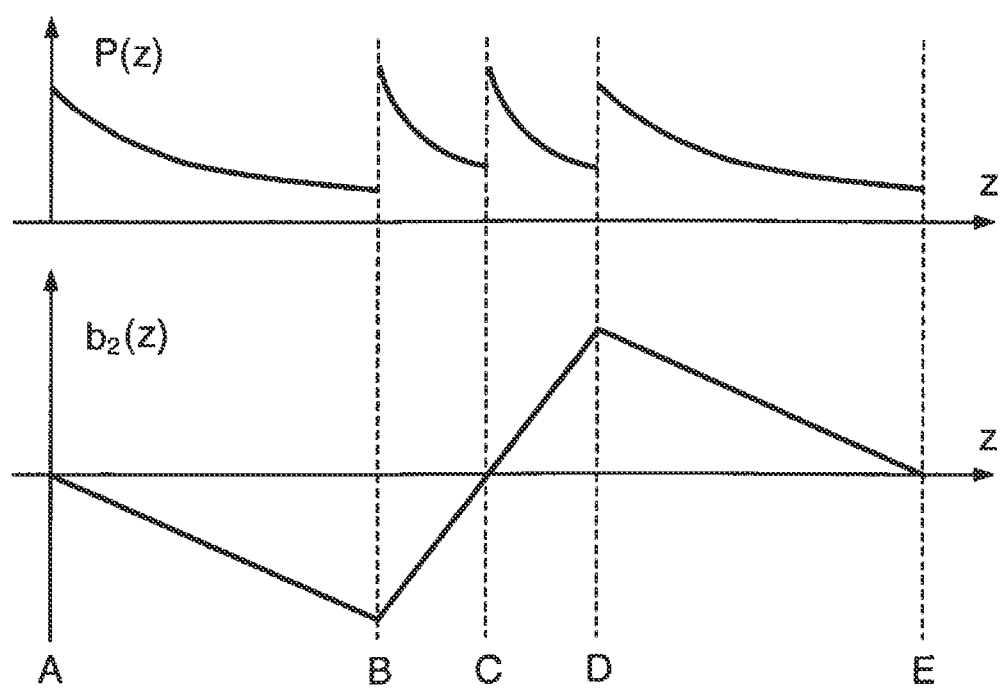
FIG. 30 illustrates the signal power and dispersion maps for a cascade of two fiber spans in scaled translational symmetry with lumped dispersion compensators. Top: the variation of signal power along the propagation distance. Bottom: the dispersion map, namely, the variation of accumulated dispersion along the propagation distance.

For DCFs having absolute dispersion values much higher than the transmission fiber, it is suitable to coil the DCF into a lumped dispersion-compensating module (DCM) and integrate the module with a multi-stage optical amplifier at each repeater site. Two fiber spans in scaled translational symmetry for intra-channel nonlinearity compensation should have oppositely ordered transmission fibers and DCFs. As shown in FIG. 30, one span has a piece of transmission fiber from A to B, in which the signal power decreases exponentially, and an optical repeater at the end, in which one stage of a multi-stage optical amplifier boosts the signal power up to a suitable level and feeds the signal into a lumped DCM, where the signal power also decreases exponentially along the length of the DCF from B to C, finally the signal power is boosted by another stage of the optical amplifier. The other span has the same transmission fiber and the same DCM, with the signal power in the DCF from C to D tracing the same decreasing curve. However, this span has the DCM placed before the transmission fiber. Ironically, the efforts of improving the so-called figure-of-merit [1, 4] by DCF vendors have already rendered the loss coefficients of DCFs too low to comply with the scaling rules of equation (34). To benefit from nonlinearity compensation enabled by scaled translational symmetries, DCFs, at least parts of them carrying high signal power, may be intentionally made more lossy during manufacturing or by means of special packaging to introduce bending losses. As illustrated in FIG. 30, the DCFs from B to C and from C to D are arranged in scaled translational symmetry to the transmission fibers from D to E and from A to B respectively, such that the transmission fiber from A to B is compensated by the DCF from C to D, and the DCF from B to C compensates the transmission fiber from D to E, for the most detrimental effects of uttering in pulse amplitude and timing due to intra-channel FWM and XPM. In practice, the DCMs from B to D and the multi-stage optical amplifiers may be integrated into one signal repeater, and the same super-span from A to E may be repeated many times to reach a long-distance, with the resulting transmission line enjoying the effective suppression of intra-channel nonlinear impairments. Again, in case distributive Raman pumping in the transmission fibers is employed to repeat the signal power, the DCFs may also be Raman pumped or erbium-doped for distributive amplification to have similar (scaled) power profiles as that in the transmission fibers for optimal nonlinearity compensation.

It should be noted that in regions of fibers carrying lower optical power, the scaling rules of fiber parameters in equation (34) may be relaxed without sacrificing the performance of nonlinearity compensation, both for systems using cabled DCFs into the transmission lines and for systems using lumped DCMs at the repeater sites. Such relaxation may be done for practical convenience, or to control the accumulated dispersion in a span to a desired value, as well as to reduce the span loss so to reduce the penalty due to optical noise. As an example and a potentially important invention in its own right, a DCM compensating the dispersion and nonlinearity of transmission fibers may be so packaged that the first part of DCF experiencing a high level of signal power may have a higher loss coefficient satisfying the scaling rule of equation (34), whereas the second part of DCF may ignore the scaling rule and become less lossy such that the signal power at the end of the DCM is not too low to be significantly impaired by the amplifier noise. In fact, the low-loss part of the DCM may even use optical filters other than DCFs, such as fiber Bragg gratings and photonic integrated circuits. This method of packaging DCMs achieves the capability of nonlinearity compensation and good noise performance simultaneously. For instance, it takes 10 km DCF with D'=−80 ps/nm/km to compensate 100 km NZDSF with dispersion D=8 ps/nm/km and loss α=0.2 dB/km. The first 4 km of the DCF may be made highly lossy by a special treatment in manufacturing or packaging, with a loss coefficient α'=2 dB/km to form a scaled translational symmetry with respect to the first 40 km NZDSF for optimal nonlinearity compensation. However, the remaining 6 km DCF may ignore the scaling rules and have a much lower nominal loss α'=0.6 dB/km. The total loss is reduced by 8.4 dB as compared to a DCM that complies strictly with the scaling rules throughout the length of the DCF. Another important parameter of DCFs is the effective modal area, or more directly the nonlinear coefficient. Traditional designs of DCFs have always strived to enlarge the modal area so to reduce the nonlinear effects of DCFs. However, for DCFs used in our method of nonlinearity compensation, there exists an optimal range of modal area which should be neither too large nor too small. According to the scaling rules of equation (34), a DCF with a large modal area may require too much signal power to generate sufficient nonlinearity to compensate the nonlinear effects of a transmission fiber, while optical amplifiers may have difficulty to produce that much signal power. On the other hand, when the effective modal area is too small, the scaling rules of equation (34) dictate a reduced power level for the optical signal in the DCF, which may be more seriously degraded by optical noise, such as the amplified-spontaneous-emission noise from an amplifier at the end of the DCF.

It is further noted that the nonlinear responses of fiber spans of different lengths may be approximately the same so long as each of them is much longer than the effective length $L_{\mathit{eff}}=1/\alpha$. This makes nonlinearity compensation possible among spans with different lengths, which are commonly seen in terrestrial and festoon systems, where the span-distance between repeaters may vary according to the geographical conditions. The dispersion of each fiber span may not be always fully compensated, in which case it is desirable to fine-tune the fiber lengths such that any pair of compensating spans have the same amount of residual dispersion. The final note is that two compensating fiber spans are not necessarily located immediately next to each other as drawn in FIGS. 29 and 30. Sometimes, it may be advantageous to order pairs of compensating fiber spans in a mirror-symmetric manner similar to that discussed previously, especially when all spans are not compensated to zero dispersion. Indeed, it is convenient to have the two spans of any compensating pair accumulating the same amount of total dispersion including the sign. This would be achieved naturally if the two compensating spans consist of exactly the same DCF and transmission fiber of exactly the same lengths, with the only difference being the ordering of the fibers. When a pair of compensating spans are not the same in span distance, the length of either a DCF or a transmission fiber may be fine-tuned, namely slightly elongated or shortened, to make sure that the two spans have the same accumulated dispersion. If the spans of a long-distance transmission line are labelled by −N, −N+1, ..., −2, −1 and 1, 2, ..., N−1, N from one end to the other, N>1, a mirror-symmetric arrangement requires that spans −n and n, n∈[1,N] should be paired for nonlinearity compensation, that is, their fiber parameters should satisfy the scaling rules of equation (34) approximately and their accumulated dispersions should be the same. Note that the scaling rules may only be fulfilled approximately if the two spans have the same non-zero accumulated dispersion. Then pre- and post-dispersion compensators may be employed at the two ends of the transmission line to equalize the total dispersion and importantly, to make sure that the accumulated dispersion from the transmitter to the beginning of span −n is opposite to the accumulated dispersion from the transmitter to the beginning of span n, for all n∈[1,N], such that the input signals to spans −n and n are complex conjugate, that is oppositely chirped, as required for compensating intra-channel nonlinearities. As an example, when all spans have the same accumulated dispersion $b_2$, the pre-dispersion compensator should provide $$-\left(N-\frac{1}{2}\right)b_2,$$

while the post-dispersion compensator should contribute $$-\left(N+\frac{1}{2}\right)b_2.$$

Or the amount of post-dispersion compensation may be slightly different from $$-\left(N+\frac{1}{2}\right)b_2,$$

such that the overall dispersion of the transmission line is not zero but within the tolerance of the transmitted pulses. More generally, if the accumulated dispersions of spans −n and n are $B_{-n}$ and $B_n$ respectively, which satisfy the conditions $B_{-n}=B_n$, ∀n∈[1,N], while $B_m$ and $B_n$ are not necessarily the same if m≠n, then the pre- and post-dispersion compensators may provide respectively $$\frac{1}{2}B_1 = \sum_{n=1}^{N} B_n \text{ and } -\frac{1}{2}B_1 - \sum_{n=1}^{N} B_n$$

worth of dispersion, approximately up to the tolerance of the transmitted pulses. It is worth pointing out that the single-channel nature of intra-channel nonlinearity compensation permits the use of channelized pre- and post-dispersion compensators. Namely, at each end of the transmission line, apart from a common pre- or post-dispersion compensator shared by all channels, each individual channel may have a channelized dispersive element, or a short piece of fiber with the length fine-tuned, to compensate the channel-dependence of dispersion if any. Finally, it should be noted that a recent paper [54] proposes to compensate the timing jitter due to intra-channel XPM in a transmission fiber using the nonlinearity of a DCF, which is similar in spirit to our method of intra-channel nonlinearity compensation using scaled translational symmetry. However, the proposal in [54, 55] is limited to the compensation of timing jitter of RZ pulses that are Gaussian-shaped, whereas our method could compensate both the amplitude fluctuation and timing jitter due to intra-channel nonlinear interactions of arbitrarily shaped pulses, with the only condition for suppressing intra-channel FWM that the signal pulses when chirp-free should be all real-valued upon a suitable choice of frequency and phase for the optical carrier. More importantly, the work presented in [54, 55] did not recognize the significance of scaling the dispersion, loss and nonlinear coefficients of the DCF with respect to the transmission fiber, which is a necessary condition for optimal compensation of nonlinear effects. On the practical side, the proposal in [54, 55] requires fiber Bragg grating dispersion compensators, which are limited in operating bandwidth and may suffer problems as thermal instability and group-delay ripples.

Figure 31:
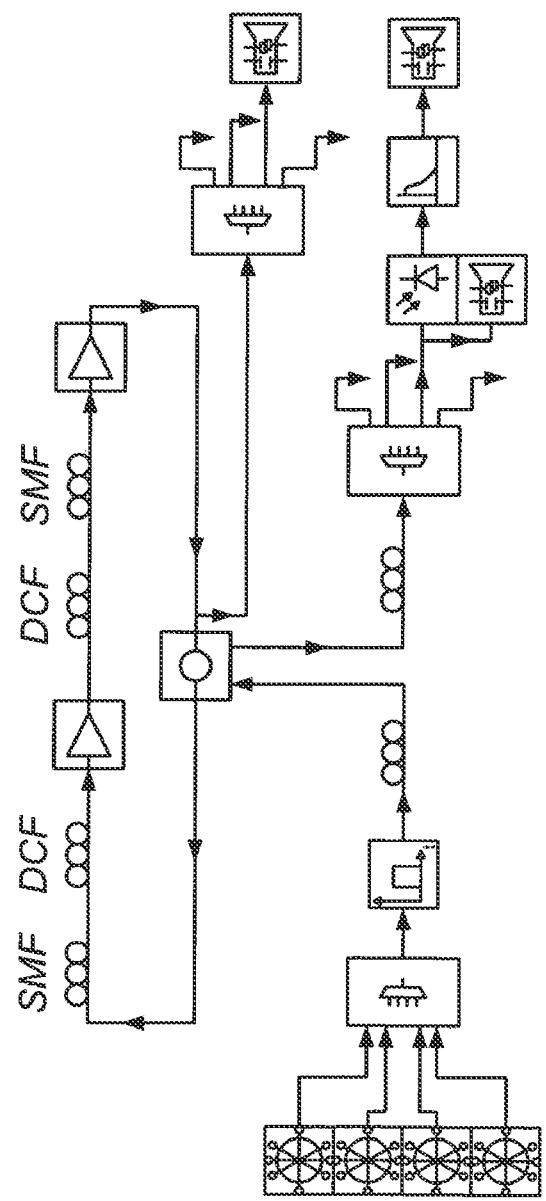
FIG. 31 illustrates a transmission line consists of 6 pairs of fiber spans, with the first span in each pair having 50 km SMF followed by 50 km RDF then 16 dB EDFA gain, and the second span having 40 km RDF followed by 40 km SMF then 20 dB EDFA gain.
Figure 32:
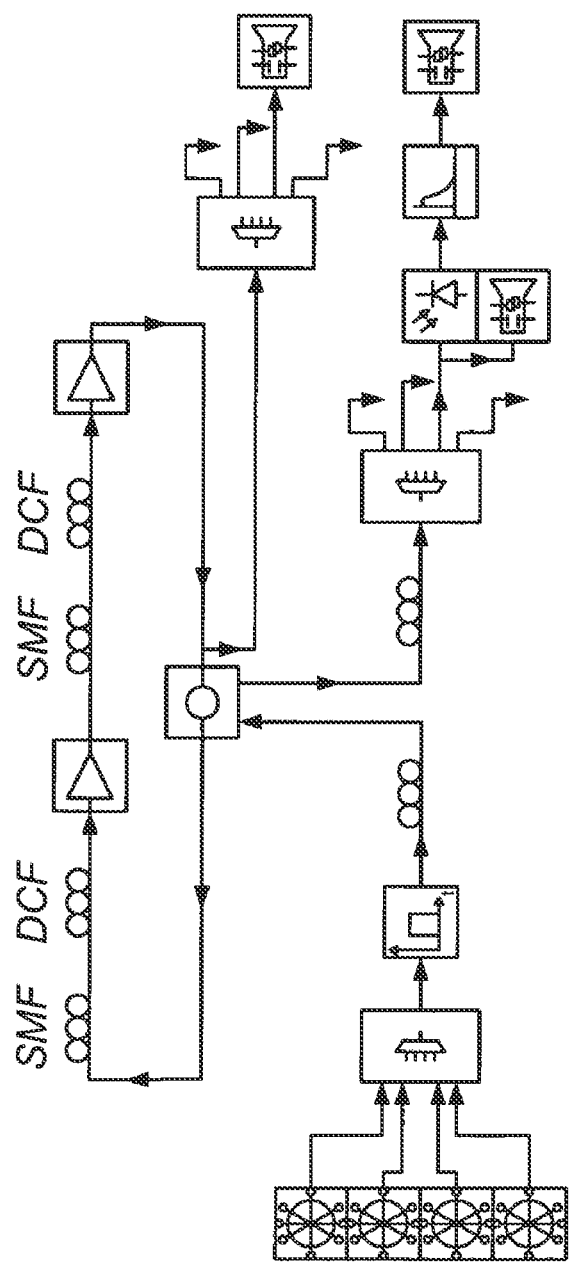
FIG. 32 illustrates a transmission line consists of 6 pairs of fiber spans, with the first span in each pair having 50 km SMF followed by 50 km RDF then 16 dB EDFA gain, and the second span having 40 km SMF followed by 40 km RDF then 20 dB EDFA gain.
Figure 33:
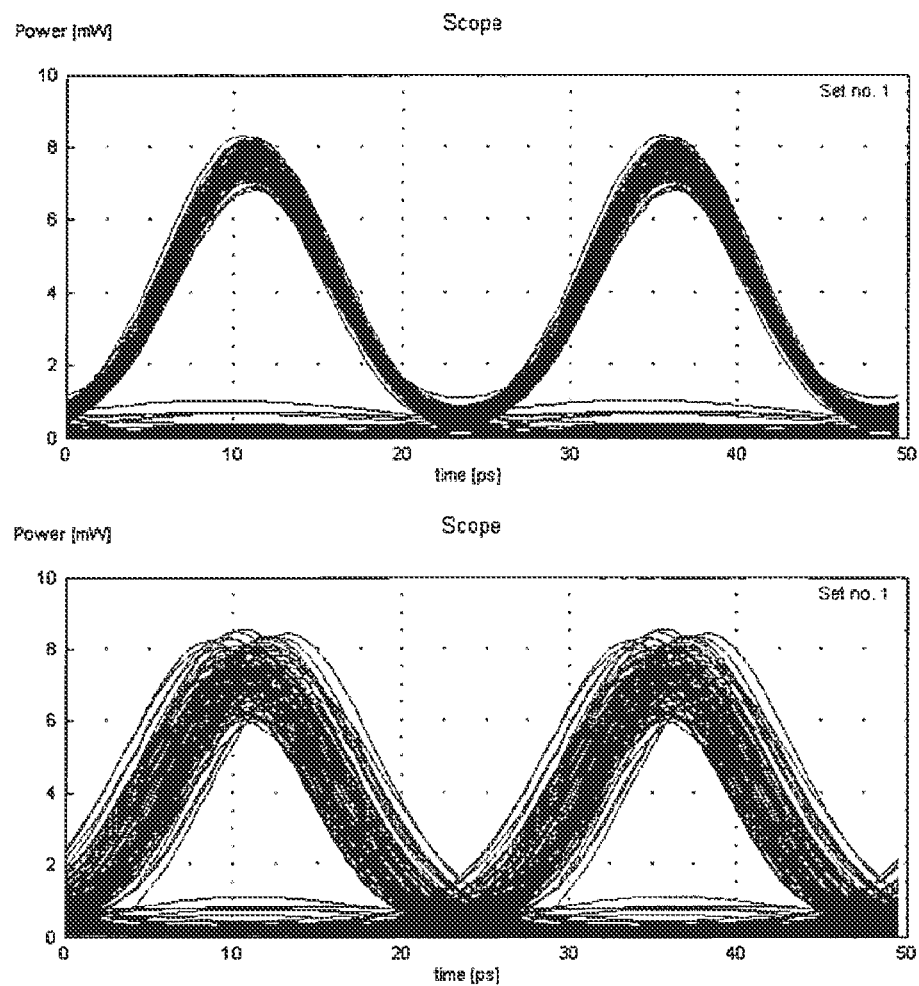
FIG. 33 illustrates the transmission results with $\delta D=0$ and amplifier noise turned off to signify the nonlinear effects. Top: received optical eye diagram of the scaled translationally symmetric setup in FIG. 31. Bottom: received optical eye diagram of the setup in FIG. 32 without scaled translational symmetry.
Figure 34:
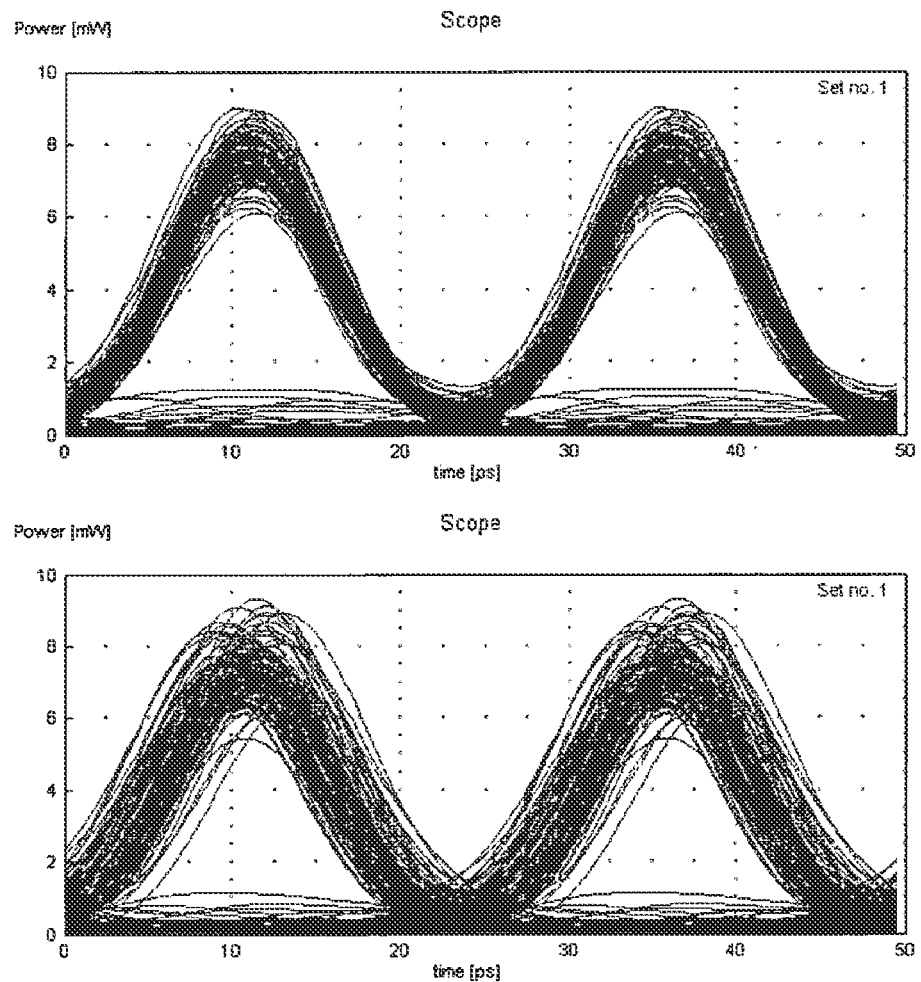
FIG. 34 illustrates the transmission results with $\delta D=0$ and amplifier noise turned on. Top: received optical eye diagram of the scaled translationally symmetric setup in FIG. 31. Bottom: received optical eye diagram of the setup in FIG. 32 without scaled translational symmetry.
Figure 35:
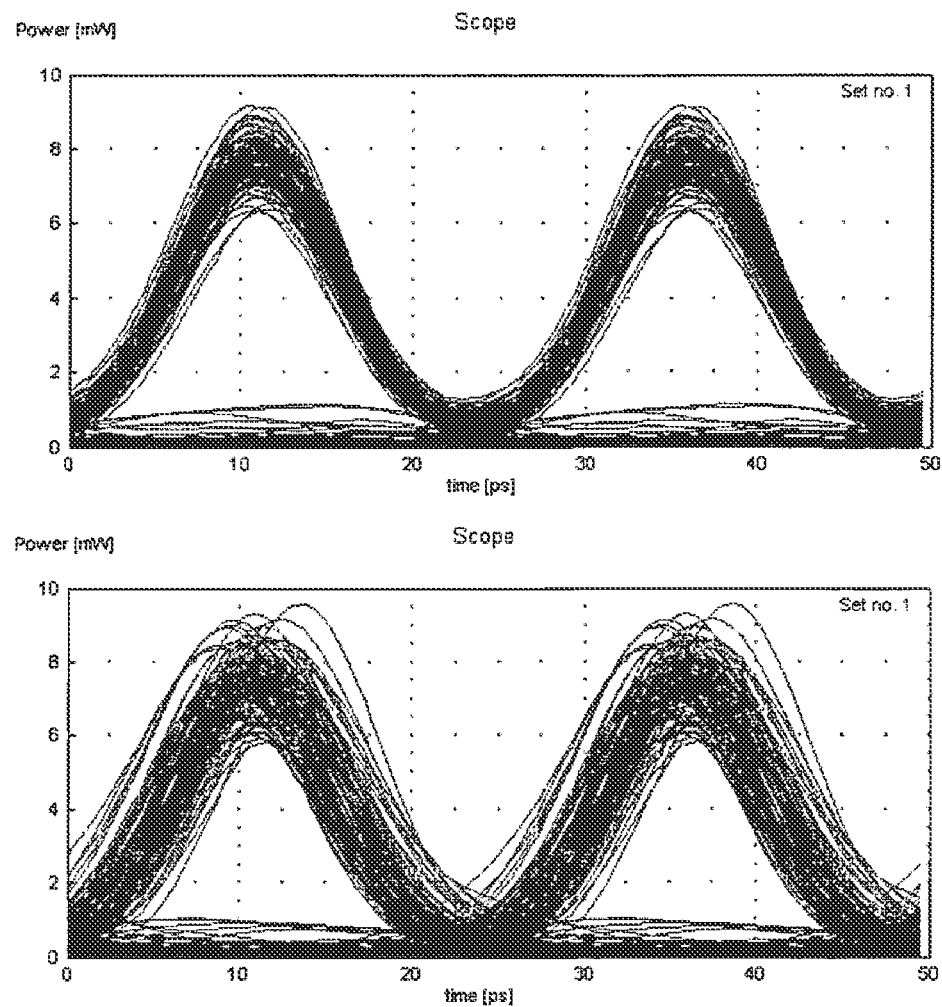
FIG. 35 illustrates the transmission results with $\delta D=0.2$ ps/nm/km and amplifier noise turned on. Top: received optical eye diagram of the scaled translationally symmetric setup in FIG. 31. Bottom: received optical eye diagram of the setup in FIG. 32 without scaled translational symmetry.
Figure 36:
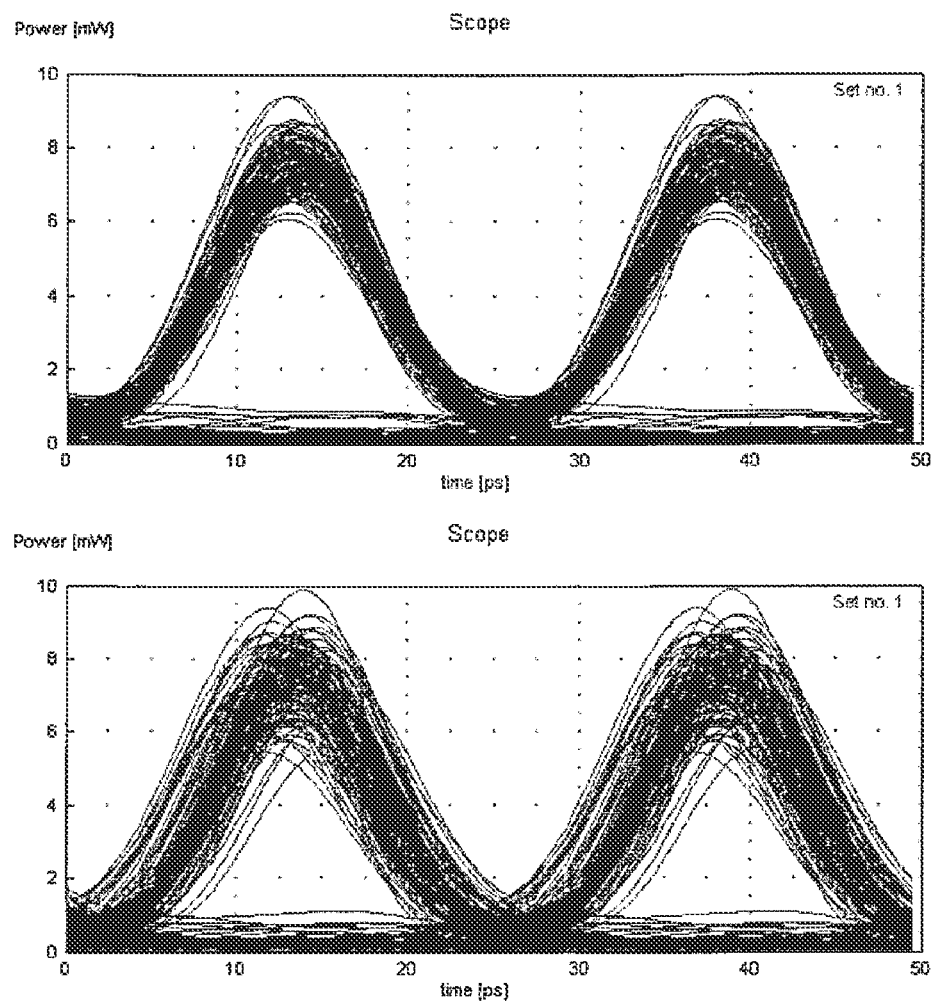
FIG. 36 illustrates the transmission results with $\delta D=0.6$ ps/nm/km and amplifier noise turned on. Top: received optical eye diagram of the scaled translationally symmetric setup in FIG. 31. Bottom: received optical eye diagram of the setup in FIG. 32 without scaled translational symmetry.

As usual, numerical simulations are carried out to support our theoretical analysis and verify the effectiveness of our method of suppressing intra-channel nonlinearity using scaled translational symmetry. In one test system, as depicted in FIG. 31, the transmission line consists of 6 pairs of compensating fiber spans totaling a transmission distance of 1080 km. The first span in each pair has 50 km SMF followed by 50 km RDF then an EDFA with gain 16 dB, the second span has 40 km RDF followed by 40 km SMF then an EDFA with gain 20 dB. The other test system consists of the same number of spans with the same span lengths, which are constructed using the same fibers and EDFAs as the first system except that the second span in each span-pair has the 40-km SMF placed before the 40-km RDF, as shown in FIG. 32. The EDFA noise figure is 4 dB. The SMF has loss $\alpha=0.2$ dB/km, dispersion $D=16+\delta D$ ps/nm/km, and dispersion slope $S=0.055$ ps/nm$^2$/km, effective modal area $A_{eff}=80$ μm$^2$, while the RDF has $\alpha=0.2$ dB/km, $D=-16$ ps/nm/km, $S=-0.055$ ps/nm$^2$/km, and $A_{eff}=30$ μm$^2$. Fiber-based pre- and post-dispersion compensators equalize 11/24 and 13/24 respectively of the total dispersion accumulated in the transmission line. Both the SMF and the RDF have the same nonlinear index of silica $n_2=2.6\times10^{-20}$ m$^2$/W. The transmitter has four 40 Gb/s WDM channels. The center frequency is 193.1 THz, and the channel spacing is 200 GHz. All four channels are co-polarized and RZ-modulated with 33% duty cycle and peak power of 15 mW for the RZ pulses. The multiplexer (MUX) and DEMUX filters are Bessel of the 7th order with 3 dB-bandwidth 80 GHz. The electrical filter is third-order Bessel with 3 dB-bandwidth 28 GHz. The results of four-channel WDM transmissions have been compared with that of single-channel transmissions, with no clearly visible difference observed, which indicates the dominance of intra-channel nonlinearity and the negligibility of inter-channel nonlinear effects. Several trials with various values for $\delta D$ have been simulated for each test system. The following figures present the eye diagrams of optical pulses after wavelength DEMUX, in order to signify the nonlinear deformation (timing and amplitude jitters) of optical pulses and the generation of ghost-pulses. FIG. 33 shows the received optical pulses of $\delta D=0$ for the two test systems, with the amplifier noise being turned off to signify the nonlinear impairments (bottom diagram) and the effectiveness of nonlinearity compensation (top diagram). Clearly shown is the suppression of nonlinear impairments by using scaled translational symmetry, and especially visible is the reduction of pulse timing jitter, as seen from the thickness of the rising and falling edges as well as the timing of pulse peaks. In both eye diagrams, there are optical pulses with small but discernable amplitudes above the floor of zero signal power, which could be attributed to ghost-pulse generation [44, 48, 49] due to the uncompensated in-phase components of intra-channel FWM. When the amplifier noise is turned back on, as shown in FIG. 34, the received signals become slightly more noisy, but the suppression of nonlinear distortions is still remarkable when there is scaled translational symmetry. Then $\delta D=0.2$ ps/nm/km was set for the two test systems of FIG. 31 and FIG. 32 respectively, in order to showcase that a mirror-symmetric ordering of pairwise translationally symmetric fiber spans is fairly tolerant to the residual dispersions in individual fiber spans. In this setting, each fiber span has 10 or 8 ps/nm/km worth of residual dispersion, and the accumulated dispersion totals 108 ps/nm/km for the entire transmission line. Importantly, the pre- and post-dispersion compensators are set to compensate 11/24 and 13/24 respectively of the total dispersion, ensuring at least approximately the complex conjugateness between the input signals to each pair of spans in scaled translational symmetry. The amplifier noise is also turned on. The transmission results, as shown in FIG. 35, are very similar to that with $\delta D=0$, which demonstrates the dispersion tolerance nicely. In a better optimized design to tolerate higher dispersion mismatch |$\delta D$|, either SMFs or RDFs may be slightly elongated or shortened in accordance with the value of $\delta D$, such that the same residual dispersion is accumulated in all spans. As an example, $\delta D$ is set to 0.6 ps/nm/km and each 40-km SMF is elongated by about 0.4 km, so that all spans have the same residual dispersion of 30 ps/nm/km, and the whole transmission line accumulates 360 ps/nm/km worth of dispersion. The pre- and post-dispersion compensators equalize $360\times11/24=165$ and $360\times13/24=195$ ps/nm/km worth of dispersion respectively. The amplifier noise is still on. The transmission results are shown in FIG. 36.

Figure 37:
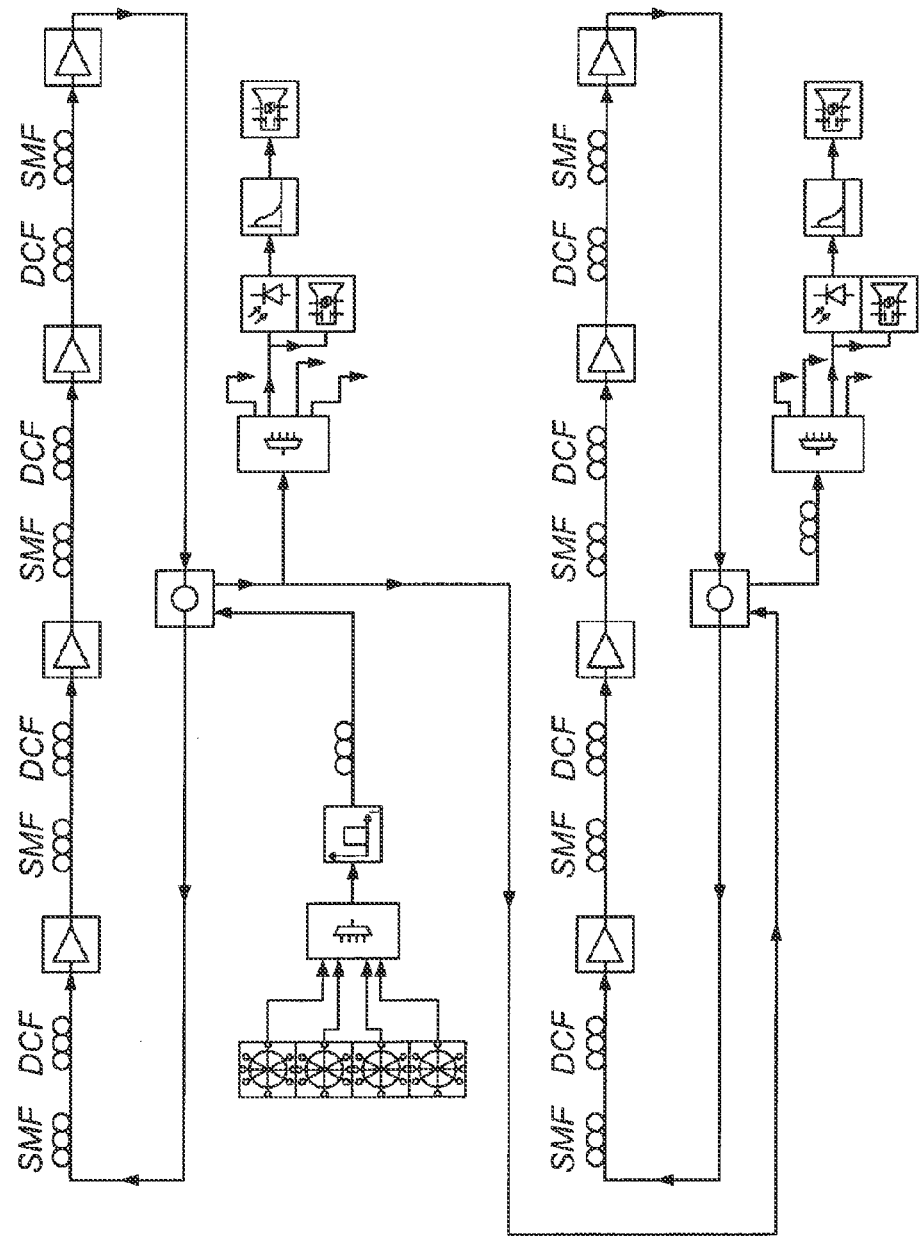
FIG. 37 illustrates an optimized system using SMF+RDF and RDF+SMF spans with the "one-for-many" scaled translational symmetry.
Figure 38:
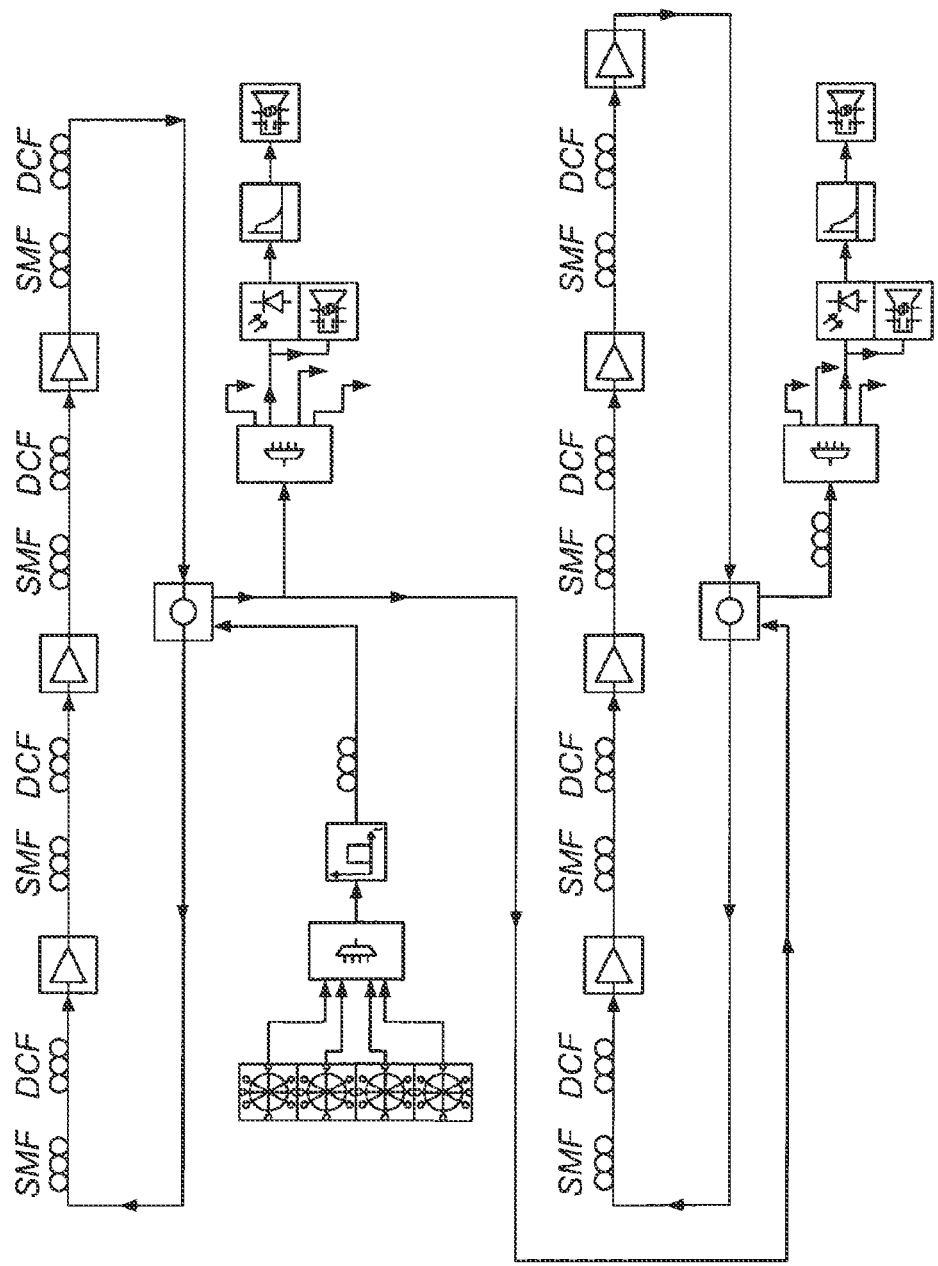
FIG. 38 illustrates a comparative system using all SMF+RDF spans without the "one-for many" scaled translational symmetry.
Figure 39:
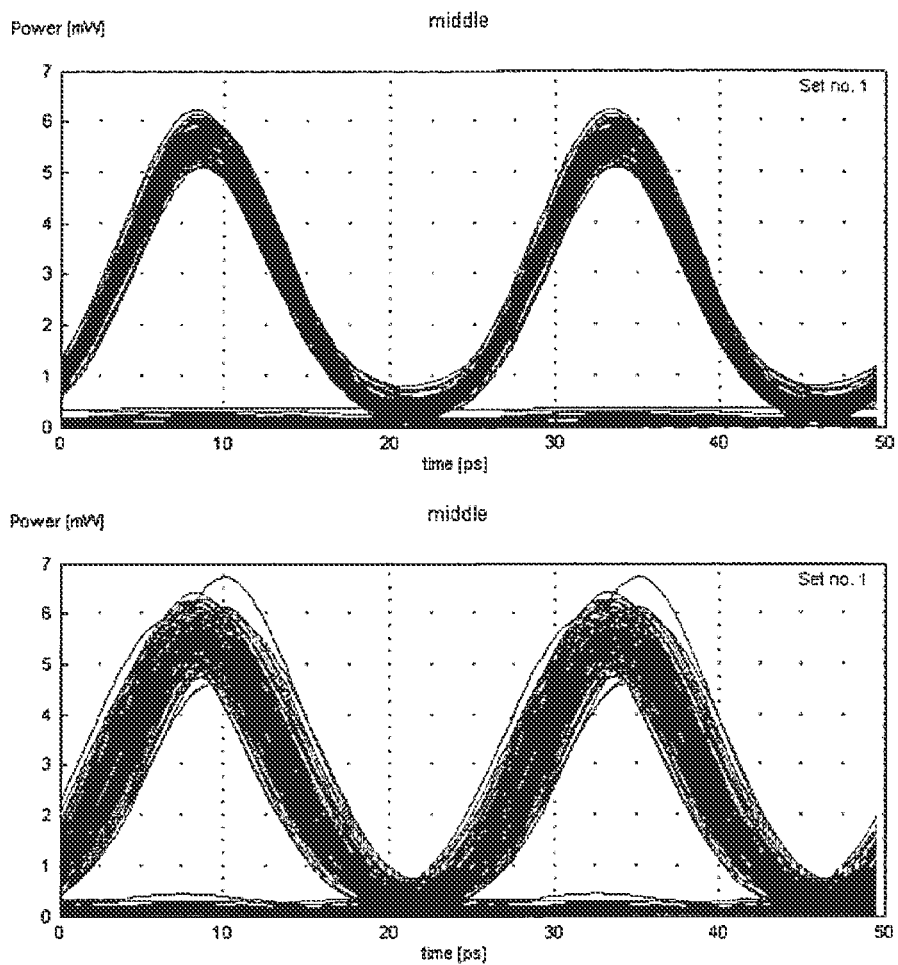
FIG. 39 illustrates optical eye diagrams at the mid-span of transmissions. Top: of the optimized system; Bottom: of the comparative system.
Figure 40:
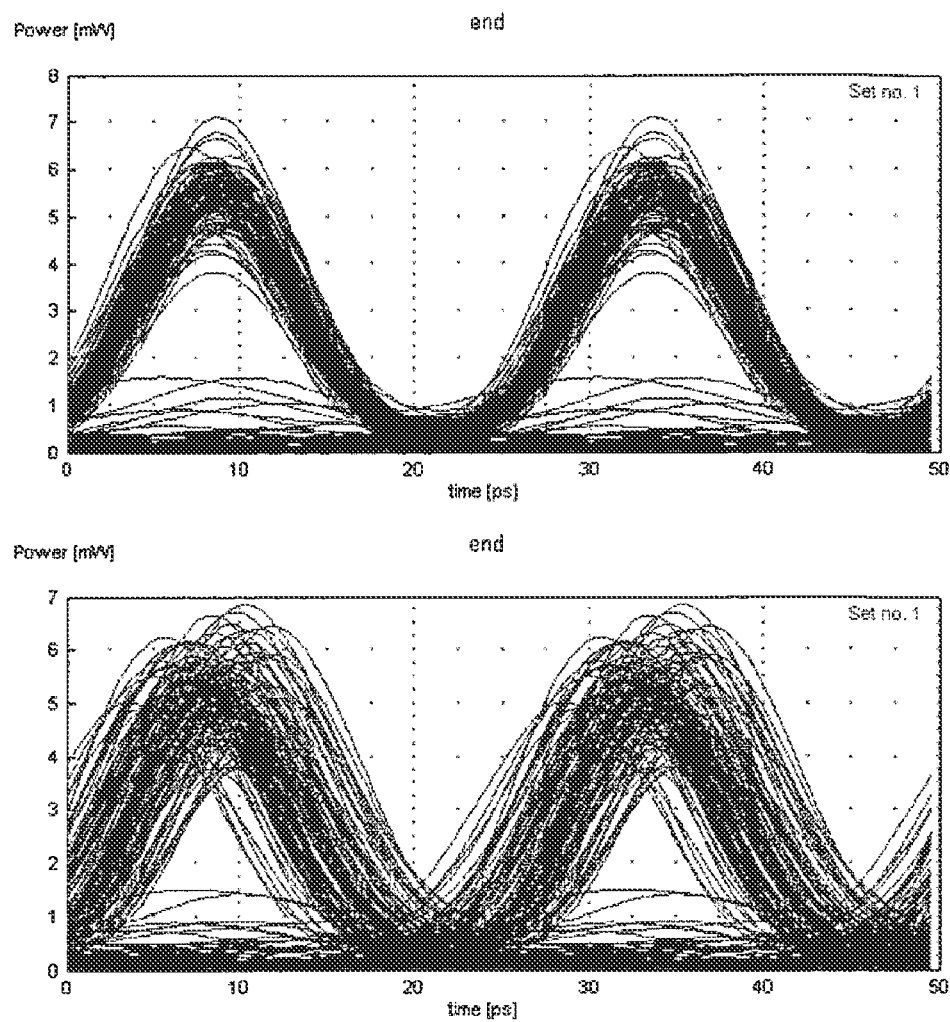
FIG. 40 illustrates optical eye diagrams at the end of transmissions. Top: of the optimized system; Bottom: of the comparative system.

For an example of intra-channel nonlinear compensation using "one-for-many" scaled translational symmetry, we have simulated an optimized system using SMF+RDF and RDF+SMF spans as shown in FIG. 37 and a comparative system using all SMF+RDF spans as shown in FIG. 38. Each system is a cascade of two identical transmission lines. Each transmission line has a loop recirculating twice, with each loop consisting of four spans. In the optimized system, each loop consists of three SMF+RDF spans each consisting of 40 km SMF+40 km RDF+16 dB EDFA, and one RDF+SMF span consisting of 40 km RDF+40 km SMF+16 dB EDFA. Each loop in the comparative system has all four identical SMF+RDF spans consisting of 40 km SMF+40 km RDF+16 dB EDFA. The SMF has loss $\alpha=0.2$ dB/km, dispersion $D=16$ ps/nm/km, dispersion-slope $S=0.055$ ps/nm$^2$/km, effective modal area $A_{eff}=80$ μm$^2$, and the RDF has $\alpha'=0.2$ dB/km, $D'=-16$ ps/nm/km, $S'=-0.055$ ps/nm$^2$/km, $A'_{eff}=30$ μm$^2$, the EDFA has noise figure 4 dB. The inputs are four 40 Gb/s channels, RZ modulated with peak power 10 mW and duty cycle 33%. The channel spacing is 200 GHz. The optical MUX and DEMUX consist of Bessel filters of the 7th order with 3 dB bandwidth 100 GHz. Note that the optimized system is configured such that each RDF+SMF span corresponds to and compensates the intra-channel nonlinear effects of three SMF+RDF spans. Again we have tried both a case with all spans being injected exactly the same amount of signal power and a case with the RDF+SMF spans being fed with 10% more power comparing to the SMF+RDF spans. No observable difference is found in the transmission performance, which indicates robustness of the system design against reasonable parameter deviations. The comparative system has no "one-for-many" scaled translational symmetry. FIG. 39 shows typical eye diagrams of the received optical signals at the mid-span of the transmissions, namely, after the first transmission line of 640 km for each system. The eye diagram of the optimized system shows significantly reduced amplitude and timing jitters than the one of the comparative system, which demonstrates the effect of intra-channel nonlinear compensation with the "one-for-many" scaled translational symmetry. At the end of the 1280 km transmissions, as shown in FIG. 40, the comparative system suffers from significantly more signal degradations than the optimized system, especially in terms of amplitude and timing jitters of the mark pulses. However, it is noted that the optimized system is also penalized by the accumulation of noise energy in the "originally empty" time slots.

Reversing Intra-channel Ghost-pulse Generation by Mid-span Self-phase Modulation In high-speed long-distance fiber-optic transmissions, a major limitation is imposed by the intra-channel nonlinear effects, such as the pulse amplitude and timing jitters due to intra-channel cross-phase modulation (IXPM) and intra-channel four-wave mixing (IFWM) respectively [39]. A method has been proposed to suppress the intra-channel nonlinearities using Raman-pumped transmission lines manifesting a lossless or mirror-symmetric map of signal power [46, 52]. However, the loss of pump power makes it difficult to maintain a constant gain in a long transmission fiber. Consequently, the significant deviation of signal power profile from a desired mirror-symmetric map degrades the result of intra-channel nonlinear compensation using mirror symmetry [53]. The above has shown that transmission lines designed with translational symmetries in power and dispersion maps could also effectively compensate the IXPM and one aspect of IFWM, so to greatly reduce the timing and amplitude jitters. There have also been recent publications along the similar direction [54, 55]. In particular, our mathematical formulation in the previous section provides a general and unified theory for intra-channel nonlinearity compensation using translational or mirror symmetry, and more importantly, it emphasizes the necessity of scaling dispersion, loss coefficient, as well as the product of nonlinear coefficient and signal power in fibers, for optimal nonlinearity compensation. The one aspect of IFWM refers to amplitude fluctuation in the "pulse-ON" slots due to coherent superpositions of nonlinearly generated fields onto the original pulses. However, neither the mirror nor the translational symmetry could hold back another aspect of IFWM, namely, the generation of "ghost-pulses" into the "pulse-OFF" slots where there are originally no optical pulses [44, 48, 56, 57]. The growth of ghost-pulses will eventually limit the transmission distance. Here we show that self-phase modulation (SPM) in the middle could make the two parts of a long transmission line generating oppositely signed ghost amplitudes, such that the ghost-pulses are annihilated or greatly suppressed at the end.

The amplitude envelope of a single channel may be represented by a sum of optical pulses, namely, $A(z,t)=\Sigma_k u_k(z,t)$, where $u_k(z,t)$ denotes the pulse in the kth time slot and centered at time $t=kT$, with $k \in Z$ and $T>0$ being the duration of one symbol. Again, the following nonlinear Schrödinger equation describes the propagation and nonlinear interactions among the pulses [39], $$\frac{\partial u_k}{\partial z} + \frac{i\beta_2(z)}{2}\frac{\partial^2 u_k}{\partial t^2} + \frac{\alpha(z)}{2}u_k = i\gamma(z)\sum_m \sum_n u_m u_n u_{m+n-k}^*, \quad (45)$$

$$\forall k \in Z,$$

where the right-hand side keeps only those nonlinear products that satisfy the phase-matching condition. The nonlinear mixing terms with either m=k or n=k contribute to SPM and IXPM, while the rest with both m≠k and n≠k are responsible for IFWM [39]. For a pulse-OFF time slot, for example the kth, the original pulse amplitude $u_k(0,t)=0$, however the Kerr nonlinearity will generate a ghost amplitude into this slot. In the regime of weak nonlinearity where perturbation theory applies, the ghost amplitude is approximated by a linear accumulation of nonlinear products over the propagation distance, $$u_k(z,t) \approx \int_0^z \sum_{m \neq k}\sum_{n \neq k} u_m(s,t)u_n(s,t)u_{m+n-k}^*(s,t)ds. \quad (46)$$

Consider two transmission lines in cascade, one stretching from z=0 to z=L, the other from z=L to z=L+L'. Assuming dispersion is compensated in each line such that optical pulses "return" approximately to their original shapes at z=L and z=L+L'. Each line may consist of multiple power-repeated and dispersion-equalized fiber spans which are suitably arranged to form a scaled translational or mirror symmetry. Therefore, both lines are effective for suppressing the timing and amplitude jitters in the pulse-ON slots. However, they are not able to prevent the growth of ghost amplitudes in the pulse-OFF slots. The two lines are not necessarily the same, but assumed to generate approximately the same ghost amplitudes, namely, $$\int_L^{L+L'} \sum_{m \neq k}\sum_{n \neq k} u_m(z,t)u_n(z,t)u_{m+n-k}^*(z,t)dz \approx u_k(L,t) = \int_0^L \sum_{m \neq k}\sum_{n \neq k} u_m(z,t)u_n(z,t)u_{m+n-k}^*(z,t)dz, \quad (47)$$

for all pulse-OFF slots labelled by k. So the ghost amplitude will accumulate into $u_k(L+L',t)=2u_k(L,t)$ at the end, as long as the perturbation assumption still holds. If the transmission lines become too long, the approximation of linear accumulation of ghost amplitudes will eventually break down. The ghost amplitudes will actually grow exponentially as a result of parametric amplification pumped by the mark pulses. A method of ghost-pulse suppression may need to clean the ghost amplitudes or start reversing their accumulation before they become too strong.

Figure 41:
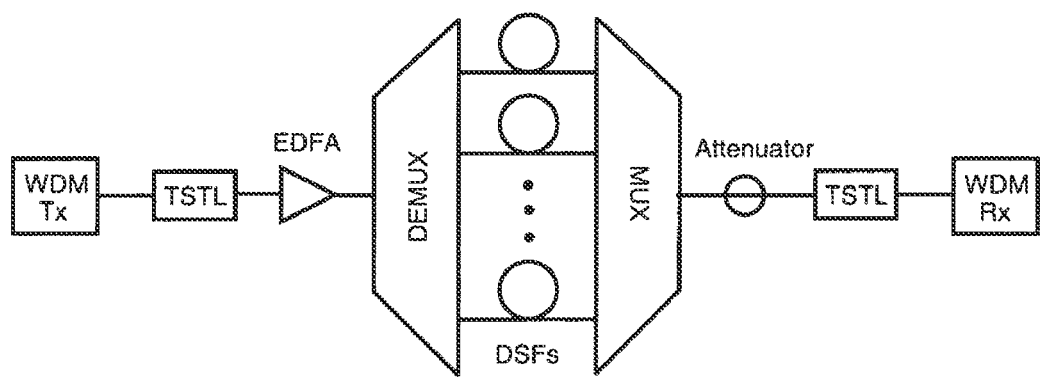
FIG. 41 illustrates two transmission lines with channelized self-phase modulation in the middle. TSTL: scaled translationally symmetric transmission line. DSF: dispersion-shifted fiber for self-phase modulation.

Now consider introducing a self-phase modulator for each wavelength channel in the middle of the two lines at z=L, and adjusting the signal power such that the amount of nonlinear phase shift reaches π approximately at the peak of an optical pulse. FIG. 41 shows such two transmission lines with channelized SPM in the middle, where each transmission line is scaled translationally symmetrically configured for intra-channel nonlinearity compensation. After mid-span SPM, all "originally ON" pulses acquire approximately a π phase shift, while the ghost-pulses in the "originally OFF" time slots experience negligible to small phase shifts due to their low power level. As a consequence, the IFWM products generated in the second line from z=L to z=L+L' would acquire a factor $(-1)^3=-1$ with respect to when mid-span SPM is absent. For a typical pulse-OFF slot labelled by k, the following calculation gives the ghost amplitude generated from start to end through the two transmission lines with SPM in the middle, $$\int_0^L \sum_{m \neq k} \sum_{n \neq k} u_m(z,t) u_n(z,t) u_{m+n-k}^*(z,t) dz + \qquad (48)$$

$$\int_L^{L+L'} \sum_{m \neq k} \sum_{n \neq k} [-u_m(z,t)][-u_n(z,t)][-u_{m+n-k}(z,t)]^* dz =$$

$$\int_0^L \sum_{m \neq k} \sum_{n \neq k} u_m(z,t) u_n(z,t) u_{m+n-k}^*(z,t) dz -$$

$$\int_L^{L+L'} \sum_{m \neq k} \sum_{n \neq k} u_m(z,t) u_n(z,t) u_{m+n-k}^*(z,t) dz \approx 0,$$

according to equation (47). Instead of adding up constructively, the ghost amplitudes generated by the two lines interfere destructively to cancel each other at the end z=L+L'. Good transmission performance may be expected from the overall system, as a result of the suppression of amplitude and timing jitters for originally ON pulses and the elimination of ghost-pulses in the originally OFF time slots.

For implementations, the self-phase modulator may be based on the fiber Kerr nonlinearity [25], cascaded $\chi^{(2)}$ in LiNbO$_3$ waveguides [58, 59], the index change induced by carrier density variations in semiconductor optical amplifiers [60], or a combination of a photodiode detecting the optical pulses and electro-optic phase modulator driven by the generated electrical pulses [61, 62]. A fiber-based self-phase modulator may be a better choice than others because of its simplicity and capability of polarization-insensitive operation. Furthermore, a suitable value of fiber dispersion may be chosen such that optical pulses propagate in a soliton-like manner through the nonlinear fiber, in order to reduce the pulse spectral broadening due to SPM [25]. If SPM is not properly balanced by dispersion, then only the peak of a pulse receives a $\pi$ phase shift, the rising and falling edges experience less and varying phase shifts, which lead to frequency chirp and spectral broadening. Excessive spectral broadening may cause crosstalk among wavelength channels and decrease the spectral efficiency (rate of data transmission in bit/s over available optical bandwidth in Hz) of transmission systems. A soliton, namely a hyperbolic secant pulse, could propagate invariantly in a lossless fiber given the condition $-\beta_2=\gamma P_0 T_0^2$, where $\beta_2$ and $\gamma$ are the dispersion and nonlinear coefficients of the fiber, $P_0$ and $T_0$ are the peak power and width parameter of the pulse [25]. For actual fibers with loss, strict soliton propagation may not be possible, but the total fiber dispersion may be adjusted so to minimize the frequency chirp of pulses at the end, or to control the chirp at a desired level. An optical filter may also be employed after SPM to limit the spectral width of pulses.

Figure 42:
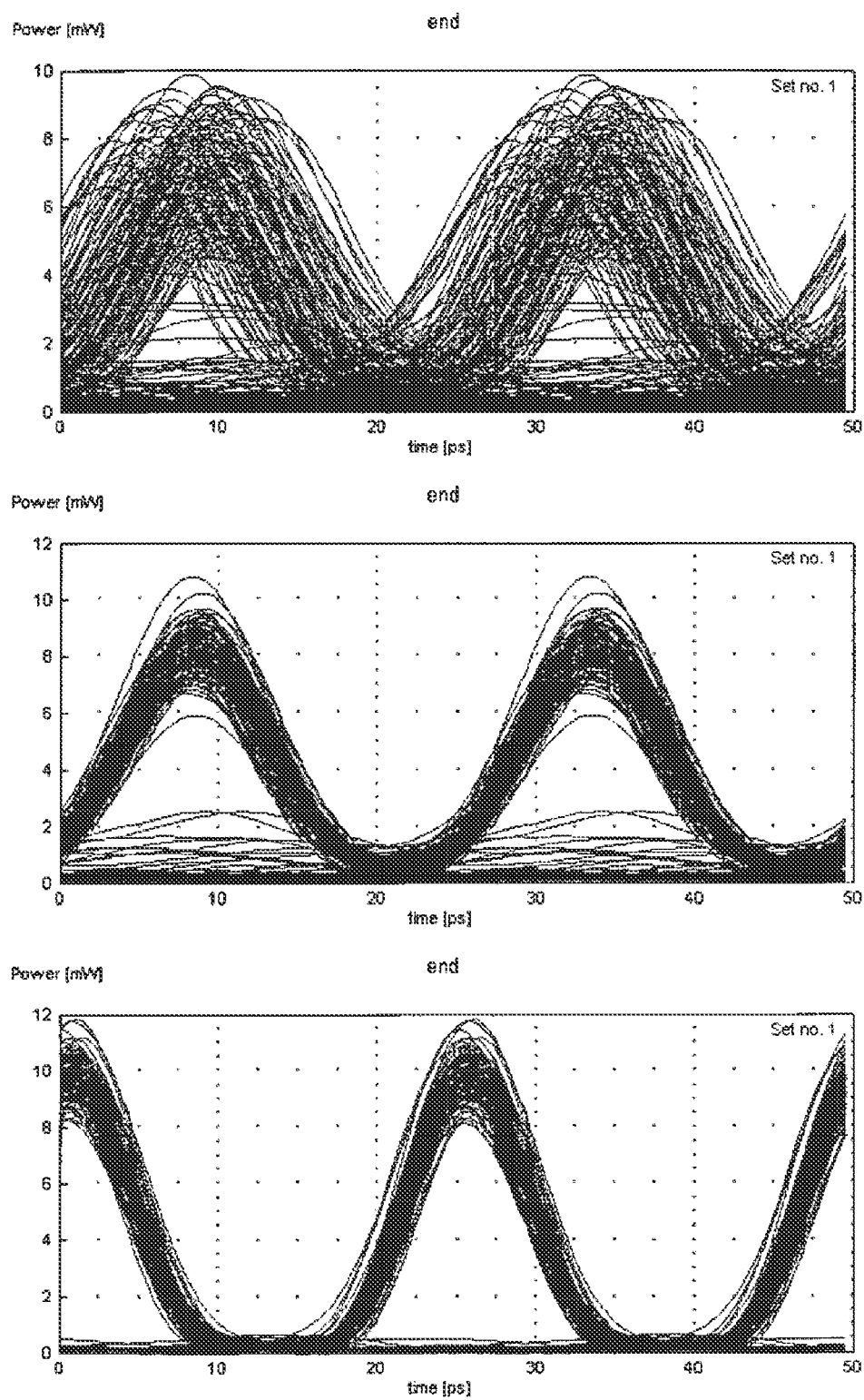
FIG. 42 illustrates optical eye diagrams at the end of transmissions. Top: of a conventional design without translational symmetry. Middle: of a system with scaled translational symmetry. Bottom: of a system with scaled translational symmetry and mid-span SPM.

For numerical verifications, we have simulated and compared the performance of three transmission lines, all of which use SMFs with loss $\alpha$=0.2 dB/km, dispersion D=16 ps/nm/km, effective modal area $A_{eff}$=80 µm$^2$, and RDFs, namely reverse dispersion fibers, with loss $\alpha'$=0.2 dB/km, dispersion D'=−16 ps/nm/km, effective modal area $A'_{eff}$=30 µm$^2$, as well as EDFAs with noise figure 4 dB. The first setup is a conventional design consisting of 16 fiber spans, each span has 45 km SMF, followed by 45 km RDF, and a 18 dB EDFA at the end. The second setup is configured to form a scaled translational symmetry, having 8 repetitions of (50 km SMF+50 km RDF+16 dB EDFA)+(40 km RDF+40 km SMF+20 dB EDFA). Note that the EDFA gains are set in a way that the signal powers into the 50-km SMF and the 40-km RDF are properly scaled. The third system is the same as the second, except for channelized SPM in the middle, using a high-power EDFA, an optical DEMUX/MUX pair, and for each channel a 10-km nonlinear fiber with effective modal area $A''_{eff}$=20 µm$^2$, loss $\alpha''$=0.3 dB/km, and dispersion D"≈3 ps/nm/km. The optical power is boosted to 80 mW before entering each SPM fiber, and attenuated back to the nominal level for transmissions after the self-phase modulator. All fibers are made of silica glass with nonlinear index $n_2$=2.6× 10$^{-20}$ m$^2$/W. Input to all three systems are four 40 Gb/s channels, spaced by 200 GHz, co-polarized, and return-to-zero modulated with 33% duty and peak power 15 mW. The optical filters are of order 7 with bandwidth 100 GHz for MUX/DEMUX. The transmission results are shown in FIG. 42. It is evident that the conventional setup suffers a great deal from nonlinearity-induced amplitude and timing jitters, which are greatly reduced in the system with scaled translational symmetry, where, however, the ghost-pulse generation imposes a serious limitation. With both scaled translational symmetry and mid-span SPM, the third system enjoys a superb signal quality at the end, with small signal fluctuations due to EDFA noise and possibly a little residual nonlinearity.

Figure 43:
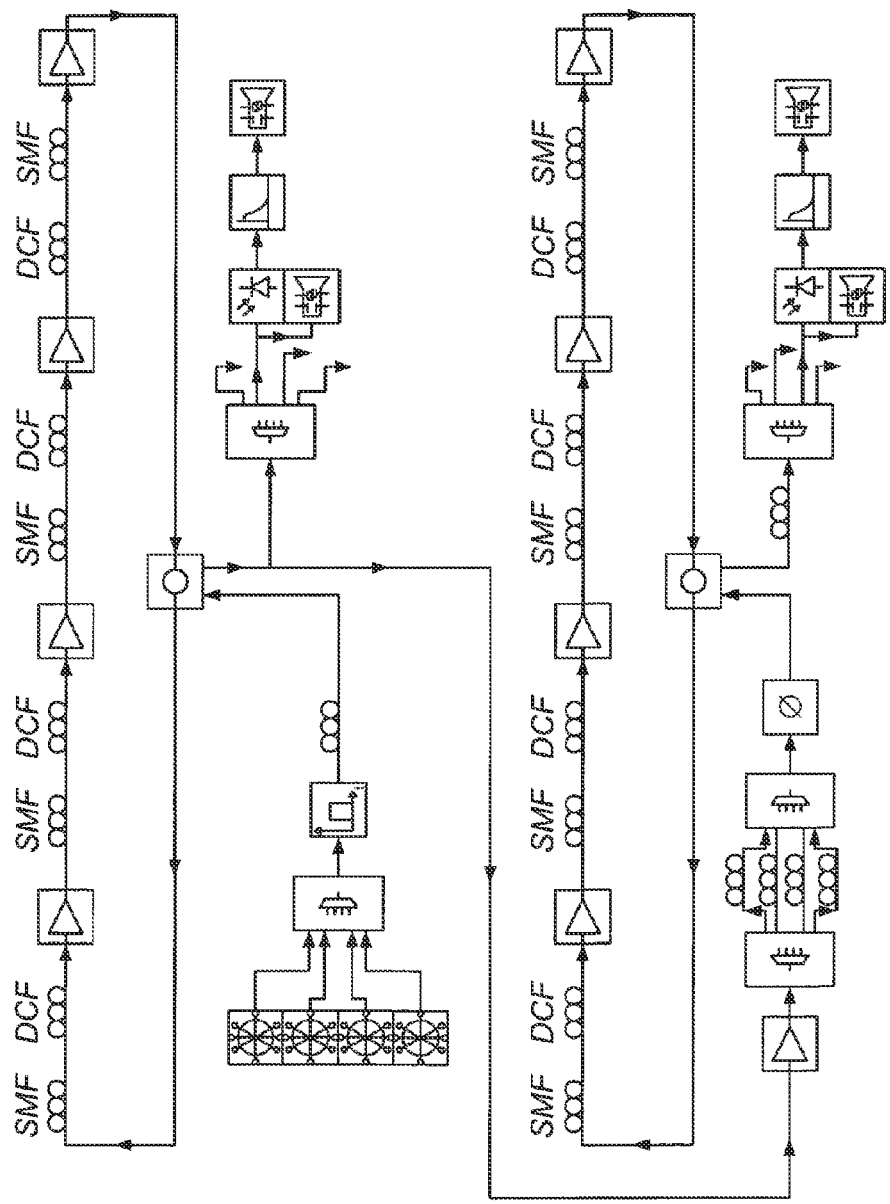
FIG. 43 illustrates an optimized system with "one-for-many" scaled translational symmetry and mid-span SPM.
Figure 44:
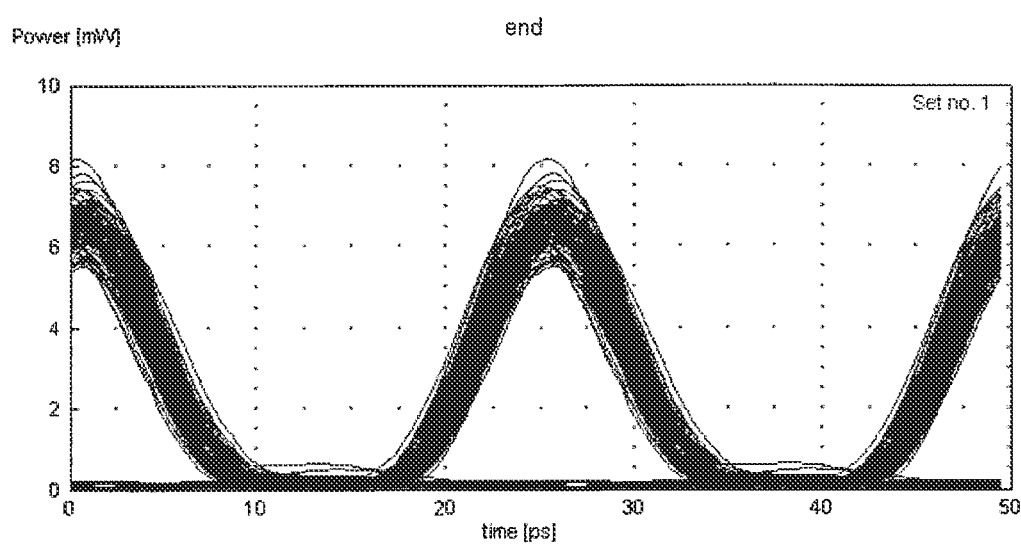
FIG. 44 illustrates a typical eye diagram of optical signals received at the end of the optimized system with "one-for-many" scaled translational symmetry and mid-span SPM.

At the end of the previous section, we have seen that even an optimized system using SMF+RDF and RDF+SMF spans with "one-for-many" scaled translational symmetry suffers a great deal of noise in the originally OFF time slots. A good part of the noise energy there may be due to the growth of ghost-pulses, which is not suppressed by the "one-for-many" scaled translational symmetry alone. Naturally, the above-described method of mid-span SPM may be applied to an optimized system with "one-for-many" scaled translational symmetry. When channelized SPM is introduced at the mid-span of the optimized system depicted in FIG. 37, the resulted setup is shown in FIG. 43. The optical eye diagram received at the end of the 1280 km transmissions is shown in FIG. 44, where the ghost-pulses are substantially removed, in sharp contrast to the top diagram of FIG. 40.

It should be noted that the present method of ghost-pulse suppression by mid-span SPM is not limited to transmission lines with scaled translational symmetries. One or both sides, before or/and after the channelized SPM, may be configured in mirror symmetry as well for intra-channel nonlinearity compensation [46, 52], and ghost-pulse suppression would be just as effective, provided that the two sides generate nearly the same ghost amplitudes to originally empty data slots. Moreover, one or both sides may be a general transmission line that is not optimally designed for intra-channel nonlinearity compensation. In which case, ghost-pulse generations may still be well suppressed due to the cancellation of ghost amplitudes generated by the two sides, however the mark pulses in the originally ON data slots may suffer significant jitters in amplitude and timing, as a result of the transmission system being lacking in a (scaled) translational or mirror symmetry.

It is interesting to compare the present method of mid-span SPM and signal reshaping based on nonlinear optical loop mirrors (NOLMs) [63, 64], both of which are able to suppress ghost-pulses, and both are channelized solutions suitable for systems with a high modulation speed, because where the number of wavelength channels is less and higher optical power is available in each channel for efficient nonlinear effects. While a NOLM is often regarded as a lumped signal regenerator, mid-span SPM may be viewed as a method of distributive signal regeneration, whose action takes place through an entire transmission line. Practically, mid-span SPM would be more convenient than NOLMs, as the latter require interferometry stability and are sensitive to variations of fiber birefringence [65]. On the other hand, NOLMs are capable of "removing" random optical noise due to amplified spontaneous emission and loss-induced quantum noise [66], while mid-span SPM is not.

Optimal Packaging of Dispersion Compensating Fibers for Matched Nonlinear Compensation and Reduced Optical Noise Dispersion compensating fibers have become essential components in high-speed long-distance fiber-optic transmissions. Often they are packaged into compact DCMs and integrated with fiber optical amplifiers at the repeater sites. The loss of signal power in DCFs requires extra gain from optical amplifiers, and amplifiers introduce noise. Because of their small modal area, DCFs could be significant contributors of nonlinearity if the power of signals carried is not limited to a low level. In the past, DCF manufacturers have strived to reduce the loss of DCFs and to lower their nonlinearity by enlarging the modal area [67]. However, reduced DCF nonlinearity does not necessarily translate into improved overall transmission performance. In the above, we have demonstrated that the nonlinear response of DCFs may be taken advantageously to compensate the nonlinearity of transmission fibers (TFs). Simply minimizing the loss in such nonlinearity-compensating DCFs is not necessarily aligned with the best system performance either. Here we propose and analyze a method of packaging DCFs to achieve optimal nonlinearity compensation and good signal-to-noise ratio (SNR) simultaneously. Simply stated, an optimally packaged DCM may consist of two (or more) portions of DCFs with higher and lower loss coefficients. In the first portion that experiences high signal power, the loss coefficient may be intentionally increased in proportion to the DCF dispersion with respect to a TF. In another portion where the signal power is low and nonlinearity is negligible, the loss coefficient may be minimized to output stronger signals while compensating the remaining dispersion due to the TF.

Effective nonlinearity compensation between DCFs and TFs, with or without optical phase conjugation (OPC), relies on careful arrangements of different types of fibers in a transmission line to form the so-called scaled translational symmetry. The above has established the analytical theory and numerical simulations verifying nonlinearity compensation using translational symmetry. Basically, for two fibers to be matched for a translational symmetry in the scaled sense about an optical phase conjugator, their parameters need to obey the following scaling rules, $$[\alpha', \beta'_2, \beta'_3, \gamma' P'_0, g'(t)P'_0] = R[\alpha, -\beta_2, \beta_3, \gamma P_0, g(t)P_0], \quad (49)$$

where $\alpha$, $\beta_2$, $\beta_3$, $\gamma$, and $g(t)$ are the loss, second-order dispersion, third-order dispersion, Kerr and Raman nonlinear coefficients respectively for one fiber, while the "primed" parameters are the corresponding parameters of the other fiber, $P_0$ and $P'_0$ are the signal powers input to the two fibers respectively, $R>0$ is a scaling factor. Such scaled translational symmetry proves to enable nonlinearity compensation between the two matched fibers up to the first-order nonlinear perturbation. The seemingly limited compensation capability based on perturbation is in fact quite relevant and powerful in practice, because the nonlinear response of each fiber segment is indeed perturbative in long-distance transmission lines, and matched fiber pairs may be arranged in a mirror-symmetric order to effectively undo the nonlinear distortions that may have accumulated far beyond the regime of perturbations. In the absence of OPC, a DCF and a TF may still be arranged into a translational symmetry in the scaled sense according to the following rules, $$(\alpha', \beta'_2, \beta'_3, \gamma' P'_0) = R(\alpha, -\beta_2, -\beta_3, \gamma P_0), \quad (50)$$

where again ($\alpha$, $\beta_2$, $\beta_3$, $\gamma$) and ($\alpha'$, $\beta'_2$, $\beta'_3$, $\gamma'$) are parameters of the two types of fibers respectively. In both cases of scaling rules of equations (49) and (50), the requirements for the third-order dispersions may be relaxed, then the two fibers are not in strict translational symmetry across a band of wavelength channels, rather the symmetry and nonlinearity compensation between them become approximate. Nevertheless, such approximation is often a good one when the value of $|\beta_2/\beta_3|$ is high, so that the percentage change of $\beta_2$ is only small across the band, which is exactly the case for SMFs in the 1550-nm band.

Figure 45:
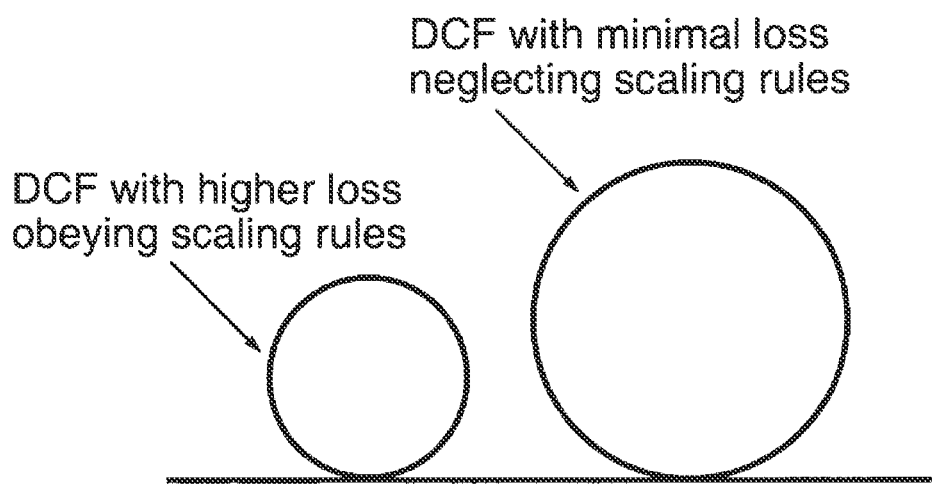
FIG. 45 illustrates two portions of dispersion-compensating fiber packaged into a compact module or cabled into a transmission line, where the first portion may have an intentionally increased loss coefficient to form a scaled translational symmetry with a transmission fiber, while the second portion could have the lowest possible loss coefficient and does not need to satisfy any scaling rule.

In our methods of compensating fiber nonlinearity using translational symmetry with or without optical phase conjugation, dispersion-compensating fibers are brought into scaled translational symmetry with respect to TFs such as SMFs and NZDSFs. As noted before, in regions of dispersion-compensating fibers carrying lower optical power, the scaling rules of fiber parameters in equations (49) or (50) may be relaxed without sacrificing the performance of nonlinearity compensation, both for systems using cabled DCFs into the transmission lines and for systems using lumped DCMs at the repeater sites. Such relaxation may be done for practical convenience, or to control the accumulated dispersion in a span to a desired value, as well as to reduce the span loss so to reduce the penalty due to optical noise. As illustrated in FIG. 45, a compact dispersion-compensating module or a dispersion-compensating transmission line may consist of two portions of dispersion-compensating fiber concatenated, where the first portion carrying high-power signals may have an intentionally increased loss coefficient to form a scaled translational symmetry with a TF, while the second portion experiencing low signal power could have the minimal loss coefficient and does not need to satisfy any scaling rule. The two portions of DCF with higher and minimal loss coefficients may be of one whole piece of fiber coiled with different radiuses, or differently fabricated DCFs with different loss coefficients and possibly different dispersions, so long as the first fiber is in scaled translational symmetry to a target TF. The minimal loss coefficient refers to the lowest fiber loss coefficient that is achievable in practical fabrication of dispersion-compensating fibers. The loss coefficient of the fiber portion on the left side of FIG. 45 is higher in the sense that it is intentionally made higher than what is achievable by practical manufacturing processes.

Figure 46:
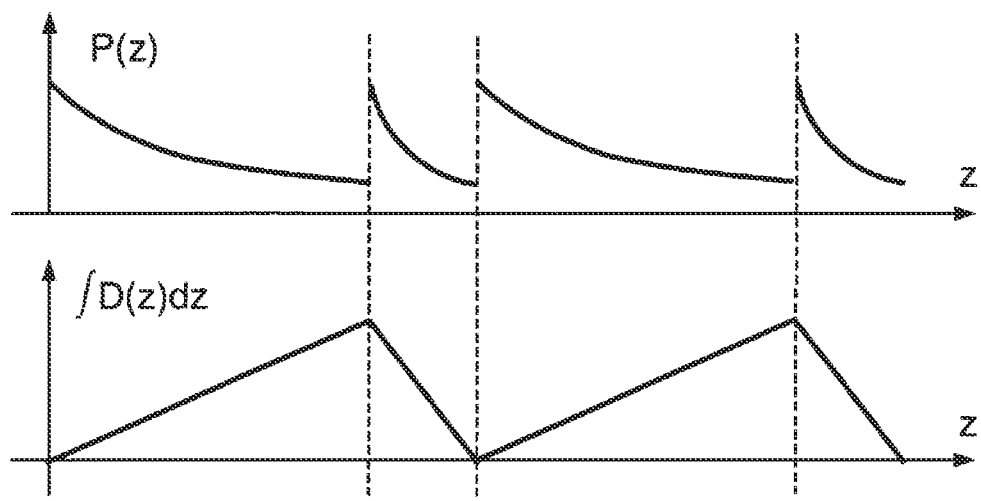
FIG. 46 illustrates the power map and M-type dispersion map over the transmission distance of two traditional fiber spans.
Figure 47:
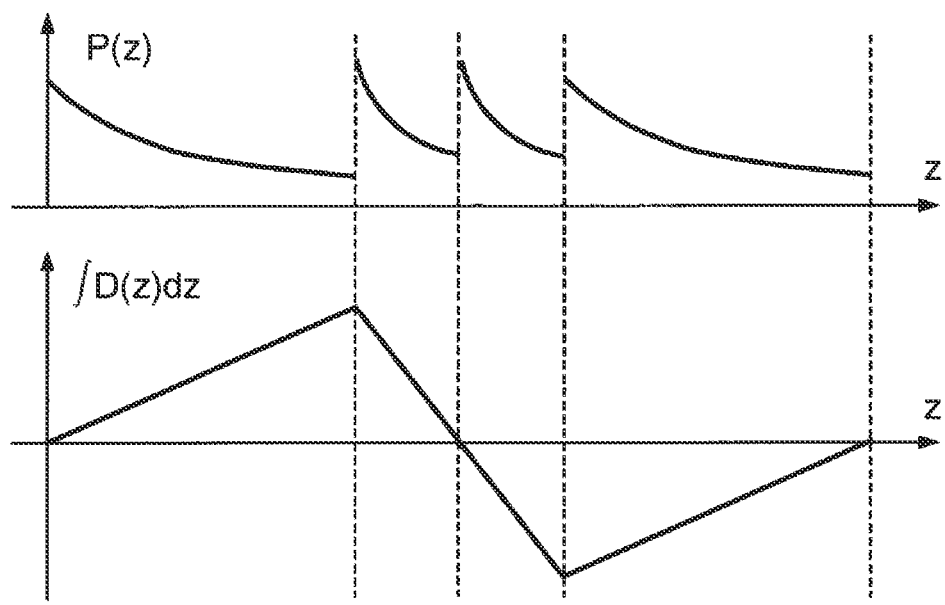
FIG. 47 illustrates the power map and N-type dispersion map over the transmission distance of two matched fiber spans for a scaled translational symmetry.

The great advantage of nonlinearity compensation using scaled translational symmetry is that a pair of matched fiber segments are required to have the same sign for the loss/gain coefficients and opposite dispersions. Such conditions are naturally satisfied in conventional fiber transmission systems, where a TF, for example an SMF, may be paired with a DCF as matched counterparts. However, traditional transmission lines are usually set up with the same configuration for all spans, that is, with a TF followed by a DCF. Consequently, the accumulated dispersion in all spans is single-sided, namely, stays always positive or always negative. Such may be called an M-type dispersion map, as shown in FIG. 46, where no two spans could form a scaled translational symmetry. Our proposal is to simply exchange the ordering of the TF and DCF for some spans, which may be paired with traditional spans to form an N-type dispersion map, where the accumulated dispersion may go both positive and negative and trace an N-like curve, as shown in FIG. 47. A scaled translational symmetry is formed between two matched fiber spans as in FIG. 47, in the sense that the TF of the first span is scaled translationally symmetric to the DCF of the second span, and the DCF of the first span is scaled translationally symmetric to the TF of the second span. Such translational symmetry between two matched spans could cancel some of their intra-channel nonlinearities, or compensate all nonlinearities up to the first-order perturbation if an optical phase conjugator is installed in the middle. Furthermore, many pairs of matched spans may be arranged into a mirror-symmetric order about the point of OPC to form a long-distance transmission line, whose second part could undo the nonlinear distortions due to the first part that may have accumulated far beyond the regime of perturbations.

Figure 48:
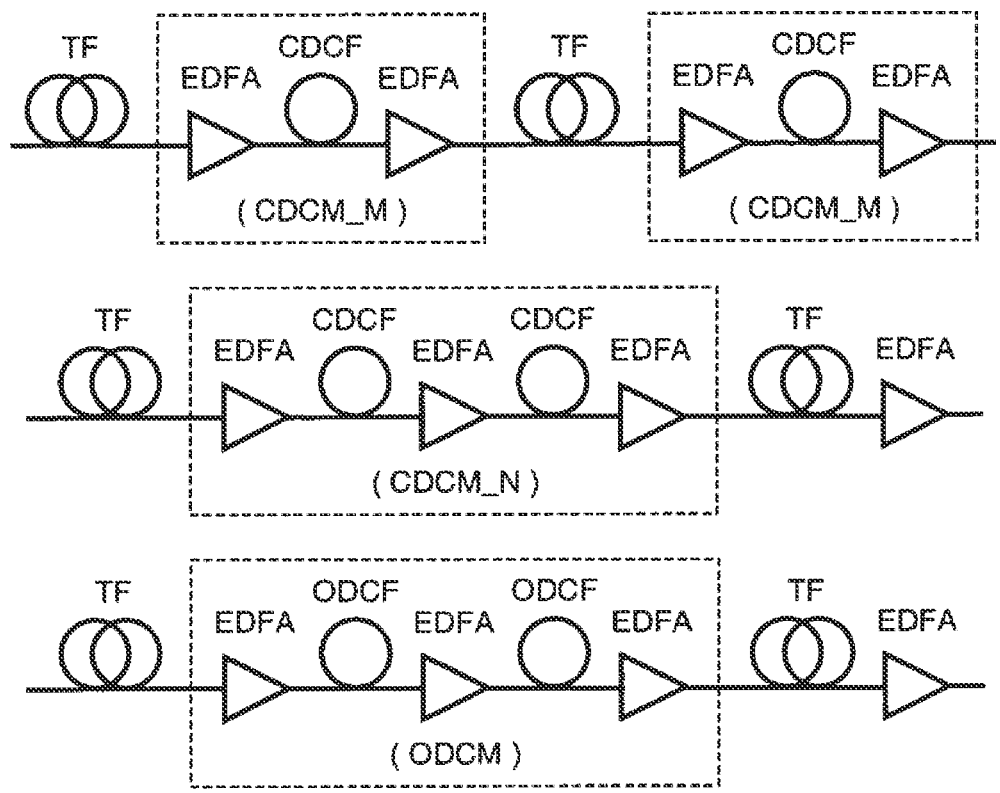
FIG. 48 illustrates three configurations of transmission lines with different dispersion maps and DCMs. Top: an M-type dispersion map using conventional DCMs; Middle: an N-type dispersion map using conventional DCMs; Bottom: an N-type dispersion map using optimized DCMs. Acronyms: CDCF—conventional DCF, ODCF—optimized DCF, CDCM_M—conventional DCM in an M-type dispersion map, CDCM_N—conventional DCM in an N-type dispersion map, ODCM—optimized DCM.

In traditional transmission lines, each fiber span has a TF and a DCM at the end, which consists of a conventional DCF with a multi-stage EDFA. Many such conventional fiber spans are cascaded to form a line with the M-type dispersion map, as shown on the top of FIG. 48, where a conventional DCM is denoted by CDCM_M in short. If the order of TF and DCF is switched for every other span, then an N-type dispersion map is formed, and two adjacent DCFs may be packaged into one DCM, denoted by CDCM_N, as shown in the middle of FIG. 48. As a result of the N-type dispersion map, intra-channel nonlinearities may be suppressed to some extend, and all fiber nonlinearities may be partially compensated at the presence of OPC in the middle of the transmission line. However, the compensation of nonlinearity is not optimal as the scaling rules of equation (49) or (50) are not satisfied by conventional DCFs paired with TFs. Indeed, DCF manufacturers have succeeded in reducing the loss of DCFs, as it was thought to monotonically improve the performance of transmission systems [67]. The dispersion-to-loss ratio (DLR) of state-of-the-art DCFs is often much larger than that of TFs. From the stand point of matched nonlinearity compensation, it would be advantageous to (intentionally) raise the loss of DCFs such that the DLRs of DCFs and TFs are matched to satisfy the scaling rules, at least for portions of fibers carrying high-power signals. On the other hand, in regions of DCFs experiencing low signal power, the nonlinearity is weak and negligible, then the scaling rules may be disregarded and the loss of DCFs may be minimized to enhance the optical SNR at the end of dispersion compensation. Therefore, an optimized DCM (ODCM), as shown at the bottom of FIG. 48, may consist of sections of DCFs with higher and lower loss coefficients, as well as multiple EDFA stages to repeat the signal power and regulate the signal power in the lossier portions of DCFs, according to a set of scaling rules with respect to the TFs. Higher DCF loss may be induced by impurity-doping during fiber manufacturing [32, 33] or by bending loss during fiber packaging [24].

Therefore, a DCM compensating the dispersion and nonlinearity of transmission fibers may be so packaged that the first portion of DCF experiencing a high level of signal power may have a higher loss coefficient satisfying the scaling rule in equation (49) or (50), whereas the second portion of DCF may ignore the scaling rules and become less lossy such that the signal power at the end of the DCM is not too low to be significantly impaired by the amplifier noise. In fact, the low-loss portion of the DCM may even use optical filters other than DCFs, such as fiber Bragg gratings and photonic integrated circuits. This method of packaging DCMs achieves the capability of nonlinearity compensation and good noise performance simultaneously. For instance, it takes 10 km DCF with D'=−80 ps/nm/km to compensate 100 km NZDSF with dispersion D=8 ps/nm/km and loss α=0.2 dB/km. The first 4 km of the DCF may be made highly lossy by a special treatment in manufacturing or packaging, with a loss coefficient α'=2 dB/km to form a scaled translational symmetry with respect to the first 40 km NZDSF for optimal nonlinearity compensation. However, the remaining 6 km DCF may ignore the scaling rules and have a much lower nominal loss α'=0.6 dB/km [4]. The total loss is reduced by 8.4 dB as compared to a DCM that complies strictly with the scaling rules throughout the length of the DCF. Another important parameter of DCFs is the effective modal area, or more directly the nonlinear coefficient. Traditional designs of DCFs have always strived to enlarge the modal area so to reduce the nonlinear effects of DCFs. However, for DCFs used in our methods of nonlinearity compensation, there exists an optimal range of modal area which should be neither too large nor too small. According to the scaling rules of equation (49) or (50), a DCF with a large modal area may require too much signal power to generate sufficient nonlinearity to compensate the nonlinear effects of a transmission fiber, while optical amplifiers may have difficulty to produce that much signal power. On the other hand, when the effective modal area is too small, the scaling rules of equation (49) or (50) dictate a reduced power level for the optical signal in the DCF, which may be more seriously degraded by optical noise, such as loss-induced quantum noise [66] and the amplified-spontaneous-emission noise from an amplifier at the end of the DCF.

Figure 49:
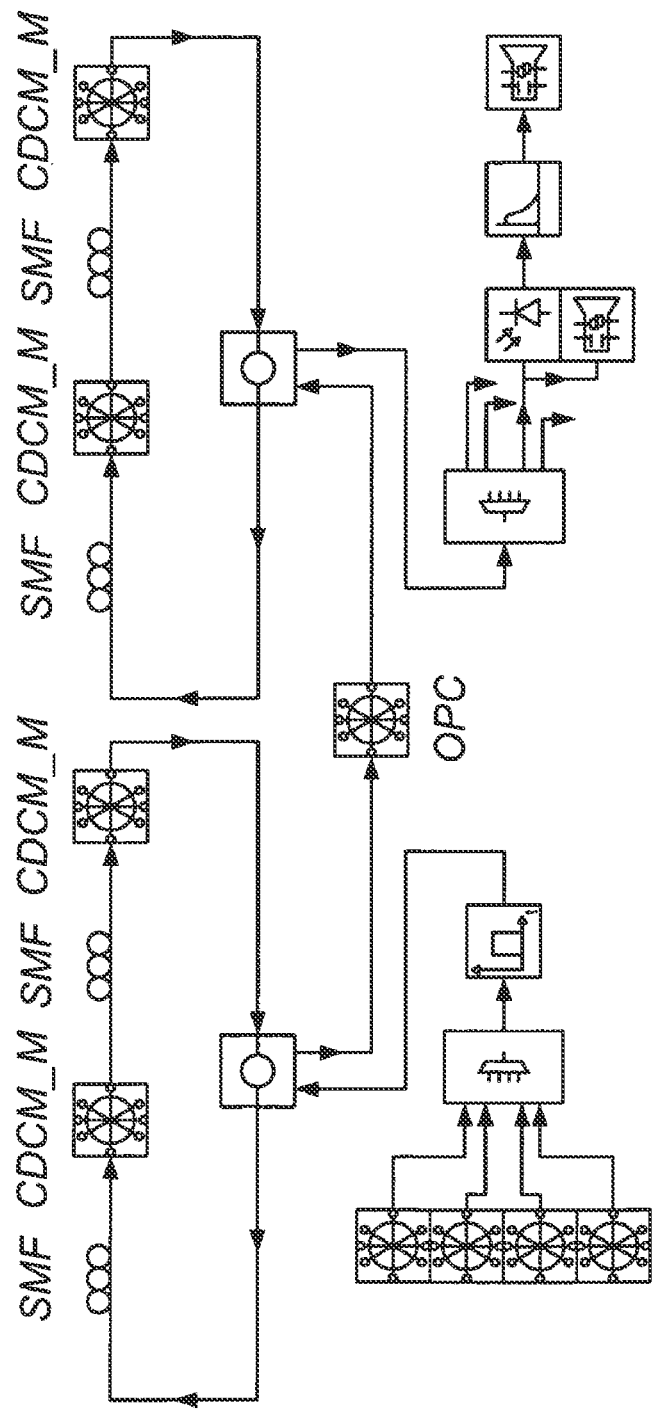
FIG. 49 illustrates a test transmission system consisting of 6 recirculating loops with an M-type dispersion map on the left side, an optical phase conjugator in the middle, then on the right side another 6 loops identical to the ones on the left. Each recirculating loop consists of two identical spans of 100 km SMF followed by a CDCM_M, as shown on the top of FIG. 48.
Figure 50:
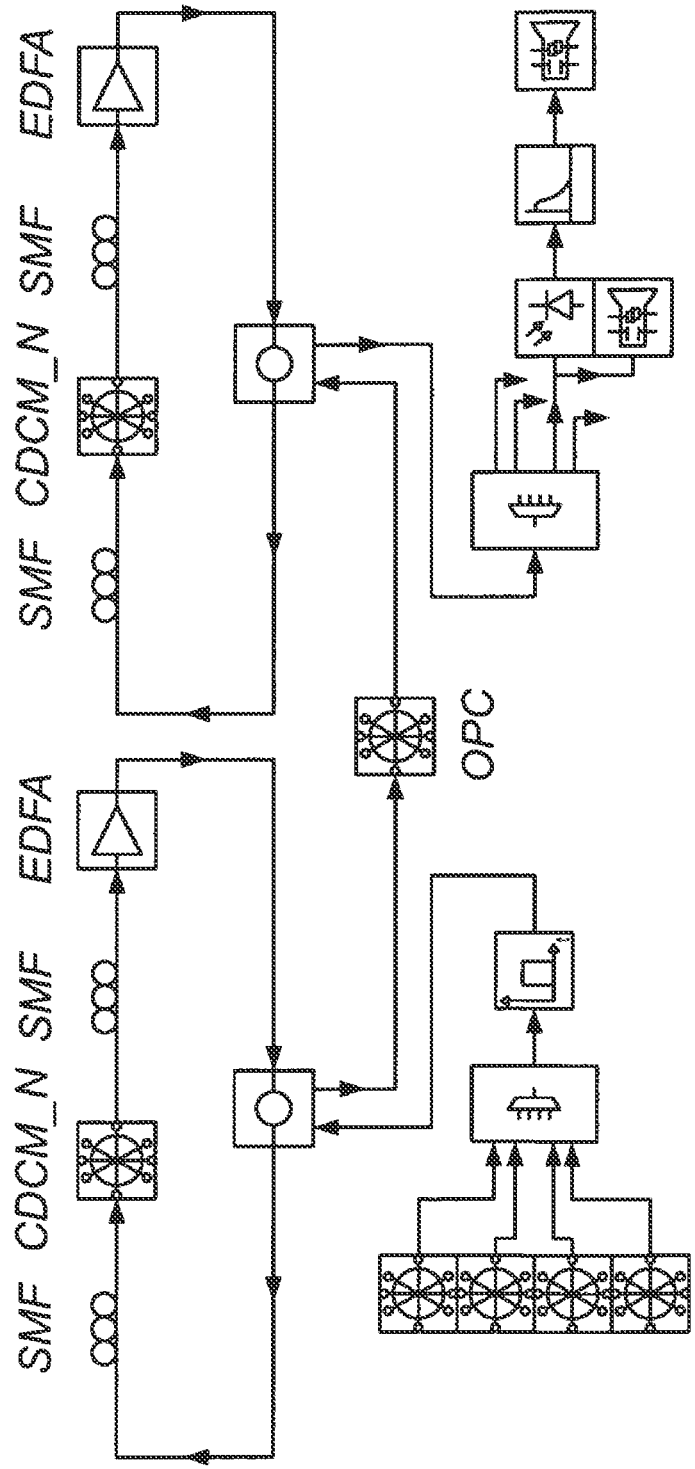
FIG. 50 illustrates a test transmission system consisting of 6 recirculating loops with an N-type dispersion map on the left side, an optical phase conjugator in the middle, then on the right side another 6 loops identical to the ones on the left. Each recirculating loop has 100 km SMF followed by a CDCM_N, then 100 km SMF followed by a 20 dB EDFA, as shown in the middle of FIG. 48.
Figure 51:
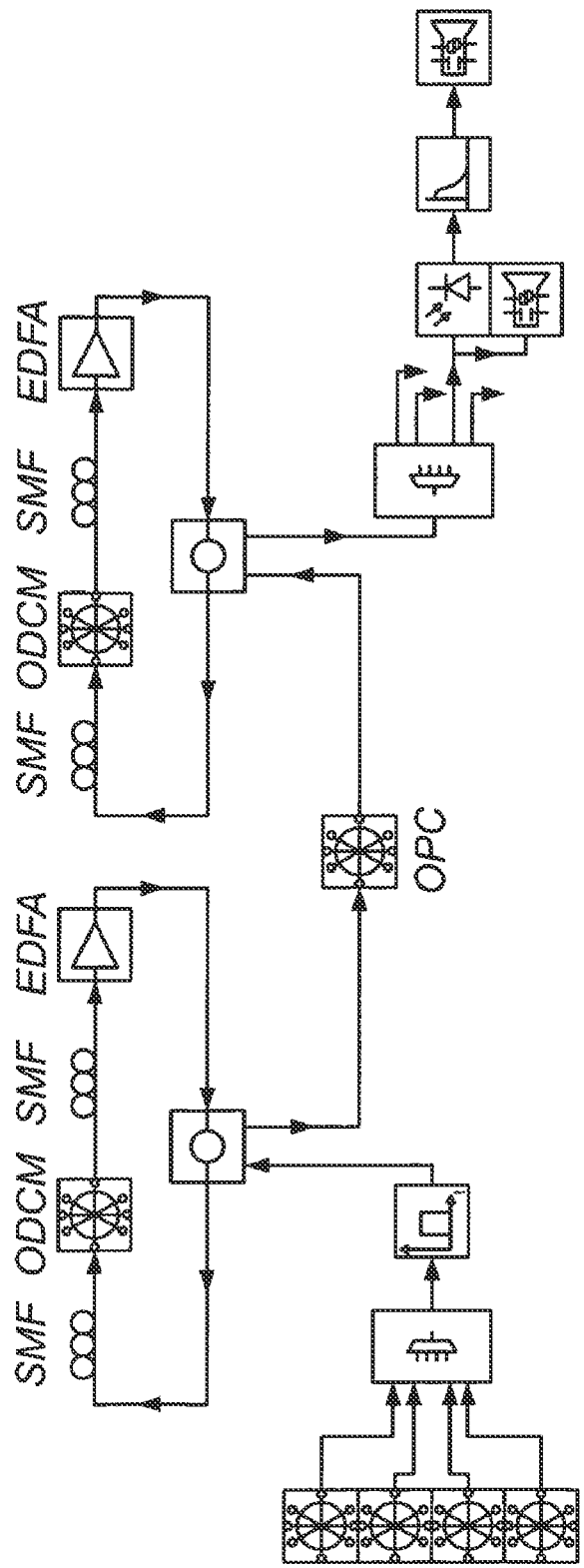
FIG. 51 illustrates a test transmission system consisting of 6 recirculating loops with an optimized N-type dispersion map on the left side, an optical phase conjugator in the middle, then on the right side another 6 loops identical to the ones on the left. Each recirculating loop consists of 100 km SMF followed by an ODCM, then 100 km SMF followed by a 20 dB EDFA, as shown at the bottom of FIG. 48.
Figure 52:
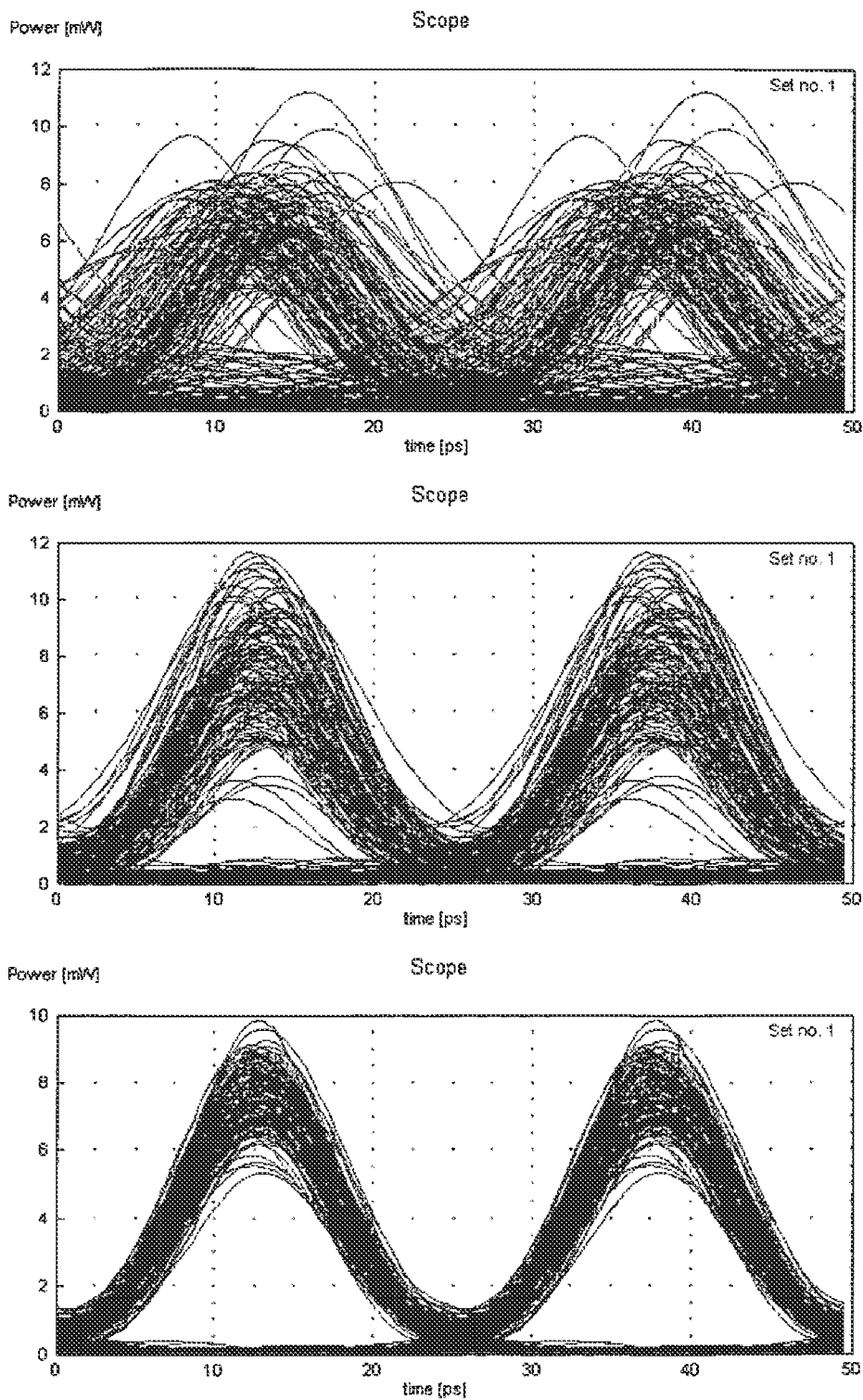
FIG. 52 illustrates optical eye diagrams at the end of transmissions. Top: of a conventional line with the M-type dispersion map. Middle: of a line with conventional DCMs in the N-type dispersion map. Bottom: of a system using optimized DCMs and scaled translational symmetry.

To give an example of ODCM and test its performance in nonlinearity compensation, we simulated (using VPItransmissionMaker™) and compared three transmission systems as shown in FIGS. 49, 50, and 51 respectively, all of which have an optical phase conjugator in the middle and 6 recirculating loops on each side of OPC. For the first system, each recirculating loop consists of two identical spans of 100 km SMF followed by a CDCM_M, as shown on the top of FIG. 48. For the second system, each recirculating loop has 100 km SMF followed by a CDCM_N, then 100 km SMF followed by a 20 dB EDFA, as shown in the middle of FIG. 48. For the third and optimized system, each recirculating loop consists of 100 km SMF followed by an ODCM, then 100 km SMF followed by a 20 dB EDFA, as shown at the bottom of FIG. 48. Each CDCM_M has a 15 dB EDFA, 20 km conventional DCF, then a 15 dB EDFA. Each CDCM_N has a 15 dB EDFA, 20 km conventional DCF, then another 15 dB EDFA, 20 km conventional DCF, and finally a 10 dB EDFA. By contrast, each ODCM consists of a 21 dB EDFA, 10 km optimized DCF, 10 km conventional DCF, a 14 dB EDFA, then 10 km optimized DCF, 10 km conventional DCF, and a 15 dB EDFA. Note the adjustment of signal power in the optimized DCFs to fulfil the scaling rules. The SMF has loss α=0.2 dB/km, dispersion D=16 ps/nm/km, dispersion slope S=0.055 ps/nm²/km, effective modal area $A_{\mathit{eff}}$=80 μm². The conventional DCF has (α', D', S', $A'_{\mathit{eff}}$)=(0.5, −80, −0.275, 20) in the same units. The optimized DCF differs from the conventional one only by the loss coefficient α''=1.0 dB/km. The same silica nonlinear index $n_2$=2.6×10⁻²⁰ m²/W is taken for all fibers. All EDFAs have the same noise figure of 4 dB. The center frequency is 193.1 THz. The inputs are four 40 Gb/s channels, spaced by 200 GHz, co-polarized and return-to-zero modulated with 33% duty and pulse peak power 15 mW. The eye diagrams of optical signals at the end of transmissions are shown in FIG. 52, where the top diagram displays severe nonlinear distortions for the conventional line with the M-type dispersion map, while the middle diagram shows improved but still seriously impaired signals of the line with the N-type dispersion map using conventional DCMs. The bottom diagram demonstrates a significant improvement of signal quality by using optimized DCMs and scaled translational symmetry, where the signal distortions are mainly due to EDFA noise and possibly some uncompensated nonlinearity.

Even without OPC, improved transmission performance due to intra-channel nonlinearity compensation may be expected in transmission systems manifesting scaled translational symmetries using optimally packaged DCMs for matched nonlinear compensation and reduced optical noise simultaneously. Furthermore, the method of mid-span SPM discussed previously may be employed in such transmission systems using ODCMs to suppress the generation of ghost-pulses, which are not controlled by scaled translational symmetries alone. Finally, it is noted that the same principle for optimally packaging DCMs, namely, obeying scaling rules where the signal power is high while disregarding the rules and minimizing the signal loss where the signal power is low, may be similarly applied to the design of transmission systems with cabled DCFs. For a piece of DCF cabled into a transmission line, the first portion of the DCF may have a relatively low absolute value of dispersion in proportion to its low loss coefficient, according to the scaling rules of translational symmetry to a transmission fiber as in equation (49) or (50). Whereas in the second portion of the DCF, where the signal power becomes sufficiently low, the dispersion may be set as high as possible while the loss coefficient should remain minimal, because no scaling rules need to be regarded.

Appendix: Fiber Parameters

Using the D and S parameters carelessly can lead to confusion. For instance, the values D=16 ps/nm/km and S=0.08 ps/nm²/km are often cited for the standard single-mode fiber. We note that it is necessary to use the D and S values at the same wavelength for the same fiber to avoid confusion. At 1550 nm, the SMF has D≈16 ps/nm/km and S≈0.055 ps/nm²/km instead of 0.08 ps/nm²/km, which is the approximate dispersion slope at 1310 nm. Regarding the use of D and S in simulations, our scaling rules are for $\beta_2$ and $\beta_3$, not directly D and S. The relations are given by, $$D \stackrel{def}{=} \frac{d\beta_1}{d\lambda} = \frac{d\omega}{d\lambda}\frac{d\beta_1}{d\omega} = -\frac{2\pi c \beta_2}{\lambda^2} = -\frac{2\pi f^2 \beta_2}{c}, \quad (51)$$

$$S \stackrel{def}{=} \frac{dD}{d\lambda} = \frac{4\pi c \beta_2}{\lambda^3} + \frac{4\pi^2 c^2 \beta_3}{\lambda^4} = \frac{4\pi f^3 \beta_2}{c^2} + \frac{4\pi^2 f^4 \beta_3}{c^2}. \quad (52)$$

Conversely, $$\beta_2 = -\frac{cD}{2\pi f^2}, \quad (53)$$

$$\beta_3 = \frac{c^2 S}{4\pi^2 f^4} - \frac{\beta_2}{\pi f} = \frac{c^2 S}{4\pi^2 f^4} + \frac{cD}{2\pi^2 f^3}. \quad (54)$$

The speed of light c=2.9979×10⁸ m/s. For the optical frequency f=193.1 THz, λ=c/f=1552.5 nm. The standard single-mode fiber (SMF) has, $$D=16 \text{ ps/nm/km}=16\times10^{-6} \text{ s/m}^2, \quad (55)$$

$$S=0.055 \text{ ps/nm}^2/\text{km}=0.055\times10^3 \text{ s/m}^3, \quad (56)$$

therefore, $$\beta_2 = -\frac{2.9979\times10^8 \times 16\times10^{-6}}{2\times3.14159\times1.931^2\times10^{28}} \text{s}^2/\text{m} \quad (57)$$

$$= -2.047\times10^{-26} \text{ s}^2/\text{m}$$

$$= -20.47 \text{ ps}^2/\text{km},$$

and, $$\beta_3 = \frac{2.9979^2\times10^{16}\times0.055\times10^3}{4\times3.14159^2\times1.931^4\times10^{56}} + \frac{2.047\times10^{-26}}{3.14159\times1.931\times10^{14}} \text{s}^3/\text{m} \quad (58)$$

$$= 0.09006\times10^{-39} + 0.03374\times10^{-39} \text{ s}^3/\text{m}$$

$$= 0.1238 \text{ ps}^3/\text{km}.$$

For convenience, the parameters (D,S) and ($\beta_2,\beta_3$) may be converted numerically as, $$D=-0.78163 \beta_2, \quad (59)$$

$$S=0.610704 \beta_3+0.0010066 \beta_2, \quad (60)$$

and conversely, $$\beta_2=-1.279375 D, \quad (61)$$

$$\beta_3=1.637455 S+0.00210875 D, \quad (62)$$

where D, S, $\beta_2$, $\beta_3$ are in units of ps/nm/km, ps/nm²/km, ps²/km, ps³/km respectively.

With a scaling factor R=1, a mirror-symmetric compensating fiber would have, $$\beta'_2=\beta_2=-20.47 \text{ ps}^2/\text{km}, \quad (63)$$

$$\beta'_3=-\beta_3=-0.1238 \text{ ps}^3/\text{km}, \quad (64)$$

correspondingly, $$D' = -\frac{2\pi f^2 \beta'_2}{c} \quad (65)$$

$$= -\frac{2\pi f^2 \beta_2}{c}$$

$$= D = 16 \text{ ps/nm/km},$$

$$S' = \frac{4\pi f^3 \beta'_2}{c^2} + \frac{4\pi^2 f^4 \beta'_3}{c^2} \quad (66)$$

$$= \frac{4\pi f^3 \beta_2}{c^2} - \frac{4\pi^2 f^4 \beta_3}{c^2}$$

$$= S - \frac{8\pi^2 f^4 \beta_3}{c^2} = S - \frac{8\pi^2 f^4}{c^2}\left(\frac{c^2 S}{4\pi^2 f^4} + \frac{cD}{2\pi^2 f^3}\right)$$

$$= -S - \frac{4fD}{c}$$

$$= -0.055\times10^3 - 0.04122\times10^3 \text{ s/m}^3$$

$$= -0.09622 \text{ ps/nm}^2/\text{km},$$

whereas a compensating fiber in translational symmetry would have, $$\beta''_2=-\beta_2=20.47 \text{ ps}^2/\text{km}, \quad (67)$$

$$\beta''_3=\beta_3=0.1238 \text{ ps}^3/\text{km}, \quad (68)$$

correspondingly, $$D'' = -\frac{2\pi f^2 \beta''_2}{c} \quad (69)$$

$$= \frac{2\pi f^2 \beta_2}{c}$$

$$= -D = -16 \text{ ps/nm/km},$$

-continued $$S'' = \frac{4\pi f^3 \beta_2''}{c^2} + \frac{4\pi^2 f^4 \beta_3''}{c^2} \quad (70)$$

$$= -\frac{4\pi f^3 \beta_2}{c^2} + \frac{4\pi^2 f^4 \beta_3}{c^2}$$

$$= -\left(\frac{4\pi f^3 \beta_2}{c^2} - \frac{4\pi^2 f^4 \beta_3}{c^2}\right)$$

$$= S + \frac{4fD}{c} = 0.09622 \text{ ps/nm}^2/\text{km}.$$

By contrast, for perfect direct (without OPC) dispersion compensation, the compensating fiber should have parameters $-(\beta_2, \beta_3)$, and correspondingly $-(D, S)$. When the scaling factor is not one, the parameters of the compensating fibers should multiply whatever the ratio R>0, for all the three cases.

Another important parameter is the effective modal area $A_{eff}$, often specified alternatively by the mode field diameter (MFD). The MFD is defined as the diameter of the circle where the optical intensity decays to 1/e of the peak value. If the modal field is approximated as Gaussian, then there is the relation, $$A_{eff} \stackrel{def}{=} \int_0^\infty \exp[-4r^2/(MFD)^2] 2\pi r \, dr = \pi (MFD)^2/4. \quad (71)$$

REFERENCES

1. A. H. Gnauck and R. M. Jopson, "Dispersion compensation for optical fiber systems," in *Optical Fiber Telecommunications III A*, I. P. Kaminow and T. L. Koch, eds. (Academic Press, San Diego, 1997).
2. F. Forghieri, R. W. Tkach and A. R. Chraplyvy, "Fiber nonlinearities and their impact on transmission systems," in *Optical Fiber Telecommunications III A*, I. P. Kaminow and T. L. Koch, eds. (Academic Press, San Diego, 1997).
3. V. Srikant, "Broadband dispersion and dispersion slope compensation in high bit rate and ultra long haul systems," OFC 2001, paper TuH1.
4. M. J. Li, "Recent progress in fiber dispersion compensators," European Conference on Optical Communication 2001, paper Th.M.1.1.
5. S. N. Knudsen and T. Veng, "Large effective area dispersion compensating fiber for cabled compensation of standard single mode fiber," OFC 2000, paper TuG5.
6. Q. L. N. T., T. Veng, and L. Gruner-Nielsen, "New dispersion compensating module for compensation of dispersion and dispersion slope of non-zero dispersion fibres in the C-band," OFC 2001, paper TuH5.
7. K. Mukasa, H. Moridaira, T. Yagi, and K. Kokura, "New type of dispersion management transmission line with MDFSD for long-haul 40 Gb/s transmission," OFC 2002, paper ThGG2.
8. M. Gorlier, P. Sillard, F. Beaumont, L.-A. de Montmorillon, L. Fleury, Ph. Guenot, A. Bertaina, and P. Nouchi, "Optimized NZDSF-based link for wide-band seamless terrestrial transmissions," OFC 2002, paper ThGG7.
9. A. Yariv, D. Fekete, and D. M. Pepper, "Compensation for channel dispersion by nonlinear optical phase conjugation," Opt. Lett. 4, 52-54 (1979).
10. D. M. Pepper and A. Yariv, "Compensation for phase distortions in nonlinear media by phase conjugation," Opt. Lett. 5, 59-60 (1980).
11. S. Watanabe and M. Shirasaki, "Exact compensation for both chromatic dispersion and Kerr effect in a transmission fiber using optical phase conjugation," J. Lightwave Technol. 14, 243-248 (1996).
12. I. Brener, B. Mikkelsen, K. Rottwitt, W. Burkett, G. Raybon, J. B. Stark, K. Parameswaran, M. H. Chou, M. M. Fejer, E. E. Chaban, R. Harel, D. L. Philen, and S. Kosinski, "Cancellation of all Kerr nonlinearities in long fiber spans using a $LiNbO_3$ phase conjugator and Raman amplification," OFC 2000, paper PD33.
13. M. H. Chou, I. Brener, M. M. Fejer, E. E. Chaban, and S. B. Christman, "1.5-μm-band wavelength conversion based on cascaded second-order nonlinearity in $LiNbO_3$ waveguides," IEEE Photon. Technol. Lett. 11, 653-655 (1999).
14. S. Radic, R. M. Jopson, C. J. McKinstrie, A. H. Gnauck, S. Chandrasekhar, and J. C. Centanni, "Wavelength division multiplexed transmission over standard single mode fiber using polarization insensitive signal conjugation in highly nonlinear optical fiber," OFC 2003, paper PD12.
15. H. Wei and D. V. Plant, "On the capacity of nonlinear fiber channels," arXiv:physics/0307020 at http://arxiv.org/.
16. H. Wei and D. V. Plant, "Two means of compensating fiber nonlinearity using optical phase conjugation," arXiv:physics/0307022 at http://arxiv.org/.
17. H. Wei and D. V. Plant, "Fundamental equations of nonlinear fiber optics," in *Optical Modeling and Performance Predictions*, M. A. Kahan, ed., Proc. SPIE 5178, 255-266 (2003).
18. K. Rottwitt and A. J. Stentz, "Raman amplification in lightwave communication systems," in *Optical Fiber Telecommunications IV A: Components*, I. P. Kaminow and T. Li, eds. (Academic Press, San Diego, 2002).
19. E. Desurvire, *Erbium-Doped Fiber Amplifiers: Principles and Applications* (John Wiley & Sons, New York, 1994).
20. M. Vasilyev, B. Szalabofka, S. Tsuda, J. M. Grochocinski, and A. F. Evans, "Reduction of Raman MPI and noise figure in dispersion-managed fiber," Electron. Lett. 38, no. 6, 271-272 (2002).
21. J.-C. Bouteiller, K. Brar, and C. Headley, "Quasi-constant signal power transmission," European Conference on Optical Communication 2002, paper S3.04.
22. M. Vasilyev, "Raman-assisted transmission: toward ideal distributed amplification," OFC 2003, paper WB1.
23. M. E. Marhic, N. Kagi, T.-K. Chiang, and L. G. Kazovsky, "Cancellation of third-order nonlinear effects in amplified fiber links by dispersion compensation, phase conjugation, and alternating dispersion," Opt. Lett. 20, no. 8, 863-865 (1995).
24. J. A. Buck, *Fundamentals of Optical Fibers* (Wiley, New York, 1995), Chapter 4.
25. G. P. Agrawal, *Nonlinear Fiber Optics*, 2nd ed. (Academic Press, San Diego, 1995), Chapter 2.
26. The use of $\beta_k$'s as defined in, for example Ref. [25], is connected to an approximation $\beta_2(\omega) - \beta_0^2 \approx 2\beta_0[\beta(\omega) - \beta_0]$ with sacrificed accuracy. Our present definition, as originally appeared in Ref. [17], should be used for better accuracy.
27. K.-J. Engel and R. Nagel, *One-Parameter Semigroups for Linear Evolution Equations* (Springer-Verlag, New York, 2000).
28. E. E. Narimanov and P. Mitra, "The channel capacity of a fiber optics communication system: perturbation theory," J. Lightwave Technol. 20, 530-537 (2002).
29. A. Yariv, *Optical Electronics in Modern Communications*, 5th ed. (Oxford University Press, 1997), Chapter 3.

30. At any position z, the Kerr coefficient γ(z) has a well-defined sign, which is by convention positive for most physical materials. However, the Raman coefficient g(z, t) is usually an oscillating function in the time delay t, as shown in reference [31]. Nevertheless, one may still call a Raman impulse response g(z,t) "positive" or "negative" depending upon whether its first peak with the least time delay is positive- or negative-valued.

31. R. H. Stolen, J. P. Gordon, W. J. Tomlinson, and H. A. Haus, "Raman response function of silica-core fibers," J. Opt. Soc. Am. B 6, 1159-1166 (1989).

32. K. Nouchi, E. Matsuyama, Y. Morishita, and G. Tanimoto, "Ultra-wideband response in $Co^{2+}$-doped fiber attenuators," ECOC 2001, paper P.2.

33. D. J. DiGiovanni, S. K. Das, L. L. Blyler, W. White, R. K. Boncek, and S. E. Golowich, "Design of optical fibers for communications systems," in *Optical Fiber Telecommunications IV A: Components*, I. P. Kaminow and T. Li, eds. (Academic Press, San Diego, 2002).

34. L. Gruner-Nielsen, Y. Qian, B. Palsdottir, P. B. Gaarde, S. Dyrbol, T. Veng, and Y. Qian, "Module for simultaneous C+L-band dispersion compensation and Raman amplification," OFC 2002, paper TuJ6.

35. T. Miyamoto, T. Tsuzaki, T. Okuno, M. Kakui, M. Hirano, M. Onishi, and M. Shigematsu, "Raman amplification over 100 nm-bandwidth with dispersion and dispersion slope compensation for conventional single mode fiber," OFC 2002, paper TuJ7.

36. C. Rasmussen, T. Fjelde, J. Bennike, F. Liu, S. Dey, B. Mikkelsen, P. Mamyshev, P. Serbe, P. van der Wagt, Y. Akasaka, D. Harris, D. Gapontsev, V. Ivshin, P. Reeves-Hall, "DWDM 40G transmission over trans-Pacific distance (10,000 km) using CSRZ-DPSK, enhanced FEC and all-Raman amplified 100 km UltraWave™ fiber spans," OFC 2003, paper PD18.

37. M. Eiselt, M. Shtaif, R. W. Tkach, F. A. Flood, S. Ten, and D. Butler, "Cross-phase modulation in an L-band EDFA," IEEE Photon. Technol. Lett. 11, 1575-1577 (1999).

38. H. S. Chung, S. K. Shin, D. W. Lee, D. W. Kim, and Y. C. Chung, "640 Gbit/s (32×20 Gbit/s) WDM transmission with 0.4 (bit/s)/Hz spectral efficiency using short-period dispersion-managed fiber," Elec. Lett. 37, 618-620 (2001).

39. R.-J. Essiambre, G. Raybon, and B. Mikkelson, "Pseudo-linear transmission of high-speed TDM signals: 40 and 160 Gb/s," in *Optical Fiber Telecommunications IV B: Systems and Impairments*, I. P. Kaminow and T. Li, eds. (Academic Press, San Diego, 2002).

40. P. Kaewplung, T. Angkaew, and K. Kikuchi, "Simultaneous suppression of third-order dispersion and sideband instability in single-channel optical fiber transmission by midway optical phase conjugation employing higher order dispersion management," J. Lightwave Technol. 21, 1465-1473 (2003).

41. For example, a nearly perfect translational symmetry may be formed between Corning's LEAF, a +NZDSF with D≈4 ps/nm/km, S≈0.1 ps/nm²/km, and its Vascade LEAF, a −NZDSF with D≈−4 ps/nm/km, S≈0.1 ps/nm²/km in the C band. The fiber parameters are available at http://www.corning.com/opticalfiber.

42. F. Forghieri, R. W. Tkach, A. R. Chraplyvy, and D. Marcuse, "Reduction of four-wave mixing crosstalk in WDM systems using unequally spaced channels," IEEE Photon. Technol. Lett. 6, 754-756 (1994).

43. F. Forghieri, R. W. Tkach, and A. R. Chraplyvy, "WDM systems with unequally spaced channels," J. Lightwave Technol. 13, 889-897 (1995).

44. P. V. Mamyshev and N. A. Mamysheva, "Pulse-overlapped dispersion-managed data transmission and intrachannel four-wave mixing," Opt. Lett. 24, 1454-1456 (1999).

45. A. Mecozzi, C. B. Clausen, and M. Shtaif, "Analysis of intrachannel nonlinear effects in highly dispersed optical pulse transmission," IEEE Photon. Technol. Lett. 12, 392-394 (2000).

46. A. Mecozzi, C. B. Clausen, M. Shtaif, S.-G. Park, and A. H. Gnauck, "Cancellation of timing and amplitude jitter in symmetric links using highly dispersed pulses," IEEE Photon. Technol. Lett. 13, 445-447 (2001).

47. J. Martensson, A. Berntson, M. Westlund, A. Danielsson, P. Johannisson, D. Anderson, and M. Lisak, "Timing jitter owing to intrachannel pulse interactions in dispersion-managed transmission systems," Opt. Lett. 26, 55-57 (2001).

48. P. Johannisson, D. Anderson, A. Berntson, and J. Martensson, "Generation and dynamics of ghost pulses in strongly dispersion-managed fiber-optic communication systems," Opt. Lett. 26, 1227-1229 (2001).

49. M. J. Ablowitz and T. Hirooka, "Resonant nonlinear intrachannel interactions in strongly dispersion-managed transmission systems," Opt. Lett. 25, 1750-1752 (2000).

50. M. J. Ablowitz and T. Hirooka, "Intrachannel pulse interactions in dispersion-managed transmission systems: timing shifts," Opt. Lett. 26, 1846-1848 (2001).

51. M. J. Ablowitz and T. Hirooka, "Intrachannel pulse interactions in dispersion-managed transmission systems: energy transfer," Opt. Lett. 27, 203-205 (2002).

52. T. Hirooka and M. J. Ablowitz, "Suppression of intrachannel dispersion-managed pulse interactions by distributed amplification," IEEE Photon. Technol. Lett. 14, 316-318 (2002).

53. R. Hainberger, T. Hoshita, T. Terahara, and H. Onaka, "Comparison of span configurations of Raman-amplified dispersion-managed fibers," IEEE Photon. Technol. Lett. 14, 471-473 (2002).

54. A. Striegler, A. Wietfeld, and B. Schmauss, "Fiber based compensation of IXPM induced timing jitter," OFC 2004, paper MF72.

55. A. G. Striegler and B. Schmauss, "Compensation of intrachannel effects in symmetric dispersion-managed transmission systems," *J. Lightwave Technol.*, vol. 22, no. 8, 1877-1882, August 2004.

56. R.-J. Essiambre, B. Mikkelsen, and G. Raybon, "Intrachannel cross-phase modulation and four-wave mixing in high-speed TDM systems," *Electron. Lett.*, vol. 35, no. 18, pp. 1576-1578, 1999.

57. F. Merlaud and S. K. Turitsyn, "Intra-channel four wave mixing and ghost pulses generation: time domain approach," *ECOC '00*, paper 7.2.4, Munich, Germany, Sep. 3-7, 2000.

58. P. Vidakovic, D. J. Lovering, J. A. Levenson, J. Webjrn, and P. St.J. Russell, "Large nonlinear phase shift owing to cascaded $\chi^{(2)}$ in quasi-phase-matched bulk $LiNbO_3$," *Opt. Lett.*, vol. 22, no. 5, pp. 277-279, March 1997.

59. X. Liu, X. Wei, R. E. Slusher, and C. J. McKinstrie, "Improving transmission performance in differential phase-shift-keyed systems by use of lumped nonlinear phase-shift compensation," *Opt. Lett.*, vol. 27, no. 18, pp. 1616-1618, September 2002.

60. G. P. Agrawal and N. A. Olsson, "Self-phase modulation and spectral broadening of optical pulses in semiconductor laser amplifiers," *IEEE J. Quantum Electron.*, vol. 25, no. 11, pp. 2297-2306, November 1989.

61. C. Xu and X. Liu, "Postnonlinearity compensation with data-driven phase modulators in phase-shift keying transmission," *Opt. Lett.*, vol. 27, no. 18, 1619-1621, September 2002.

62. J. Hansryd, J. van Howe, and C. Xu, "Experimental demonstration of nonlinear phase jitter compensation in DPSK modulated fiber links," *IEEE Photon. Technol. Lett.*, vol. 17, no. 1, pp. 232-234, January 2005.

63. N.J. Doran and D. Wood, "Nonlinear optical loop mirror," *Opt. Lett.*, vol. 13, no. 1, pp. 56-58, 1988.

64. Z. Huang, A. Gray, I. Khrushchev, and I. Bennion, "10-Gb/s transmission over 100 Mm of standard fiber using 2R regeneration in an optical loop mirror," *IEEE Photon. Technol. Lett.*, vol. 16, no. 11, pp. 2526-2528, November 2004.

65. D. B. Mortimore, "Fiber loop reflectors," *J. Lightwave Technol.*, vol. 6, no. 7, pp. 1217-1224, 1988.

66. H. Wei and D. V. Plant, "Quantum noise in optical communication systems," in *Optical Modeling and Performance Predictions*, M. A. Kahan, ed., *Proc. SPIE*, vol. 5178, pp. 139-147, 2003.

67. T. Kato, M. Hirano, K. Fukuda, A. Tada, M. Onishi, and M. Nishimura, OFC 2001, paper TuS6.

What is claimed is:

1. An optical communications link, comprising:
   at least one fiber span (N−1 fiber spans, 2≦N) in a contiguous series arrangement, each fiber span i=1, ..., N−1 comprising a primary fiber line "i" characterized by an $i^{th}$ parameter set $[\alpha_i(z), \beta_{2,i}(z), (\gamma_g P)_i(z)]$ in which $\alpha_i(z)$ is a loss/gain coefficient profile, $\beta_{2,i}(z)$ is a second-order dispersion coefficient profile, and $(\gamma_g P)_i(z)$ is a first nonlinear coefficient-power profile; and
   an $N^{th}$ fiber span comprising a primary fiber line "N" characterized by an $N^{th}$ parameter set $[\alpha_N(z), \beta_{2,N}(z), (\gamma_g P)_N(z)]$;
   wherein along each primary fiber line "i" there is a relationship $R_i[\alpha_i(R_i z), |\beta_{2,i}(R_i z)|, (\gamma_g P)_i(R_i z)] \approx [\alpha_N(z), |\beta_{2,N}(z)|, (\gamma_g P)_N(z)]$ with $R_i$ being a real scalar constant, for facilitating compensation of at least one nonlinear effect in an optical signal propagating through said N fiber spans.

2. The optical communications link of claim 1, wherein $R_i[\alpha_i(R_i z), \beta_{2,i}(R_i z), (\gamma_g P)_i(R_i z)] \approx [\alpha_N(z), \beta_{2,N}(z), (\gamma_g P)_N(z)]$.

3. The optical communications link of claim 1, wherein $R_i[\alpha_i(R_i z), -\beta_{2,i}(R_i z), (\gamma_g P)_i(R_i z)] \approx [\alpha_N(z), \beta_{2,N}(z), (\gamma_g P)_N(z)]$.

4. The optical communications link of claim 1, wherein said $N^{th}$ fiber span is immediately adjacent to said $(N-1)^{th}$ fiber span.

5. The optical communications link of claim 1, further comprising an optical phase conjugator positioned between said $(N-1)^{th}$ fiber span and said $N^{th}$ fiber span.

6. The optical communications link of claim 1, wherein each of said N fiber spans further comprises a secondary fiber line "i" connected to said primary fiber line "i" and characterized by respective continuations of said $i^{th}$ parameter set $[\alpha_i(z), \beta_{2,i}(z), (\gamma_g P)_i(z)]$ thereof, each secondary fiber line "i" being connected to said primary fiber line "i" at an $i^{th}$ location where $(\gamma_g P)_i(z)$ becomes generally small compared to a maximum value $[(\gamma_g P)_i(z)]_{MAX}$ thereof, wherein along each secondary fiber line "i" said relationship $R_i[\alpha_i(R_i z), -\beta_{2,i}(R_i z), (\gamma_g P)_i(R_i z)] \approx [\alpha_N(z), \beta_{2,N}(z), (\gamma_g P)_N(z)]$ is not satisfied, said non-satisfaction accommodating length variations in said N secondary fiber lines designed to achieve predetermined target values for accumulated second-order dispersion for each of said N fiber spans, said non-satisfaction not substantially confounding results of said compensation of said at least one nonlinear effect due to relatively low power levels in said N secondary fiber lines.

7. The optical communications link of claim 6, wherein each of said N primary fiber lines is a transmission single-mode fiber having a constant loss/gain coefficient profile value less than 0.5 dB/km therealong, and wherein each of said N secondary fiber lines is a dispersion compensating fiber having a constant loss/gain coefficient profile value greater than 1.0 dB/km.

8. The optical communications link of claim 1, wherein $R_i$ is between 0.05 and 20 for each of said N−1 fiber spans.

9. A method for designing a second optical fiber line for use in for facilitating compensation of at least one nonlinear effect in one or more optical signals propagating through a first optical fiber line, comprising:
   receiving a first parameter set $[\alpha_1(z), \beta_{2,1}(z), \gamma_{g1}(z)]$ in which $\alpha_1(z)$ is a first loss/gain coefficient profile, $\beta_{2,1}(z)$ is a first second-order dispersion coefficient profile, and $(\gamma_g)_1(z)$ is a first nonlinear coefficient profile;
   fabricating and/or selecting the second optical fiber line to have a second parameter set $[\alpha_2(z), \beta_{2,2}(z), \gamma_{g2}(z)]$, wherein there is a relationship $R_1 \alpha_1(R_1 z) \approx |\alpha_2(z)|$, wherein there is a relationship $R_1 \beta_{2,1}(R_1 z) \approx |\beta_{2,2}(z)|$ with $R_1$ being a first real scalar constant substantially different from unity, and wherein there is a relationship $R_2 \gamma_{g1}(R_2 z) \approx \gamma_{g2}(z)]$ with $R_2$ being a second real scalar constant;
   whereby, for an optical signal propagating through said first and second optical fiber lines, at least a portion of a signal nonlinearity introduced thereinto while propagating along said first optical fiber line is at least partially compensated by said propagation along said second optical fiber line.

10. The method of claim 9, wherein said first real scalar constant $R_1$ is between 0.05 and 20.

11. The method of claim 10, wherein said first real scalar constant $R_1$ is not less than 3.

12. The method of claim 9, wherein said first loss/gain coefficient profile $\alpha_1(z)$ is approximately 0.2 dB/km for all z, wherein said second loss/gain coefficient profile $\alpha_2(z)$ is approximately 0.6 dB/km for all z, and wherein said real scalar constant $R_1$ is approximately 3.

13. An integrated dispersion-compensating module for installation at an electrically powered amplifying location of an optical communications link, the optical communications link having first and second transmission fiber lines of known first and second lengths, known first and second loss/gain coefficient profiles, and known first and second second-order dispersion coefficient profiles, respectively, the integrated dispersion-compensating module comprising:
   a first dispersion-compensating fiber line connected to said first transmission fiber line and having a third loss/gain coefficient profile designed for substantial scaled translational symmetry with said second loss/gain coefficient profile by a first constant and a third second-order dispersion coefficient profile designed for substantial scaled translational symmetry with said second second-order dispersion coefficient profile oppositely signed by said first constant; and
   a second dispersion-compensating fiber line connected to said first dispersion-compensating fiber line;
   wherein said second dispersion-compensating fiber line has a length selected such that an accumulated dispersion associated with said first and second dispersion-compensating fiber lines compensates an accumulated dispersion associated with said first transmission fiber line within a first predetermined tolerance for said known length of said first transmission fiber line.

14. The integrated dispersion-compensating module of claim 13, said second transmission fiber line being further characterized by a first nonlinear coefficient-power product profile at a first nominal input power level, wherein said first dispersion-compensating fiber line has a second nonlinear coefficient-power product profile designed for substantial scaled translational symmetry with said first nonlinear coefficient-power product profile by a second constant.

15. The integrated dispersion-compensating module of claim 13, further comprising third and fourth dispersion-compensating fiber lines commonly packaged with said first and second dispersion-compensating fiber lines, said third dispersion-compensating fiber line for connection to said second transmission fiber line and designed to have a fourth loss/gain coefficient profile in substantial scaled translational symmetry with said first loss/gain coefficient profile by a third constant and a fourth second-order dispersion profile in substantial scaled translational symmetry with said first second-order dispersion coefficient profile oppositely signed by said third constant, said fourth dispersion-compensating fiber line being connected to said third dispersion-compensating fiber line, wherein said fourth dispersion-compensating fiber line has a length selected such that an accumulated dispersion associated with said third and fourth dispersion-compensating fiber lines compensates an accumulated dispersion associated with said second transmission fiber line within a second predetermined tolerance for said known length of said second transmission fiber line.

16. The integrated dispersion-compensating module of claim 13, said optical communications link being designed to propagate an optical signal in a direction of propagation from said first transmission fiber line toward said second transmission fiber line, wherein said integrated dispersion-compensating module is configured for installation prior to said first transmission fiber line relative to said direction of propagation.

17. The integrated dispersion-compensating module of claim 13, said optical communications link being designed to propagate an optical signal in a direction from said first transmission fiber line toward said second transmission fiber line, wherein said integrated dispersion-compensating module is configured for installation between said first and second transmission fiber lines relative to said direction of propagation.

18. An integrated dispersion-compensating module for installation at an electrically powered amplifying location of an optical communications link, the optical communications link having first and second transmission fiber lines of known first and second lengths, known first and second loss/gain coefficient profiles, and known first and second second-order dispersion coefficient profiles, respectively, the integrated dispersion-compensating module comprising:
  a first dispersion-compensating fiber line for placement in serial optical communication with said first transmission fiber line and having a third loss/gain coefficient profile designed for substantial scaled translational symmetry with said first loss/gain coefficient profile by a first constant and a third second-order dispersion coefficient profile designed to have a magnitude that is in substantial scaled translational symmetry with said first second-order dispersion coefficient profile by said first constant; and
  whereby, for an optical signal propagating through said first transmission fiber line and said first dispersion-compensating fiber line, at least a portion of a signal nonlinearity introduced thereinto while propagating along said first transmission fiber line is at least partially compensated by said propagation along said first dispersion-compensating fiber line.

19. The integrated dispersion-compensating module of claim 18, further comprising:
  a second dispersion-compensating fiber line in serial optical communication with said first dispersion-compensating fiber line and having a fourth loss/gain coefficient profile designed for substantial scaled translational symmetry with said second loss/gain coefficient profile by a second constant and a fourth second-order dispersion coefficient profile designed to have a magnitude that is in substantial scaled translational symmetry with said second second-order dispersion coefficient profile by said second constant;
  whereby, for an optical signal propagating through said first transmission fiber line, said first and second dispersion-compensating fiber lines, and said second transmission fiber line, at least a portion of a signal nonlinearity introduced thereinto while propagating along said second dispersion-compensating fiber line is at least partially compensated by said propagation along said second dispersion-compensating fiber line.

20. The integrated dispersion-compensating module of claim 19, further comprising third and fourth dispersion-compensating fiber lines commonly packaged with said first and second dispersion-compensating fiber lines, said third dispersion-compensating fiber line for connection to said second transmission fiber line and designed to have a fourth loss/gain coefficient profile in substantial scaled translational symmetry with said first loss/gain coefficient profile by a third constant and a fourth second-order dispersion profile in substantial scaled translational symmetry with said first second-order dispersion coefficient profile oppositely signed by said third constant, said fourth dispersion-compensating fiber line being connected to said third dispersion-compensating fiber line, wherein said fourth dispersion-compensating fiber line has a length selected such that an accumulated dispersion associated with said third and fourth dispersion-compensating fiber lines compensates an accumulated dispersion associated with said second transmission fiber line within a second predetermined tolerance for said known length of said second transmission fiber line.

21. The integrated dispersion-compensating module of claim 19, said optical communications link being designed to propagate an optical signal in a direction of propagation from said first transmission fiber line toward said second transmission fiber line, wherein said integrated dispersion-compensating module is configured for installation prior to said first transmission fiber line relative to said direction of propagation.

22. The integrated dispersion-compensating module of claim 19, said optical communications link being designed to propagate an optical signal in a direction from said first transmission fiber line toward said second transmission fiber line, wherein said integrated dispersion-compensating module is configured for installation between said first and second transmission fiber lines relative to said direction of propagation.

* * * * *